United States Patent [19]

Büch et al.

[11] Patent Number: 5,227,475
[45] Date of Patent: Jul. 13, 1993

[54] WATER-SOLUBLE FIBER-REACTIVE DYESTUFFS CONTAINING A CYANAMIDO-SUBSTITUTED TRIAZINYLAMINO-GROUPING, AND A PROCESS FOR DYEING WITH THE USE OF THESE DYES

[75] Inventors: Holger M. Büch, Hofheim am Taunus; Reinhard Hähnle; Hartmut Springer, both of Königstein/Taunus, all of Fed. Rep. of Germany

[73] Assignee: Hoechst Aktiengesellschaft, Frankfurt am Main, Fed. Rep. of Germany

[21] Appl. No.: 776,305

[22] PCT Filed: May 4, 1990

[86] PCT No.: PCT/EP90/00715

§ 371 Date: Jan. 10, 1992

§ 102(e) Date: Jan. 10, 1992

[87] PCT Pub. No.: WO90/13604

PCT Pub. Date: Nov. 15, 1990

[30] Foreign Application Priority Data

May 10, 1989 [DE] Fed. Rep. of Germany ....... 3915306
Sep. 14, 1989 [DE] Fed. Rep. of Germany ....... 3930704

[51] Int. Cl.$^5$ ..................... C09B 62/503; D06P 1/38
[52] U.S. Cl. ..................... 534/629; 534/598; 534/632; 534/638; 534/641; 534/642; 540/126; 544/76; 544/189; 544/193.1; 544/193.2; 544/197; 544/198; 8/549; 8/921; 8/918
[58] Field of Search ............... 534/597, 629, 640, 642; 540/126; 544/76, 189, 193.1, 193.2, 197, 198

[56] References Cited

U.S. PATENT DOCUMENTS

| | | | |
|---|---|---|---|
| 3,723,425 | 3/1973 | Ackermann et al. | 544/193.2 |
| 3,758,470 | 9/1973 | Ackermann et al. | 534/632 |
| 4,649,193 | 3/1987 | Meininger et al. | 534/622 |
| 4,740,592 | 4/1988 | Springer et al. | 534/642 |
| 5,015,731 | 5/1991 | Schwaiger et al. | 534/618 |
| 5,131,918 | 7/1992 | Kelly | 8/549 |

FOREIGN PATENT DOCUMENTS 0199950 12/1986 European Pat. Off.
15-17113 8/1940 Japan.
50-31566 10/1975 Japan.

*Primary Examiner*—Mary C. Lee
*Assistant Examiner*—Fiona T. Powers
*Attorney, Agent, or Firm*—Connolly and Hutz

[57] ABSTRACT

Water-soluble dyestuffs which correspond to the formula (1) given below, have fiber-reactive properties and dye synthetic and natural materials, in particular fiber materials, containing hydroxyl and/or carboxamide groups, such as wool and in particular cellulose fiber materials, in deep shades

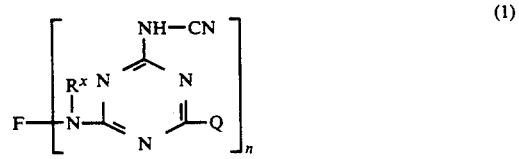

(1)

in which:

F is the radical of a dyestuff, such as of an azo dyestuff, heavy metal complex azo dyestuff, anthraquinone dyestuff or phthalocyanine dyestuff, R$^x$ is hydrogen or lower alkyl, which can be substituted by halogen, hydroxyl, cyano, lower alkoxy, lower alkoxycarbonyl, carboxyl, sulfamoyl, sulfo or sulfato;

n is the number 1 or 2; and

Q is a group of the formula

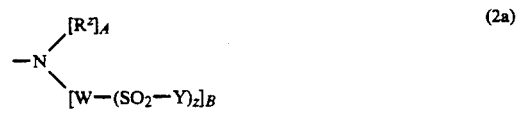

(2a)

or (Abstract continued on next page.)

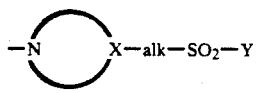

(2b)

in which
$R^z$ is hydrogen or lower alkyl, which can be substituted by halogen, hydroxyl, cyano, lower alkoxy, carboxyl, sulfamoyl, sulfo, sulfato or by optionally substituted phenyl, or is cyclohexyl or optionally substituted phenyl, W is optionally substituted arylene or a combined radical of alkylene and arylene, in which the alkylene radicals and arylene radicals can be substituted and the alkylene radicals and alkylene-arylene radicals can likewise be interrupted by hetero groups; the group $-SO_2-Y$ is a fiber-reactive group from the vinylsulfone series, z is the number 1 or 2, A is the number zero or 1, B is the number 1 or 2, the sum of (A+B) being 2, X, together with the N atom and 1 or 2 lower alkylene groups and if appropriate 1 or 2 hetero groups, forms the radical of a heterocyclic ring and alk is a lower alkylene, are described.

17 Claims, No Drawings

WATER-SOLUBLE FIBER-REACTIVE DYESTUFFS CONTAINING A CYANAMIDO-SUBSTITUTED TRIAZINYLAMINO-GROUPING, AND A PROCESS FOR DYEING WITH THE USE OF THESE DYES

The invention relates to the technical field of fiber-reactive dyestuffs.

The practice of dyeing using reactive dyestuffs has recently led to increased requirements being imposed on the quality of the dyeings and the efficiency of the dyeing process. There consequently continues to be a need for novel reactive dyestuffs which have improved properties, not only in respect of the fastnesses but also in respect of a high degree of fixing on the material to be dyed.

Fiber-reactive dyestuffs which contain an s-triazine radical to which a fiber-reactive group from the vinylsulfone series is bonded and in which the third substituent is an optionally substituted amino group or a methoxy group are thus known from U.S. Pat. No. 4,740,592 and from the Japanese Patent publications Sho-40-17113 and Sho-50-31566. Dyestuffs which contain a 2-chloro-4-cyanamido-s-triazin-6-ylamino radical are furthermore known from U.S. Pat. No. 3,758,470. However, the known dyestuffs have certain technological deficiencies; thus, they have a degree of fixing which is no longer completely satisfactory from today's standpoint, and they produce dyeings which do not have an adequate coloristic depth of color.

Novel water-soluble dyestuffs which have been improved in this respect have now been discovered with the present invention, these dyestuffs corresponding to the following formula (1)

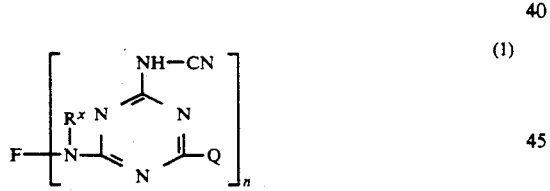

In formula (1):

F is the radical of a monoazo, disazo or polyazo dyestuff or of a heavy metal complex azo dyestuff derived therefrom, or of an anthraquinone, phthalocyanine, azomethine, dioxazine, phenazine, stilbene, triphenylmethane, xanthene, thioxanthene, nitroaryl, naphthoquinone, pyrenequinone or perylenetetracarbimide dyestuff;

$R^x$ is a hydrogen atom or an alkyl group having 1 to 4 carbon atoms, such as the methyl or ethyl group, which can be substituted by halogen, such as chlorine and bromine, hydroxyl, cyano, alkoxy having 1 to 4 carbon atoms, such as methoxy and ethoxy, alkoxycarbonyl having 2 to 5 carbon atoms, carboxyl, sulfamoyl, sulfo or sulfato, preferably the methyl or ethyl group and in particular a hydrogen atom;

n is the number of 1 or 2, preferably 1; and

Q is a group of the formula (2a) or (2b)

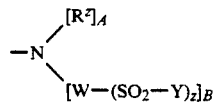

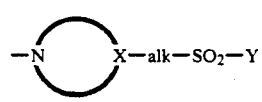

in which $R^z$ is a hydrogen atom or an alkyl group having 1 to 4 carbon atoms, such as, in particular, the methyl or ethyl group, which can be substituted by halogen, such as chlorine and bromine, hydroxyl, cyano, alkoxy having 1 to 4 carbon atoms, such as methoxy and ethoxy, carboxyl, sulfamoyl, sulfo or sulfato or by a phenyl radical which is optionally substituted by substituents from the group comprising halogen, such as chlorine and bromine, alkoxy having 1 to 4 carbon atoms, such as methoxy and ethoxy, alkyl having 1 to 4 carbon atoms, such as methyl, sulfo and carboxyl, or is a cyclohexyl radical or a phenyl radical which is optionally substituted by substituents from the group comprising halogen, such as chlorine and bromine, alkoxy having 1 to 4 carbon atoms, such as methoxy and ethoxy, alkyl having 1 to 4 carbon atoms, such as methyl, sulfo and carboxyl, W is an optionally substituted arylene radical or an alkylene-alkylene or arylene-alkylene or alkylene-arylene-alkylene or arylene-alkylene-arylene radical, in which the alkylene radicals are those having 1 to 8, preferably 2 to 6 and in particular 2 to 4, carbon atoms and can be substituted and the arylene radicals are optionally substituted phenylene or naphthylene radicals, and in which the alkylene radicals can be interrupted by 1 or more, such as 1 or 2, hetero groups, such as amino groups, or oxygen or sulfur atoms or groups of the formulae —$SO_2$—, —CO—, —$SO_2$—NH— or —CO—NH—, and the alkylene and arylene portions in the combined alkylene/arylene radicals can in each case be separated from one another by such a group, Y is the vinyl group or a $\beta$-sulfatoethyl, $\beta$-thiosulfatoethyl or $\beta$-phosphatoethyl group or a $\beta$-alkanoyloxy-ethyl group having 2 to 5 carbon atoms in the alkanoyl radical, such as the $\beta$-acetoxyethyl group, or the $\beta$-benzoyloxy-ethyl, $\beta$-(sulfobenzoyloxy)-ethyl or $\beta$-(p-toluenesulfonyloxy)-ethyl group or a $\beta$-haloethyl group, such as the $\beta$-bromoethyl or $\beta$-chloroethyl group, preferably the vinyl group and in particular the $\beta$sulfatoethyl group, z is the number 1 to 2, A is the number zero or 1 and B is the number 1 or 2, in which the sum of (A+B) equals the number 2, and in which in the case where B is 2, the groups of the formula —W—($SO_2$—Y)$_z$ can have the same meaning as one another or a different meaning to one another, X, together with the N atom, forms the bivalent radical of a heterocyclic ring consisting of 1 or 2 alkylene groups having 1 to 5 carbon atoms and if appropriate 1 or 2 hetero groups, such as nitrogen and oxygen atoms or a group —NH—, such as, for example, the piperazin-1,4-ylene or a piperidinylene radical, and alk is an alkylene radical having 1 to 4 carbon atoms, preferably 2 or 3 carbon atoms, such as the ethylene or n-propylene radical.

F is preferably the radical of a mono-or disazo dyestuff or the radical of a metal complex azo dyestuff, such as an o,o'-1:1-copper complex mono- or disazo dyestuff, or of a triphendioxazine or an anthraquinone or a phthalocyanine dyestuff, such as a copper phthalocyanine dyestuff.

The radical F can contain the substituents customary in organic dyestuffs, including fiber-reactive groups, such as, for example, those of the formula —SO$_2$—Y defined above, bonded in its basic structure. Examples of such substituents are: alkyl groups having 1 to 4 carbon atoms, such as methyl, ethyl, propyl, isopropyl or butyl, and of these preferably ethyl and in particular methyl; alkoxy groups having 1 to 4 carbon atoms, such as methoxy, ethoxy, propoxy, isopropoxy and butoxy, and of these preferably ethoxy and in particular methoxy; acylamino groups having 2 to 8 carbon atoms, such as the acetylamino, propionylamino or benzoylamino groups; primary and mono- or disubstituted amino groups, such as, for example, [lacuna] by alkyl groups having 1 to 4 carbon atoms and/or phenyl groups, such as monoalkylamino and dialkylamino groups having 1 to 4 carbon atoms in the alkyl radical and phenylamino or N-(C$_1$-C$_4$-alkyl)-N-phenyl-amino groups, in which the alkyl radicals can also be substituted, for example by phenyl, sulfophenyl, hydroxyl, sulfato, sulfo and carboxyl, and the phenyl groups can also be substituted, such as by chlorine, sulfo, carboxyl, methyl and/or methoxy, thus, for example, methylamino, ethylamino, propylamino, isopropylamino, butylamino, N,N-di-($\beta$-hydroxyethyl)-amino, N,N-di-($\beta$-sulfatoethyl)-amino, sulfobenzylamino, N,N-di-(sulfobenzyl)-amino and diethylamino groups, as well as phenylamino and sulfophenylamino groups; alkoxycarbonyl groups with an alkyl radical having 1 to 4 carbon atoms, such as methoxycarbonyl and ethoxycarbonyl; alkylsulfonyl groups having 1 to 4 carbon atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl having 1 to 4 carbon atoms, it being possible for the alkyl radicals in turn to be substituted, such as, for example, by hydroxyl, sulfato, sulfo, carboxyl, phenyl and sulfophenyl, such as, for example, N-methyl-carbamoyl and N-ethyl-carbamoyl; sulfamoyl groups, which can be mono- or disubstituted by alkyl groups having 1 to 4 carbon atoms, and N-phenyl-N-alkylsulfamoyl groups with an alkyl group having 1 to 4 carbon atoms, it being possible for these alkyl groups in turn to be substituted by hydroxyl, sulfato, sulfo, carboxyl, phenyl and sulfophenyl, such as, for example, N-methyl-sulfamoyl, N-ethyl-sulfamoyl, N-propylsulfamoyl, N-isopropyl-sulfamoyl, N-butylsulfamoyl, N-($\beta$-hydroxyethyl)-sulfamoyl and N,N-di-($\beta$-hydroxyethyl)-sulfamoyl; N-phenyl-sulfamoyl, ureido, hydroxyl, carboxyl, sulfomethyl and sulfo groups; and $\beta$-sulfatoethylsulfonyl, $\beta$-thiosulfatoethylsulfonyl, $\beta$-phosphatoethylsulfonyl, $\beta$-acetoxyethylsulfonyl, $\beta$-chloroethylsulfonyl and vinylsulfonyl groups.

The dyestuff radical F is preferably substituted by one or more, such as 2 to 4, sulfo groups, and furthermore can preferably contain substituents selected from the group comprising sulfo, methyl, ethyl, methoxy, ethoxy, alkanoylamino having 2 to 5 carbon atoms, such as acetylamino, benzoylamino, amino, chlorine, bromine, ureido, hydroxyl, carboxyl and sulfomethyl.

The fiber-reactive radical F can also contain other fiber-reactive groups which are known from the literature and do not correspond to the structure of the formula (3)

(3)

in which (R$^x$ and Q have the abovementioned meanings. Examples of such known fiber-reactive groups are a group of the vinylsulfone series, such as the group, already mentioned above, of the formula —SO$_2$—Y, where Y has the above meaning, which can be bonded to F via an alkylene radical having 1 to 4 carbon atoms, such as a methylene group, or via a methylamino or ethylamino group, or a low molecular weight alkenoylamino or alkenesulfonylamino radical substituted by an atom which can be split off or a group which can be split off, or a carbocyclic, carbocyclic-heterocyclic or heterocyclic radical which is substituted by an atom which can be split off or a group which can be split off and is bonded to the radical A via a carbonylamino or sulfonylamino group, the heterocyclic portions of these radicals being four-, five- or six-membered, or a triazinyl or pyrimidinyl radical bonded to the radical A via an amino, methylamino or ethylamino group and substituted via an atom which can be split off or a group which can be split off. Examples of such radicals are a halogen-substituted six-membered heterocyclic radical bonded via an amino, methylamino or ethylamino group, such as, for example, a halotriazinyl or halopyrimidinyl radical, or aliphatic acylamino radicals, such as a haloacetylamino or halopropionylamino radical.

Examples of formula radicals R$^x$ are: hydrogen, methyl, ethyl, propyl, isopropyl, butyl, isobutyl, sec.-butyl, tert.-butyl, carboxylmethyl, $\beta$-carboxyethyl, $\beta$-carboxypropyl, methoxycarbonylmethyl, ethoxycarbonylmethyl, $\beta$-methoxyethyl, $\beta$-ethoxyethyl, $\beta$-methoxypropyl, $\beta$-chloroethyl, $\gamma$-bromopropyl, $\beta$-hydroxyethyl, $\beta$-hydroxybutyl, $\beta$-cyanoethyl, sulfomethyl, $\beta$-sulfoethyl, amidosulfonylmethyl and $\beta$-sulfatoethyl.

Examples of formula radicals R$^z$ are: hydrogen, methyl, ethyl, carboxymethyl, carbomethoxymethyl, carbethoxymethyl, sulfomethyl, sulfamidomethyl, $\beta$-carboxyethyl, $\beta$-sulfoethyl, n-propyl, $\beta$-carboxypropyl, $\beta$-sulfatoethyl, $\beta$-ethoxyethyl, $\beta$-methoxypropyl, $\gamma$-chloropropyl, $\gamma$-bromopropyl, n-butyl, isobutyl, n-pentyl, n-hexyl, n-nonyl, n-dodecyl, n-hexadecyl, n-pentadecyl, cyclohexyl, phenyl, 2-chlorophenyl, 3-chlorophenyl, 4-chlorophenyl, 2- or 3- or 4-sulfophenyl, 2-methyl-phenyl, 4-methoxy-phenyl, 3-methyl-phenyl and 4-ethyl-phenyl. Of these, the optionally substituted alkyl groups are preferred, and the methyl and ethyl group and the hydrogen atom are particularly preferred.

Examples of groups of the formula (2a) and (2b) are, for example: 2-($\beta$-sulfatoethylsulfonyl)-phenyl-amino, 3-($\beta$-sulfatoethylsulfonyl)-phenyl-amino, 4-($\beta$-sulfatoethylsulfonyl)-phenyl-amino, 2-carboxy-5-($\beta$-sulfatoethylsulfonyl)-phenyl-amino, 2-chloro-3-($\beta$-sulfatoethylsulfonyl)-phenyl-amino, 2-chloro-4-($\beta$-sulfatoethylsulfonyl)-phenyl-amino, 2-ethoxy-4- or -5-($\beta$-sulfatoethylsulfonyl)-phenyl-amino, 2-ethyl-4-($\beta$-sulfatoethylsulfonyl)-phenyl-amino, 2-methoxy-5-($\beta$-sulfatoethylsulfonyl)-phenyl-amino, 2,4-diethoxy-5-($\beta$-sulfatoethylsulfonyl)-phenyl-amino, 2,4-dimethoxy-5-($\beta$-sulfatoethylsulfonyl)-phenyl-amino, 2,5-dimethoxy-4-($\beta$-sulfatoethylsulfonyl)-phenyl-amino, 2-methoxy-5-methyl-4-($\beta$-sulfatoethylsulfonyl)-phenyl-amino, 2- or 3- or 4-($\beta$-sulfatoethylsulfonyl)-phenyl-amino, 2methoxy-5-($\beta$-sulfatoethylsulfonyl)-phenyl-amino, 2-sulfo-4-($\beta$-phosphatoethylsulfonyl)-phenyl-amino, 2-sulfo-4-vinylsulfonyl-phenyl-amino, 2-hydroxy-4- or -5-($\beta$-sulfatoethylsulfonyl)-phenyl-amino, 2-chloro-4- or -5-($\beta$-chloroethylsulfonyl)-phenyl-amino, 2-hydroxy-3-sulfo-5-($\beta$-sulfatoethylsulfonyl)-phenyl-amino, 3- or 4-($\beta$-acetoxyethylsulfonyl)-phenyl-amino, 2-methoxy-4-[$\beta$-(N-methyltauryl)-ethylsulfonyl]-phenyl-amino, 5-($\beta$-sulfatoethylsulfonyl)naphth-2-yl-amino, 6- or 7- or 8-($\beta$-sulfatoethylsulfonyl)-naphth-2-yl-amino, 6-($\beta$-sulfatoethylsulfonyl)-1-sulfo-naphth-2-yl-amino, 5-($\beta$sulfatoethylsulfonyl)-1-sulfo-naphth-2-yl-amino, 8-($\beta$sulfatoethylsulfonyl)-6-sulfo-naphth-2-yl-amino, $\beta$-[4-($\beta$sulfatoethylsulfonyl)-phen]-ethylamino, $\beta$-[2-sulfo-4-($\beta'$-sulfatoethylsulfonyl)-phen]-ethylamino, $\beta$-($\beta'$-chloroethylsulfonyl)-ethylamino, $\beta$-($\beta'$-sulfatoethylsulfonyl)-ethylamino, $\beta$-(vinylsulfonyl)-ethylamino, $\gamma$-($\beta'$-chloroethylsulfonyl)-propylamino, $\gamma$-($\beta'$-sulfatoethylsulfonyl)-propylamino, $\gamma$-($\beta'$-bromoethylsulfonyl)-propylamino, $\gamma$-(vinylsulfonyl)-propylamino, 1-methyl-1-($\beta$-sulfatoethylsulfonyl)-1-ethylamino, $\delta$-($\beta'$-sulfatoethylsulfonyl)-butylamino, 2-methyl-2-($\beta$-chloroethylsulfonyl)-1-propylamino, $\omega$-($\beta'$-chloroethylsulfonyl)-pentylamino, $\beta$-($\beta'$-chloroethylsulfonyl)-n-hexylamino, N-methyl-N-[$\beta$-($\beta'$-chloroethylsulfonyl)-ethyl]-amino, N-ethyl-N-[$\beta$-($\beta'$-chloroethylsulfonyl)-ethyl]-amino, N-n-propyl-N-[$\beta$-($\beta'$-chloroethylsulfonyl)-ethyl]-amino, N-n-butyl-N-[$\beta$-($\beta'$-chloroethylsulfonyl)-ethyl]-amino, N-n-pentyl-N-[$\beta$-($\beta'$-chloroethylsulfonyl)-ethyl]-amino, N-n-hexyl-N-[$\beta$-($\beta'$-chloroethylsulfonyl)-ethyl]-amino, N-n-nonyl-N-[$\beta$-($\beta'$-chloroethylsulfonyl)-ethyl]-amino, N-n-dodecyl-N-[$\beta$-($\beta'$-chloroethylsulfonyl)-ethyl]-amino, N-n-hexadecyl-N-[$\beta$-($\beta'$-chloroethylsulfonyl)-ethyl]-amino, N-n-octadecyl-N-[$\beta$-($\beta'$-chloroethylsulfonyl)-ethyl]-amino, N-carboxymethyl-N-[$\beta$-($\beta'$-bromoethylsulfonyl)-ethyl]-amino, N-sulfatomethyl-N-[$\beta$-($\beta'$-chloroethylsulfonyl)-ethyl]-amino, N-($\beta$-carboxyethyl)-N-[$\gamma'$-($\beta''$-chloroethylsulfonyl)-propyl]-amino, N-($\beta$-sulfatoethyl)-N-[$\gamma'$-($\beta''$-chloroethylsulfonyl)-propyl]-amino, N-($\beta$-sulfatoethyl)-N-[$\delta'$-($\beta''$-chloroethylsulfonyl)-butyl]-amino, N-($\beta$-ethoxyethyl)-N-[$\delta'$-($\beta''$-chloroethylsulfonyl)-butyl]-amino, N-($\gamma$-chloropropyl)-N-[$\beta'$-($\beta''$-chloroethylsulfonyl)-ethyl]-amino, N-phenyl-N-[$\beta$-($\beta'$-chloroethylsulfonyl)-ethyl]-amino, N-(4-chlorophenyl)-N-[$\beta$-($\beta'$-chloroethylsulfonyl)-ethyl]-amino, N-(2-methylphenyl)-N-[$\beta$-($\beta'$-chloroethylsulfonyl)-ethyl]-amino, N-(4-methoxyphenyl)-N-[$\beta$-($\beta'$-chloroethylsulfonyl)-ethyl]-amino, N-(3-sulfophenyl)-N-[$\beta$-($\beta'$-chloroethylsulfonyl)-ethyl]-amino, N-(4-sulfophenyl)-N-[$\beta$-($\beta'$-chloroethylsulfonyl)-ethyl]-amino, bis-[$\beta$-($\beta'$-chloroethylsulfonyl)-ethyl]-amino, bis-[$\beta$-($\beta'$-bromoethylsulfonyl)-ethyl]-amino, bis-[$\gamma$-($\beta'$-chloroethylsulfonyl)-propyl]-amino, bis-[$\delta$-($\beta'$-chloroethylsulfonyl)-butyl]-amino, bis-($\beta$-vinylsulfonyl-ethyl)-amino, N-($\beta$-cyanoethyl)-N-[$\gamma'$-($\beta''$-chloroethylsulfonyl)-propyl]-amino, $\beta$-[$\beta'$-($\beta''$-chloroethylsulfonyl)-ethylamino]-ethylamino, $\beta$-[$\beta'$-($\beta''$-sulfatoethylsulfonyl)-ethylamino]-ethylamino, $\beta$-[$\beta'$-($\beta''$-chloroethylsulfonyl)-ethoxy]-ethylamino, $\beta$-[$\beta'$-($\beta''$-sulfatoethylsulfonyl)-ethoxy]-ethylamino, 4-[$\beta$-($\beta'$-chloroethylsulfonyl)-ethyl]-piperazin-1-yl, 4-[$\gamma$-($\beta'$-chloroethylsulfonyl)-propyl]-piperazin-1-yl, 4-[$\beta$-($\beta'$-sulfatoethylsulfonyl)-ethyl]-piperazin-1-yl, 4-[$\gamma$-($\beta'$-sulfatoethylsulfonyl)-propyl]-piperazin-1-yl, 4-N-{N-[$\beta$-(4'-$\beta'$-sulfatoethylsulfonyl-phenyl)-ethyl]-amidocarbonylmethoxy}-phenylamino, 4-{N-[3'- or -4'-($\beta$-sulfatoethylsulfonyl)-phenyl]-amidocarbonyl-methoxy}-phenylamino, 3,4-di-($\beta$-sulfatoethylsulfonyl)-phenylamino, 2,5-di-($\beta$-sulfatoethylsulfonyl)-phenylamino, 4-[$\gamma$-($\beta'$-sulfatoethylsulfonyl)-propoxy]-phenylamino, 2,5-bis-[($\beta$-sulfatoethylsulfonyl)-methyl]-phenylamino, 3- or 4-{N-($\gamma$-($\beta'$-sulfatoethylsulfonyl)-propyl-amidocarbonyl]}-phenylamino, 3,5-bis-{N-[$\gamma$-($\beta'$-sulfatoethylsulfonyl)-propyl-amidocarbonyl]}-phenylamino, 3-sulfo-4-{[N-$\gamma$-($\beta'$-sulfatoethylsulfonyl)-propyl-amidocarbonyl]-methoxy}phenylamino and 4-{[N-$\gamma$-($\beta'$-sulfatoethylsulfonyl)-propyl-amidocarbonyl]-methoxy}-phenylamino.

In the bridge member W, arylene radicals are preferably phenylene and naphthylene radicals, which can contain one or more, such as 1, 2 or 3, preferably 1 or 2, substituents which belong, for example, to the group of substituents comprising alkyl having 1 to 4 carbon atoms, such as methyl and ethyl, halogen, such as fluorine, chlorine and bromine, hydroxyl, cyano, alkoxy having 1 to 4 carbon atoms, such as methoxy and ethoxy, carboxyl, sulfamoyl, sulfo, trifluoromethyl and alkoxycarbonyl having 2 to 5 carbon atoms, such as methoxycarbonyl and ethoxycarbonyl. W here is preferably a phenylene radical, which can be substituted by the abovementioned substituents, substituents from the group comprising alkyl having 1 to 4 carbon atoms, chlorine, alkoxy having 1 to 4 carbon atoms, carboxyl and sulfo being preferred.

Alkylene radicals in the bonding member W are preferably straight-chain or branched alkylene groups having 2 to 6 carbon atoms, which can be interrupted by the hetero groups mentioned, such as 1 or 2 of these hetero groups. Of these, straight-chain alkylene groups having 2 to 4 carbon atoms or an alkylene group having 4 carbon atoms and interrupted by an oxygen atom or an amino or methylamino group are preferred. Of the alkylene groups, the 1,3-propylene radical is particularly preferred. Substituents in the alkylene groups of W can be, for example, sulfo, carboxyl, hydroxyl and cyano groups.

In the formula radical W is an alkylene-arylene or an alkylene-arylene-alkylene radical, in these groups the alkylene radical is preferably a straight-chain alkylene radical having 1 to 3 carbon atoms and the arylene radical is preferably a 1,3- or in particular 1,4-phenylene radical. Alkylene-arylene radicals are, in particular, the radicals of the formulae —CH$_2$—CH$_2$-phenylene- and —CH$_2$-phenylene-.

The fiber-reactive grouping of the formula (3) is preferably a radical of the formula (3a) or particularly preferably a radical of the formula (3b)

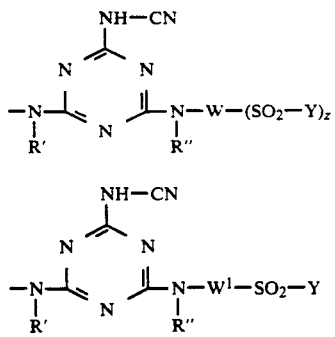

in which, in formula (3a), R' is the methyl or ethyl group or in particular a hydrogen atom, R" is a hydrogen atom or the methyl or ethyl group and W, Y and z have the abovementioned particularly preferred meanings, and in formula (3b), R' is the methyl or ethyl group or in particular a hydrogen atom, R" is the methyl group or in particular a hydrogen atom, Y has the abovementioned particularly preferred meaning and $W^1$ is an alkylene group having 2 to 4 carbon atoms, preferably 2 or in particular 3 carbon atoms, or is a phenylene radical which can be substituted by 1 or 2 substituents from the group comprising methyl, methoxy, ethoxy and chlorine, and of these preferably the 1,3- or 1,4-phenylene radical, or is a group of the formula (a)

$$-(CH_2)_w-phenylene- \tag{a}$$

in which w is the number 1, 2, 3 or 4, preferably 2, and phenylene is the 1,3- or 1,4-phenylene radical.

Important azo dyestuffs corresponding to the formula (1) are those in which A is a radical of a dyestuff of the benzene-azo-naphthol, the benzene-azo-1-phenyl-5-pyrazolone, the benzene-azo-benzene, the naphthalene-azo-benzene, the benzene-azo-aminonaphthalene, the naphthaleneazo-naphthalene, the naphthalene-azo-1-phenyl-5-pyrazolone, the benzene-azo-pyridone or the naphthalene-azo-pyridone series, the dyestuffs containing sulfo groups also being preferred here.

Of the 1:1 copper complex azo dyestuffs according to the invention, those of the benzene and naphthalene series are preferred.

Preferred mono- and disazo dyestuffs of the formula (1) are those of the formulae (4a), (4b) and (4c)

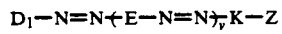 (4a)

 (4b)

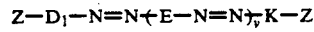 (4c)

and the heavy metal complex compounds derived therefrom, such as 1:1 copper complex compounds, in which
  $D_1$ is the radical of a diazo component of the benzene or naphthalene series,
  E is the radical of a central component of the benzene or naphthalene series,
  K is the radical of a coupling component of the benzene, naphthalene, pyrazolone, 6-hydroxy-2-pyridone or acetoacetic acid arylamide series,
in which $D_1$, E and K can contain substituents customary for azo dyestuffs, such as, for example, hydroxyl, amino, methyl, methoxy, ethoxy, sulfo, and carboxyl groups, optionally substituted alkanoylamino groups having 2 to 4 carbon atoms in the alkanoyl radical, optionally substituted benzoylamino groups and halogen atoms, such as bromine and chlorine atoms, and $D_1$, E and K together have at least two sulfo groups, preferably three or four sulfo groups,
  v is the number zero or 1 and
  Z is a group of the formula (3) or preferably of the formula (3a) or (3b).

Compounds which are furthermore preferred are the disazo dyestuffs of the formula (4d) or (4e)

$$D_1-N=N-K^o-N=N-D_2-Z \tag{4d}$$

$$Z-D_1-N=N-K^o-N=N-D_2-Z \tag{4e}$$

in which $D_1$ and $D_2$ independently of one another are the radical of a diazo compound of the benzene or naphthalene series and $K^o$ is the radical of a bivalent coupling component of the naphthalene series, it being possible for $D_1$, $D_2$ and $K^o$ to carry the substituents customary for azo dyestuffs, such as those already mentioned above, $D_1$, $D_2$ and $K^o$ together containing at least two sulfo groups, preferably three or four sulfo groups.

Such azo dyestuffs of the formula (1) are, in particular, dyestuffs of the formula (4f), (4g) and (4h)

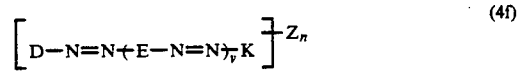 (4f)

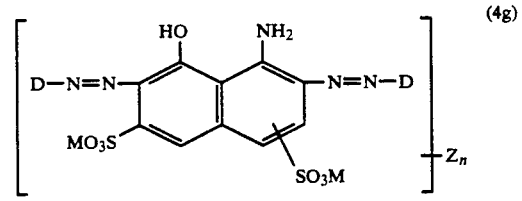 (4g)

 (4h)

in which
  D in each case is the radical of a diazo component, which can have meanings which are identical to one another or different from one another, such as, for example, a radical $D_1$ having the above meaning,
  E is the bivalent radical of a diazotizable compound which can undergo coupling, for example having the above meaning,
  K is the radical of a coupling component, for example having the above meaning,
  v is the number zero or 1,
  z is a radical of the formula (3) or (3a) or (3b),
  n is the number 1 or 2, preferably 1, and the radical Z is bonded to the radical D or the radical K or, in the case where N=2, is bonded in each case to D and K or to both D, and
  M is a hydrogen atom or an alkali metal, such as sodium, potassium or lithium.

The present invention furthermore relates to processes for the preparation of the dyestuffs of the formula (1) according to the invention. They can be prepared in a manner which is customary per se by routes analogous to known synthesis routes specific for the particular class of dyestuff, by reacting the typical precursors for the particular dyestuff, at least one of which contains a group of the formula (3), with one another, or by starting from a starting compound containing amino groups, of the formula (55)

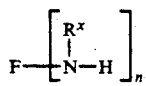
(55)

in which F, $R^x$ and n have the abovementioned meanings, and reacting this with a trihalo-s-triazine of the formula (56)

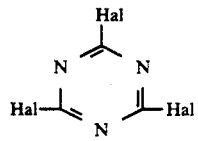
(56)

in which Hal is a halogen atom, such as, in particular, a chlorine or fluorine atom, with cyanamide or an alkali metal salt thereof and with an amine of the formula H-Q, where Q has the abovementioned meaning, in stoichiometric amounts in any desired sequence, and if appropriate subsequently carrying out further necessary conversion reactions which are familiar to the expert.

In particular, the dyestuffs according to the invention can be prepared according to the invention by reacting a compound corresponding to the formula (57)

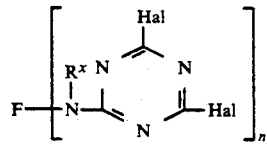
(57)

in which R, $R^x$ and n have the abovementioned meanings and Hal is a halogen atom, such as, in particular, a chlorine or fluorine atom, with cyanamide or an alkali metal salt thereof, and reacting the resulting compound of the formula (58)

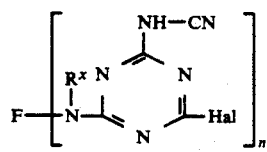
(58)

in which F, $R^x$ and Hal have the abovementioned meanings, with an amine of the formula H-Q, where Q has the abovementioned meaning, or reacting a compound of the formula (59)

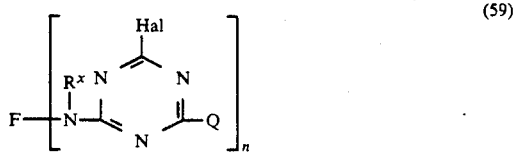
(59)

in which F, $R^x$, Hal, Q and n have the abovementioned meanings, with cyanamide or an alkali metal salt thereof, or reacting a compound of the formula (55) with a compound of the formula (60)

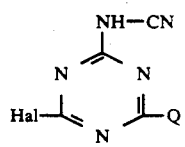
(60)

where Hal and Q have the abovementioned meaning.

The reaction of a starting compound of the formula (58) with the amine of the formula H-Q is carried out in an aqueous or aqueous-organic medium in suspension or solution at a temperature between 30° and 100° C., preferably between 65° and 85° C., and at a pH between 3 and 11.5, preferably between 3.5 and 7. If the reaction is carried out in an aqueous-organic medium, the organic medium is, for example, acetone, dimethylformamide or N-methyl-pyrrolidone. The hydrogen halide liberated during the condensation is advantageously neutralized continuously by addition of aqueous alkali metal hydroxides, carbonates or bicarbonates.

The reaction of the compound of the formula (55) with the compound of the formula (60) is preferably carried out at a temperature between 25° and 90° C., in particular between 45° and 75° C., and at a pH between 3 and 11.5, in particular between 3.5 and 6.5.

Apart from being prepared by reaction of a compound of the formula (57) with cyanamide, compounds of the formula (58) can also be prepared by reacting, analogously to known procedures, a corresponding 2,4-dihalo-6-cyanamido-s-triazine with a starting compound of the formula (55) or, also analogously to known procedures, by reaction of a dyestuff precursor which is customary for the dyestuff type but contains a group of the formula (61)

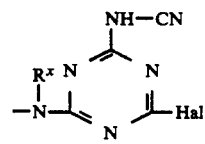
(61)

in which $R^x$ and Hal have the abovementioned meanings, with another precursor optionally containing a group of the formula (61).

The amine of the formula H-Q is as a rule employed in the reactions in the form of a salt, such as a sulfate or preferably in the form of the hydrochloride.

If diazo and coupling components of which one or both contain a group of the formula (3) are used as starting substances in the azo dyestuff synthesis according to the invention, the reactions are carried out by the customary procedure of diazotization and coupling reactions, thus the diazotization is as a rule carried out at a temperature between −5° C. and +15° C. and at a pH below 2, by means of a strong acid and an alkali metal nitrite in a preferably aqueous medium, and the coupling reaction is as a rule carried out at a pH between 1.5 and 4.5 in the case of a coupling component which contains an amino group, and at a pH between 3 and 7.5 in the case of a coupling component which contains a hydroxyl group, and at a temperature between 0° and 25° C., likewise preferably in an aqueous medium.

Examples of starting compounds which can be used as diazo components are: aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- -4-sulfonic acid amide, N-methylamide, N-ethylamide, N,N-dimethylamide or N,N-diethylamide, dehydrothio-p-toluidinesulfonic acid, 1-amino-4-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- or -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7,-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-dimethylbenzene, 1,4diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminodiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminoanphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-daiminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'-aminobenzoylamino)-1-aminobenzene-6-sulfonic acid, 3-(4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 2-(β-sulfatoethylsulfonyl)-phenylaniline, 3-(β-sulfatoethylsulfonyl)-phenylaniline, 4-(β-sulfatoethylsulfonyl)-phenylaniline, 2-carboxy-5-(β-sulfatoethylsulfonyl)-aniline, 2chloro-3-(β-sulfatoethylsulfonyl)-aniline, 2chloro-4-(β-sulfatoethylsulfonyl)-aniline, 2-ethoxy-4- or -5-(β-sulfatoethylsulfonyl)-aniline, 2-ethyl-4-(β-sulfatoethylsulfonyl)-aniline, 2-methoxy-5-(β-sulfatoethylsulfonyl)-aniline, 2,4-diethoxy-5-(β-sulfatoethylsulfonyl)-aniline, 2,4-dimethoxy-5-(β-sulfatoethylsulfonyl)-aniline, 2,5-dimethoxy-4-(β-sulfatoethylsulfonyl)-aniline, 2-methoxy-5-methyl-4-(β-sulfatoethylsulfonyl)-aniline, 2- or 3- or 4-(β-thiosulfatoethylsulfonyl)-aniline, 2-methoxy-5-(β-thiosulfatoethylsulfonyl)-aniline, 2-sulfo-4-(β-phosphatoethylsulfonyl)-aniline, 2-sulfo-4-vinylsulfonyl-aniline, 2-hydroxy-4- or -5-(β-sulfatoethylsulfonyl)-aniline, 2-chloro-4- or -5-(β-chloroethylsulfonyl)-aniline, 2-hydroxy-3-sulfo-5-(β-sulfatoethylsulfonyl)-aniline, 3- or 4-(β-acetoxyethylsulfonyl)-aniline, 2-methoxy-4-[β-(N-methyl-tauryl)-ethylsulfonyl]-aniline, 5-(β-sulfatoethylsulfonyl)-2-amino-naphthalene, 6- or 7- or 8-(β-sulfato-ethylsulfonyl)-2-amino-naphthalene, 6-(β-sulfatoethyl-sulfonyl)-1-sulfo-2-amino-naphthalene, 5-(β-sulfatoethylsulfonyl)-1-sulfo-2-amino-naphthalene and 8-(β-sulfatoethylsulfonyl)-6-sulfo-2-amino-naphthalene.

If an amino-acetylamino compound is employed instead of a diamine as the diazo component in the synthesis according to the invention and the acetyl group is subsequently split off again from this by hydrolysis, the monoacetyl compounds of the abovementioned diazo components are suitable, such as, for example, 1- acetylamino-3-aminobenzene-4-sulfonic acid and 1-acetylamino-4-aminobenzene-3sulfonic acid.

Examples of coupling components which can be used for the synthesis of the azo dyestuffs according to the invention are: phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hyroxynaphthalene-3,6- or -4,6-disulfonic acid, 2-benzoylamino-5-hyroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methylamino- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfophenyl)-2'-yl)-3-methyl-5-pyrazolone, 1-(5',7'-disulfophenyl)-2'-yl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis(2'-hydroxyethylamino)-3-cyano-4-methylpyridine, 1-ethyl-3-carbonyl-4-methyl-6-hydroxy-2-pyridone, 1-ethyl-3-sulfomethyl-4-methyl-5-carbonyl-6-hydroxy-2-pyridone, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-($\beta$-aminoethyl)-3-cyano-4-methyl-6-hydroxy-2-pyridone, 1-($\gamma$-aminopropyl)-3-sulfomethyl-4-methyl-6-hydroxy-2-pyridone, 1,3-diaminobenzene, 1-amino-3-N,N-di($\beta$-hydroxyethyl)-aminobenzene, 1-amino-3-N,N-di($\beta$-sulfatoethyl)-aminobenzene, 1-amino-3-N,N-di($\beta$-hydroxyethyl)-amino-4-methoxybenzene, 1-amino-3-N,N-di($\beta$-sulfatoethyl)-amino-4-methoxybenzene, 1-amino-3-sulfo-benzylamino-benzene, 1-amino-3-sulfo-benzylamino--4-chlorobenzene, 1-amino-3-N,N-di(sulfobenzyl)-aminobenzene, 2-(4-$\beta$-sulfatoethylsulfonyl-phenyl)-3-methyl-5-pyrazolone and 1-(4-$\beta$-sulfatoethylsulfonyl-phenyl)-3-carboxy-5-pyrazolone.

Examples of aromatic radicals D and $D_1$ of the diazo components $D-NH_2$ and $D_1-NH_2$ which do not carry a fiber-reactive group of the formula (3) are those of the amines of the formulae (5a) and (5b)

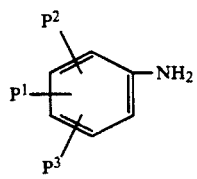

(5a)

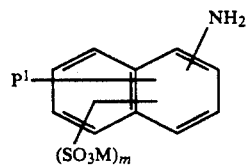

(5b)

in which $P^1$ is hydrogen, sulfo or a group of the formula $-SO_2-Y$, where Y has the abovementioned meaning, $P^2$ is hydrogen, methyl, ethyl, methoxy, ethoxy, alkanoyl having 2 to 5 carbon atoms, such as acetyl and proionyl, cyano, carboxyl, sulfo, alkoxycarbonyl having 2 to 5 carbon atoms, carbamoyl, N-($C_1$-$C_4$-alkyl)-carbamoyl, fluorine, chlorine, bromine or trifluoromethyl, $P^3$ is hydrogen, methyl, ethyl, methoxy, ethoxy, cyano, carboxyl, sulfo, alkanoylamino having 2 to 5 carbon atoms, such as acetylamino, alkoxycarbonyl having 2 to 5 carbon atoms, carbamoyl, N-($C_1$-$C_4$-alkyl)-carbamoyl, fluorine, chlorine, nitro, sulfamoyl, N-($C_1$-$C_4$-alkyl)-sulfamoyl, alkylsulfonyl having 1 to 4 carbon atoms, phenylsulfonyl or phenoxy, in which the benzene or naphthalene nucleus can also contain a hydroxyl group in the ortho-position relative to the $NH_2$ group, m is the number zero, 1 or 2 (this group being hydrogen atom in the case where m is zero) and M has the abovementioned meaning.

Of these, $P^2$ is preferably hydrogen, methyl, methoxy, bromine, chlorine, carboxyl or sulfo, and $P^3$ is preferably hydrogen, methyl, methoxy, chlorine, carboxyl, sulfo or acetylamino.

The "sulfo", "carboxyl", "phosphato", "thiosulfato" and "sulfato" groups include both the acid form thereof and the salt form thereof. Accordingly, sulfo groups are groups corresponding to the formula $-SO_3M$, carboxyl groups are groups corresponding to the formula —COOM, phosphato groups are groups corresponding to the formula —OPO₃M₂, thiosulfato groups are groups corresponding to the formula —S—SO₃M and sulfato groups are groups corresponding to the formula —OSO₃M, in each case where M has the abovementioned meaning.

Examples of aromatic amines of the formula D—NH₂ or D₁—NH₂ corresponding to the formulae (5a) and (5b) are: 2-amino- or 4-aminobenzoic acid, 3-amino-benzoic acid, 3-chloroaniline-6-carboxylic acid, aniline-2- or -3- or -4-sulfonic acid, 2,5-disulfo-aniline, 2,4-disulfo-aniline, 3,5-disulfoaniline, 2-aminotoluene-4-sulfonic acid, 2-amino-anisole-4-sulfonic acid, 2-amino-anisole-5-sulfonic acid, 4-amino-anisole-2-sulfonic acid, 2-ethoxy-aniline-5-sulfonic acid, 2-ethoxy-aniline-4-sulfonic acid, 4-sulfo-2-aminobenzoic acid, 2,5-dimethoxy-aniline-4-sulfonic acid, 2,4-dimethoxyaniline-5-sulfonic acid, 2-methoxy-5-methyl-aniline-4-sulfonic acid, 4-amino-anisole-3-sulfonic acid, 4-aminotoluene-3-sulfonic acid, 2-amino-toluene-5-sulfonic acid, 2chloro-aniline-4-sulfonic acid, 2chloro-aniline-5-sulfonic acid, 2-bromoaniline-4-sulfonic acid, 2,6-dichloroaniline-4-sulfonic acid, 2,6-dichloroaniline-3-sulfonic acid or -4-sulfonic acid, 3-acetylamino-6-sulfoaniline, 4-acetylamino-2-sulfo-aniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 4-(β-sulfatoethylsulfonyl)-aniline, 3-(β-sulfatoethylsulfonyl)-aniline, 2-sulfo-5-(β-sulfatoethylsulfonyl)-aniline, 2-sulfo-4-(β-sulfatoethylsulfonyl)-aniline, 2-methoxy-5-(β-sulfatoethylsulfonyl)-aniline, 2-methoxy-5-methyl-4-(β-sulfatoethylsulfonyl)-aniline, 2,5-dimethoxy-4-(β-sulfatoethylsulfonyl)-aniline, 2-amino-5-(β-sulfatoethylsulfonyl)-phenol, 2-amino-4-(β-sulfatoethylsulfonyl)-phenol, 2-amino-6-(β-sulfatoethylsulfonyl)-naphthalene-8-sulfonic acid, 2-amino-8-(β-sulfatoethylsulfonyl)-naphthalene-6-sulfonic acid, 2-amino-5-(β-sulfatoethylsulfonyl)-naphthalene-7-sulfonic acid and 2-amino-7-(β-sulfatoethylsulfonyl)-naphthalene-5-sulfonic acid.

Aromatic amines of the diazo component Z—D—NH₂ or Z—D₁—NH₂ or Z—D₂—NH₂ having the fiber-reactive radical Z are preferably based on aromatic amines of the formulae (6a) and (6b)

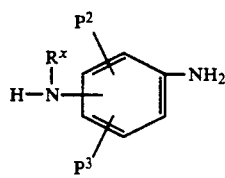
(6a)

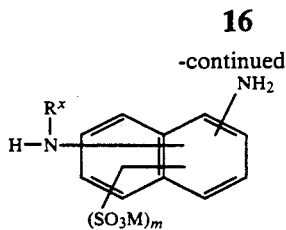
(6b)

in which $R^x$, M, m, $P^2$ and $P^3$ have the abovementioned particularly preferred meanings, it being possible for the benzene nucleus in formula (6a) and (6b) additionally to contain a hyroxyl group in the ortho-position relative to the amino group —NH₂.

Examples of amines of the formulae (6) are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methyl-benzene, 1,4-diamino-2-methoxybenzene, 1,3-diamino-4-methylbenzene, 1,5-diamino-4-methylbenzene-2-sulfonic acid, 1,5-diamino-4-methoxybenzene-2-sulfonic acid, 1,3-diaminobenzene-5-sulfonic acid, 1,3-diamino-5-methylbenzene, 2,6-diamino-naphthalene, 2,6-diamino-naphthalene-4,8-disulfonic acid, 2-amino-5-methylamino-naphthalene-1-sulfonic acid, 2-amino-5-methylamino-naphthalene-1,7-disulfonic acid and 1,4-diamino-naphthalene-6-sulfonic acid.

Preferred radicals D, D₁ or D₂ without or with the radical Z are, in the formulae (4a) to (4g), those of the formulae (5c) and (5d) or (5g) and, in formula (4h), those of the formulae (5e) and (5f) or (5h):

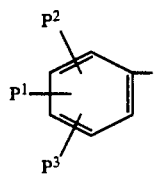
(5c)

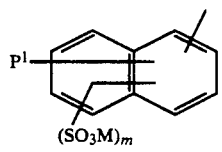
(5d)

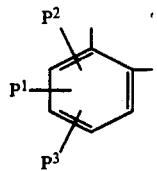
(5e)

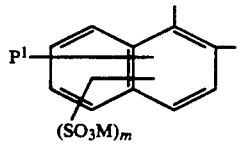
(5f)

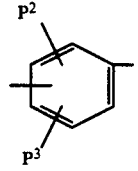
(5g)

-continued

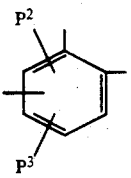
(5h)

in which $P^1$, $P^2$, $P^3$, m and M have the abovementioned meanings.

Examples of aromatic radicals E of a diazotizable compound which can undergo coupling, of the formula H—E—NH$_2$, are those of the formulae (7a), (7b) and (7c)

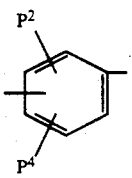
(7a)

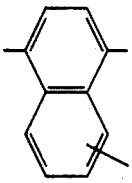
(7b)

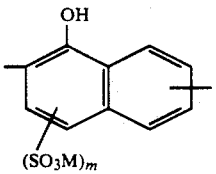
(7c)

in which
P$^2$ and M have the abovementioned meanings,
P$^4$ is hydrogen, alkyl having 1 to 4 carbon atoms, such as methyl or ethyl, alkoxy having 1 to 4 carbon atoms, such as methoxy or ethoxy, chlorine, alkanoylamino having 2 to 5 carbon atoms, such as acetylamino or propionylamino, benzoylamino, ureido, phenylureido, alkylureido having 1 to 4 carbon atoms in the alkyl radical, phenylsulfonyl or alkylsulfonyl having 1 to 4 carbon atoms and
m is the number zero, 1 to 2 (this group being hydrogen in the case where m is zero).

Examples of compounds of the formula H—E—NH$_2$ are: aniline, 3methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetyl-aminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylamino-aniline, 2,3-dimethylaniline, 3,5-dimethylaniline, 1-amino-2-methoxy-5-acetylamino-benzene, 3-propionylamino-aniline, 3-butyrylamino-aniline, 2-sulfo-5-acetylamino-aniline, 2-amino-5-naphthol-7-sulfonic acid and 2-amino-8-naphthol-6-sulfonic acid.

The radicals K of the coupling component preferably originate from the aniline, naphthalene, pyrazole or acylacetarylide series; they can contain fiber-reactive groups.

Examples of coupling components of the formula H-K of the aniline and naphthalene series are the anilines, N-mono- and N,N-disubstituted anilines, m-phenylenediamines and derivatives thereof, naphtholsulfonic acids, aminonaphthalenes, naphthols, hydroxynaphthoic acid derivatives, aminonaphthalenesulfonic acids or aminonaphtholsulfonic acids.

Examples of coupling components of the formula H-K which carry no fiber-reactive group of the formula (3) are compounds of the formula (8a) to (8g)

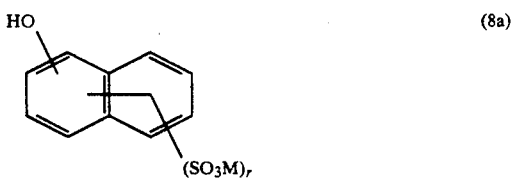
(8a)

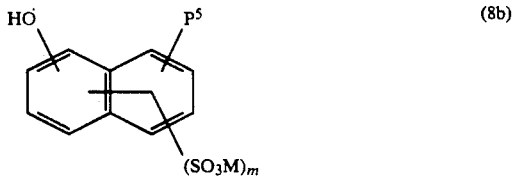
(8b)

(8c)

(8d)

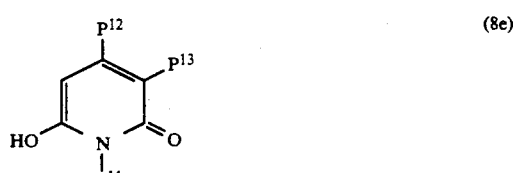
(8e)

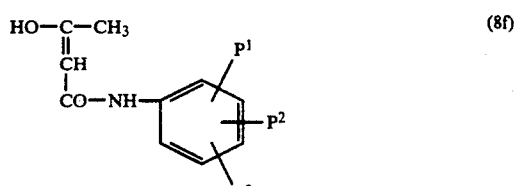
(8f)

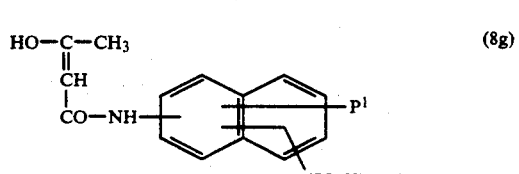
(8g)

in which $P^1$, $P^2$, $P^3$, m and M have the abovementioned meanings, r is the number zero, 1, 2 or 3 (this group being hydrogen in the case where r is zero), $R^5$ is alkylureido with alkyl groups having 1 to 6 carbon atoms, phenylureido, phenylureido which is substituted in the phenyl radical by chlorine, methyl, methoxy, nitro, sulfo and/or carboxyl and/or a group —$SO_2$—Y, where Y has the above meaning, alkanoylamino having 2 to 7 carbon atoms, such as, for example, acetylamino and propionylamino, cyclohexanoylamino, benzoylamino or benzoylamino which is substituted in the benzene radical by chlorine, methyl, methoxy, nitro, sulfo and/or carboxyl and/or a group —$SO_2$—Y, where Y has the above meaning, $P^6$ is hydrogen, alkyl having 1 to 4 carbon atoms, such as methyl and ethyl, alkoxy having 1 to 4 carbon atoms, such as methoxy and ethoxy, bromine, chlorine or alkanoylamino having 2 to 7 carbon atoms, such as acetylamino and propionylamino, $P^7$ is hydrogen, alkyl having 1 to 4 carbon atoms, such as methyl and ethyl, alkoxy having 1 to 4 carbon atoms, such as methoxy and ethoxy, chlorine or alkanoylamino having 2 to 7 carbon atoms, such as acetylamino and propionylamino, ureido or phenylureido, $P^8$ is hydrogen or alkyl having 1 to 4 carbon atoms, which can be substituted by hydroxyl, cyano, carboxyl, sulfo, sulfato, methoxycarbonyl, ethoxycarbonyl or acetoxy, $P^9$ is alkyl having 1 to 4 carbon atoms, which can be substituted by hydroxyl, cyano, carboxyl, sulfo, sulfato, methoxycarbonyl, ethoxycarbonyl or acetoxy, or benzyl or phenyl, or phenyl which is substituted by alkyl having 1 to 4 carbon atoms, alkoxy having 1 to 4 carbon atoms, chlorine and/or sulfo, $P^{10}$ is hydrogen, alkyl having 1 to 4 carbon atoms, such as methyl, cyano, carboxyl, carbalkoxy having 2 to 5 carbon atoms, such as carbomethoxy and carbethoxy, carbamoyl or phenyl, preferably methyl, carboxyl, methoxycarbonyl, ethoxycarbonyl or phenyl and in particular methyl or carboxyl, T is a benzene or naphthalene ring, preferably a benzene ring, $P^{11}$ is hydrogen, alkyl having 1 to 6 carbon atoms, preferably 1 to 4 carbon atoms, which can be substituted by phenyl or sulfophenyl or by hydroxyl, amino, methoxy, ethoxy, carboxyl, sulfo, acetylamino, benzoylamino or cyano, cyclohexyl, phenyl or phenyl which is substituted by carboxyl, sulfo, benzoylamino, acetylamino, methyl, methoxy, cyano or chlorine, and preferably hydrogen or alkyl having 1 to 4 carbon atoms, which can be substituted by phenyl, sulfo or sulfophenyl, $P^{12}$ is hydrogen or alkyl having 1 to 4 carbon atoms, such as methyl, or alkyl having 1 to 4 carbon atoms, which is substituted by alkoxy having 1 to 4 carbon atoms, such as methoxy, or cyano, preferably alkyl having 1 to 4 carbon atoms or phenyl, and $P^{13}$ is hydrogen, chlorine, bromine, sulfo, carbamoyl, methylsulfonyl, phenylsulfonyl, cyano or sulfoalkyl having 1 to 4 carbon atoms, preferably hydrogen, sulfo or sulfoalkyl with an alkyl radical having 1 to 4 carbon atoms, such as sulfomethyl, or cyano or carbamoyl.

Examples of compounds of the formulae (8) are: 1naphthol-3-sulfonic acid, 1-naphthol-4-sulfonic acid, 1naphthol-5-sulfonic acid, 1-naphthol-8-sulfonic acid, 1-naphthol-3,6-disulfonic acid, 1-naphthol-3,8-disulfonic acid, 2naphthol-5-sulfonic acid, 2naphthol-6-sulfonic acid, 2naphthol-7-sulfonic acid, 2naphthol-8-sulfonic acid, 2-naphthol-3,6-disulfonic acid, 2-naphthol-6,8-disulfonic acid, 2-naphthol-3,6,8-trisulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 2-acetylamino-5-hydroxynaphthalene-7-sulfonic acid, 3-acetylamino-5-hydroxynaphthalene-7-sulfonic acid, 2-methyl-amino-8-hydroxynaphthalene-6-sulfonic acid or 2-(3'- and 4'-sulfophenyl)-amino-8-hydroxynaphthalene-6-sulfonic acid, 3-(3'- and 4'-sulfophenyl)-amino-8-hydroxynaphthalene-6-sulfonic acid, N,N-di-($\beta$sulfoethyl)-aniline and derivatives thereof which are mono- or disubstituted in the benzene nucleus by methyl, methoxy and/or ethoxy, N-ethyl-N-($\beta$-sulfoethyl)-aniline, N-($\beta$-sulfoethyl)-aniline N-($\beta$-carboxyethyl)-aniline and derivatives thereof which are mono- or disubstituted in the benzene nucleus by methyl, methoxy and/or ethoxy, and moreover 1-[3'-($\beta$-chloroethylsulfonyl)-benzoylamino]-3,6-disulfo-8-naphthol, 1-[3'-(vinylsulfonyl)-benzoylamino]-3,6-disulfo-8-naphthol, 1-[3'-(vinylsulfonyl)-benzoylamino]-4,6-disulfo-8-naphthol, 1-[3'-($\beta$sulfatoethylsulfonyl)-benzoylamino]-4,6-disulfo-8-naphthol, 2-[3'-($\beta$-chloroethylsulfonyl)-benzoylamino]-6-sulfo-8-naphthol, 2-[3'-(vinylsulfonyl)-benzoylamino]-6-sulfo-8naphthol, 3-[3'-($\beta$-chloroethylsulfonyl)-benzoylamino]-6-sulfo-8-naphthol, 3-[3'-(vinylsulfonyl)-benzoylamino]-6-sulfo-8naphthol, 2-[N-methyl-N-($\beta$-sulfatoethylsulfonyl)-amino]-6-sulfo-8-naphthol, 3-[N-methyl-N-($\beta$-sulfatoethylsulfonyl)-amino]-6-sulfo-8-naphthol, 2-[N-methyl-N-($\beta$-sulfatoethylsulfonyl)-amino]-6-sulfo-8-naphthol, 1-[N'-(3'-$\beta$-chloroethylsulfonyl-phenyl)-ureido]-3,6-disulfo-8-naphthol, 1-[N'-(3'-vinylsulfonyl-phenyl)-ureido]-3,6-disulfo-8-naphthol, 1-[N'-(3'-vinylsulfonylpropyl)-ureido]-3,6-disulfo-8-naphthol, 1-[N'-(3'-$\beta$-chloroethylsulfonyl-phenyl)-ureido]-4,6-disulfo-8-naphthol, 1-[N'-(3'-vinylsulfonyl-phenyl)-ureido]-4,6-disulfo-8-naphthol, 1-[N'-(3'-$\beta$-chloroethylsulfonyl-propyl)-ureido]-4,6-disulfo-8-naphthol, 2[N'-(3'-$\beta$-sulfatoethylsulfonyl-phenyl)-ureido]-6-sulfo-8-naphthol, 2-[N'-(3'-$\beta$-chloroethylsulfonyl-propyl)-ureido]-6-sulfo-8-naphthol, 3-[N'-(3'-$\beta$-chloroethylsulfonyl-propyl)-ureido]-6-sulfo-8-naphthol, and 3-[N'-(3'-vinylsulfonyl-propyl)-ureido]-6sulfo-8-naphthol.

Of these, coupling components which contain sulfo groups and if appropriate carry azo groups, such as 1 or 2 azo groups, and which couple in the o- or p-position relative to a hydroxyl and/or amino group, such as, for example, 2-acetylamino-5-hydroxy-naphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid or 1-benzoylamino-8-hydroxynaphthalene-4,6-disulfonic acid, are of particular importance.

Examples of pyrazolone coupling components are 3-methyl-, 3-carboxy- and 3-($C_2$–$C_5$-alkoxycarbonyl)-5-pyrazolones, which carry hydrogen, phenyl which is substituted by methyl, ethyl, fluorine, chlorine, bromine, trifluoromethyl, methoxy, ethoxy, cyano, phenoxy, phenylsulfonyl, methylsulfonyl, sulfo, benzoyl, acetyl, acetylamino, nitro, hydroxyl, carboxyl, carbamoyl and/or sulfamoyl or sulfo-substituted 1- or 2-naphthyl in the 1-position, for example:

1-(2'-methoxy-5'-methylphenyl)-, 1-(2'-chloro-5'-sulfophenyl)-, 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)- and 1-(3'-sulfamoylphenyl)-3-carboxy-5-pyrazolone, 1-(3'- or 4'-sulfophenyl)-, 1-(2'-chloro-4'- or -5'-sulfophenyl)-, 1-(2'-methyl-4'-sulfophenyl)-, 1-(4'-disulfo-2'-naphthyl)- and 1-(6'-sulfo-1'-naphthyl)-3-methyl-5-pyrazolone, ethyl check real good here 1-phenyl-5-pyrazolone-3-carboxylate, ethyl 5-pyrazolone-3-carboxylate, 5-pyrazolone-3-carboxylate acid, 1-[4'-($\beta$-sulfatoethylsulfonyl)-2'-sulfo]-phenyl-3-methyl-pyrazol-5-one, 1-[4'-($\beta$-sulfatoethylsulfonyl)-2'-sulfo]-carboxypyrazol-5-one, 1-[4'-($\beta$-sulfatoethylsulfonyl)-2'-sulfo)]-phenyl-3-methyl-pyrazol-5-one, stop 1-[3'-($\beta$-sulfatoethylsulfonyl)]-phenyl-3-methyl-pyrazol-5-one and 1-[4'-($\beta$-sulfophenyl)-phenyl-3-carboxy-pyrazol-5-one.

Examples of pyridone coupling components are 1-ethyl-2-hydroxy-4-methyl-5-carboxamido-6-pryidone, 1-(2'-hydroxyethyl)-2-hydroxy-4-methyl-5-carboxamido-6-pyridone, 1-(4'-sulfo-phenyl)-2-hydroxy-4-methyl-5-carboxamido-6-pyridone, 1-(2'-sulfoethyl)-2-hydroxy-4-methyl-5-cyano-6-pyridone, 1-ethyl-2-hydroxy-4-sulfomethyl-5-carboxamido-6-pyridone, 1-ethyl-2-hydroxy-4-methyl-5-sulfomethyl-6-pyridone, 1-methyl-2-hydroxy-4-sulfomethyl-5-cyano-6-pyridone, 1-methyl-2-hydroxy-5-acetyl-6-pyridone, 1,4-dimethyl-2-hydroxy-5-cyano-6-pyridone, 1,4-dimethyl-2-hydroxy-5-carboxamido-6-pyridone, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethyl-6-pyridone, 1-ethyl-2-hydroxy-4-methyl-5-methylsulfonyl-6-pyridone, 1-carboxymethyl-2-hydroxy-4-ethyl-5-phenylsulfonyl-6-pyridone and 1-(2'-sulfo-ethyl)-2-hydroxy-4-carboxy-6-pyridone, and examples of acetoacetyl-arylamide coupling components are acetoacetyl-(2-methoxy-4-sulfo-5-methyl)-aniline, acetoacetyl-(2,4-dimethoxy-5-methyl)-aniline and acetoacetyl-(4-$\beta$-sulfatoethylsulfonyl)-aniline.

Coupling components H-K which may furthermore be mentioned in particular are: 1- amino-8-hydroxynaphthalene-3,6- and -4,6-disulfonic acid and arylazo coupling products thereof, obtained by acid coupling, of the formula (9a)

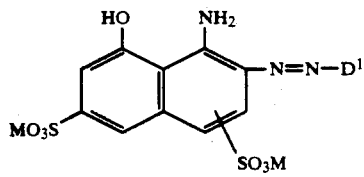
(9a)

in which
$D^1$ is the radical of a diazo component, for example a radical of the formula (10a) or (10b)

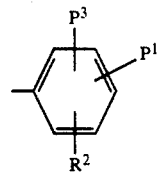
(10a)

or

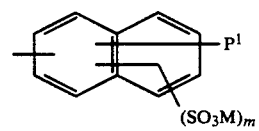
(10b)

in which $P^1$, $P^2$, $P^3$, M and m have the abovementioned meanings.

Examples of individual radicals $D^1$ are: phenyl, 2-sulfophenyl, 3-sulfophenyl, 4-sulfophenyl, 2,4-disulfophenyl, 2,5-disulfo-phenyl, 3,5-disulfo-phenyl, 1,5-disulfo-naphth-2-yl, 4,8-disulfo-naphth-2-yl, 3,6,8-trisulfo-naphth-2-yl, 4,6,8-trisulfo-naphth-2-yl, 3,6,8-trisulfo-naphth-1-yl, 4,6,8-trisulfo-naphth-1-yl, 4-sulfo-naphth-1-yl, 1-sulfo-naphth-1-yl, 3-acetylamino-phenyl 4-acetylamino-phenyl, 4-acetylamino-2-sulfophenyl, 5-acetylamino-2-sulfo-phenyl, 4-nitro-phenyl, 4-nitro-2-sulfo-phenyl, 6-acetylamino-4,8-disulfo-naphth-2-yl, 4-($\beta$-sulfatoethylsulfonyl)-phenyl and 3-($\beta$-sulfatoethylsulfonyl)-phenyl.

Examples of coupling components which contain, according to the invention, the fiber-reactive group of the formula (3) or into which the fiber-reactive group can be introduced, if appropriate only after the coupling reactional, are compounds of the formulae (11a) to (11h) and $Z^o$-free precursors thereof (i.e. compounds which contain the group —N($R^x$)—H instead of the group —N($R^x$)—$Z^o$):

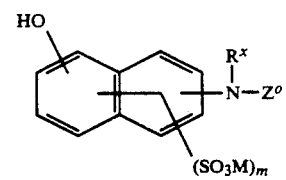
(11a)

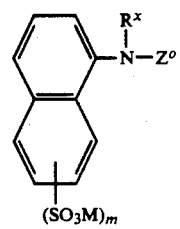
(11b)

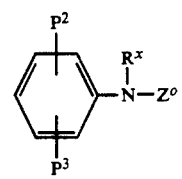
(11c)

-continued

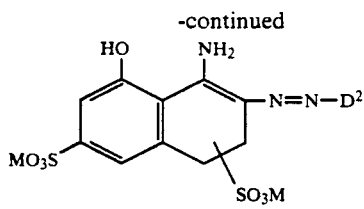 (11d)

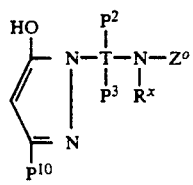 (11e)

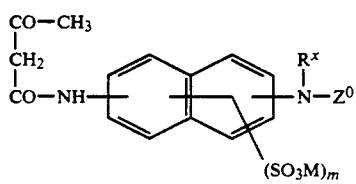 (11f)

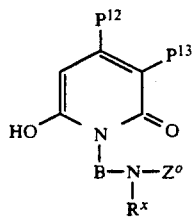 (11g)

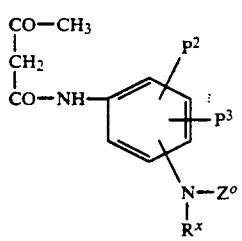 (11h)

in which $R^x$, $P^2$, $P^3$, $P^{10}$, $P^{12}$, $P^{13}$, $D^2$, M, m and T have the abovementioned particularly preferred meanings, B is alkyl having 1 to 4 carbon atoms, benzyl or phenethyl or phenyl, or benzyl, phenethyl or phenyl which is substituted in the benzene radical by fluorine, chlorine, bromine, methyl, methoxy, cyano, sulfo, carboxyl, acetyl, nitro, carbamoyl and/or sulfamoyl, the group —N($R^x$)—$Z^o$ being bonded to the benzene nucleus in the case of "benzyl" and "phenenthyl", $Z^o$ is a radical of the formula (3), (3a) or (3b) which is free from the group —N($R^x$)— or —N(R')— and $D^2$ is the radical of a diazo component having a fiber-reactive group, in particular of the formula (3), preferably a radical of the abovementioned formula (10a) or (10b), where $P^1$ is a group of the formula —SO$_2$—Y or a radical of the formula (10c)

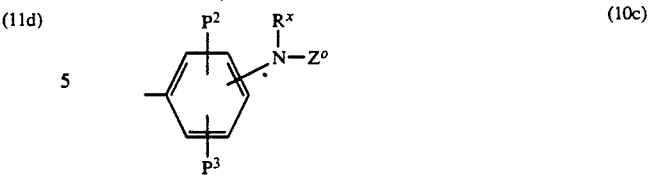 (10c)

in which $R^x$, $P^2$, $P^3$ and $Z^o$ have the abovementioned particularly preferred meanings.

Examples of aromatic diamines from the radical of the formula (10c) are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methyl-benzene, 1,4-diamino-2-methoxybenzene, 1,3-diamino-4-methyl-benzene, 1,4-diaminobenzene-2,6-disulfonic acid, 1,5-diamino-4-methylbenzene-2-sulfonic acid and 1,5-diamino-4-methoxybenzene-2-sulfonic acid, one primary or secondary amino group in all these diamino compound being substituted by the fiber-reactive radical $Z^o$.

Radicals K in the formulae (4b) and (4f) which do not contain the group Z are, in particular, radicals of the formulae (12a) to (12h)

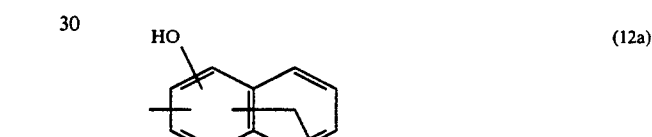 (12a)

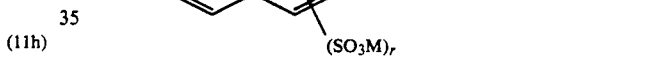 (12b)

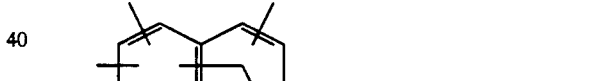 (12c)

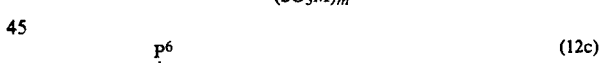 (12d)

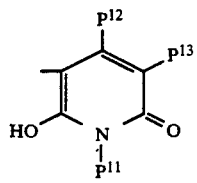 (12e)

-continued

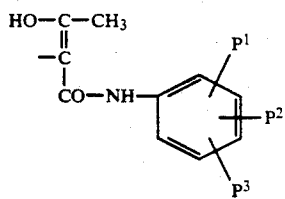 (12f)

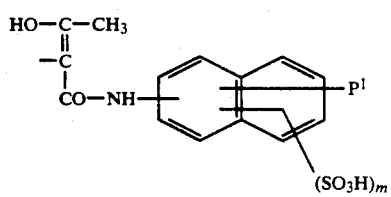 (12g)

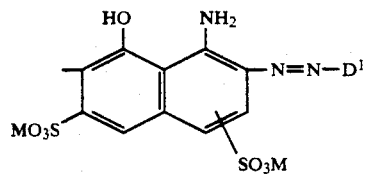 (12h)

in which the individual formula members have the abovementioned meanings.

Radicals K in the formulae (4a), (4c) and (4f) which contain the group Z are, in particular, radicals of the formulae (12j) to (12p)

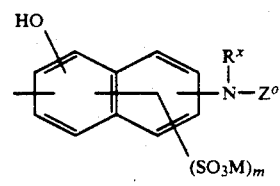 (12j)

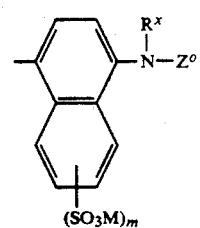 (12k)

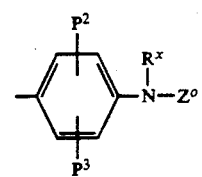 (12m)

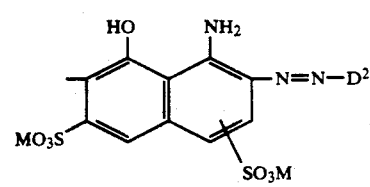 (12n)

-continued

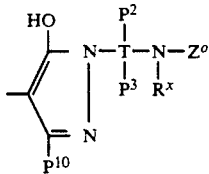 (12o)

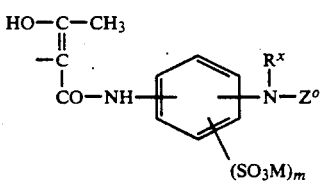 (12p)

in which the individual formula members have the abovementioned meanings.

Radicals K in the formula (4h) which have an oxygen atom which bonds metal complexes and optionally contain the group Z are, in particular, those of the formula (13a) to (13f)

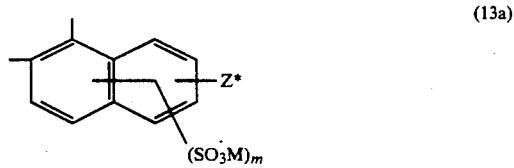 (13a)

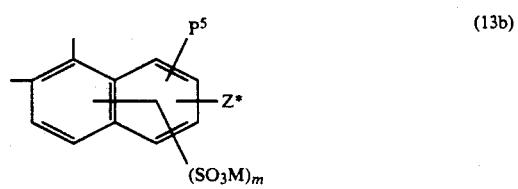 (13b)

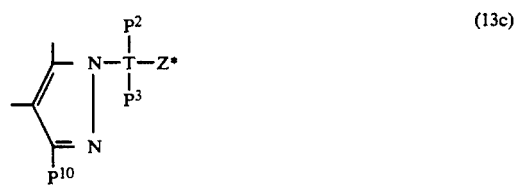 (13c)

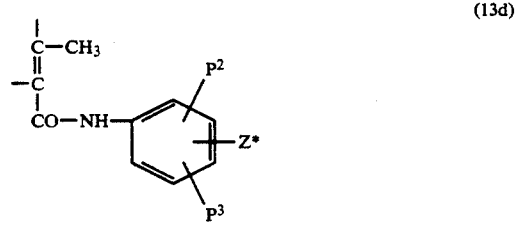 (13d)

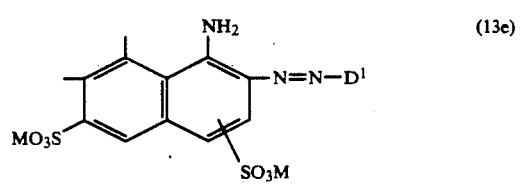 (13e)

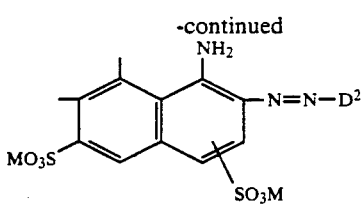

(13f)

in which Z* has one of the meanings of $P^1$ or Z and the formula members have one of the abovementioned meanings.

The abovementioned compounds of the formulae (11b) and (11c) cannot themselves be employed as coupling components. $Z^o$-free precursors thereof, i.e. which contain an amino group of the formula $-N(R^x)-H$ instead of the group $-N(R^x)-Z^o$, are used as coupling components for the synthesis of the azo dyestuffs according to the invention. After these precursors containing amino groups have been coupled with an appropriate diazo component to give the azo compound, the fiber-reactive radical $Z^o$ can be introduced into the amino group $-N(R^x)-H$ by reaction with a compound of the formula Hal—$Z^o$, in which Hal is a halogen atom, preferably a fluorine or chlorine atom, and $Z^o$ has the abovementioned meaning. Analogously, the $Z^o$-free amino compounds of the compounds of the formulae (11a) and (11d) to (11h) can themselves also initially serve as coupling components for the preparation of an amino-azo starting compound into which the fiber-reactive radical can then be introduced in the same manner. The coupling components containing the fiber-reactive radical $Z^o$ of the formulae (11a) and (11d) to (11h) can themselves likewise be prepared by reaction of these $Z^o$-free starting compounds containing amino groups which a compound of the formula Hal-$Z^o$ analogously to known procedures.

Preferred anthraquinone dyestuffs according to the invention are those which correspond to the formula (14)

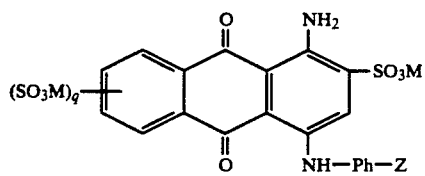

(14)

in which

M is a hydrogen atom or an alkali metal, such as sodium, potassium or lithium, q is the number zero or 1 (this group being a hydrogen atom in the case where q is zero), Ph is a phenylene radical, which can be substituted by 1 or 2 substituents from the group comprising alkyl having 1 to 4 carbon atoms, such as methyl and ethyl, alkoxy having 1 to 4 carbon atoms, such as methoxy and ethoxy, halogen, such as chlorine and bromine, carboxyl and sulfo, and Z is the fiber-reactive group of the formula (3) or preferably (3a) or (3b).

Preferred triphendioxazine dyestuffs according to the invention are those which correspond to the formula (15)

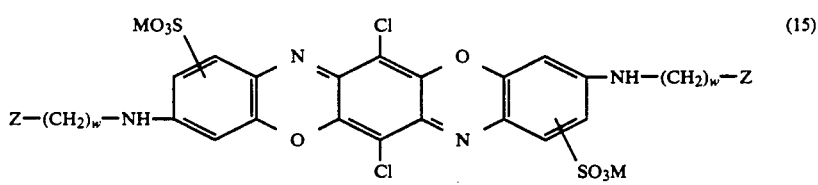

in which M is a hydrogen atom or an alkali metal, such as sodium, potassium or lithium, Z is the fiber-reactive group of the formula (3) or preferably (3a) or (3b) and w is the number 2, 3 or 4, the two sulfo groups $-SI_3M$ preferably being bonded to the benzene nucleus in the ortho-position relative to the oxygen atom of the heterocyclic ring.

Preferred phthalocyanine dyestuffs according to the invention are those which correspond to the formula (16)

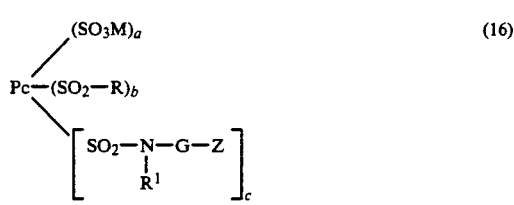

in which:

Pc is the radical of a copper or nickel phthalocyanine,

R is an amino group of the formula $-NR^2R^3$, in which $R^2$ and $R^3$ independently of one another are hydrogen or alkyl having 1 to 4 carbon atoms, which can be substituted by hydroxyl or sulfo, or is a heterocyclic N-containing radical, such as the morpholine or piperidino radical;

$R^1$ is hydrogen or alkyl having 1 to 4 carbon atoms, such as methyl and ethyl;

G is phenylene, which can be substituted by 1 or 2 substituents from the group comprising alkyl having 1 to 4 carbon atoms, such as ethyl and methyl, halogen, such as chlorine and bromine, carboxyl and sulfo, for example sulfophenylene, or is alkylene having 2 to 6 carbon atoms, such as ethylene;

Z is the fiber-reactive group of the formula (3) or preferably (3a) or (3b);

a is a number from 2 to 3, b is a number from zero to 3 and c is a number from 1 to 2, the sum of (a+b+c) being a number from 3 to 4. Further preferred azo dyestuffs are those which correspond to the formulae (17A) to (17J)

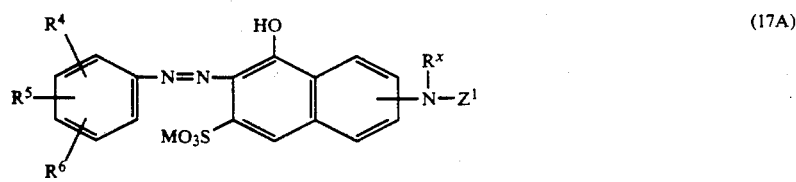
(17A)
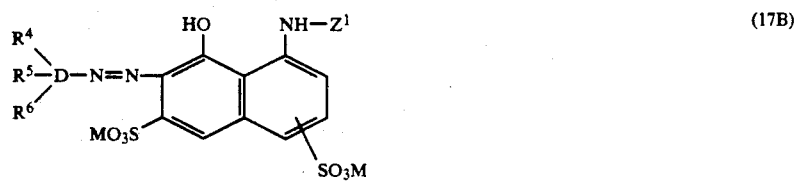
(17B)
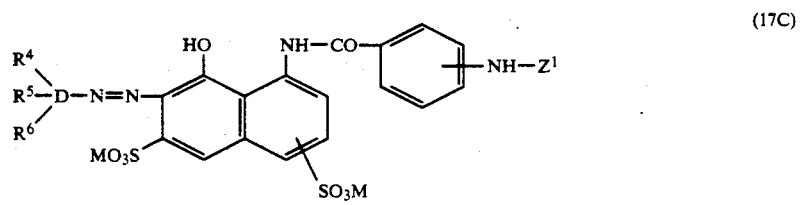
(17C)
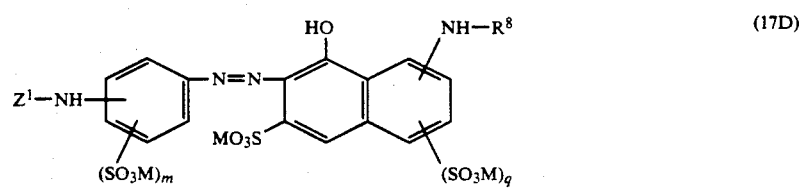
(17D)
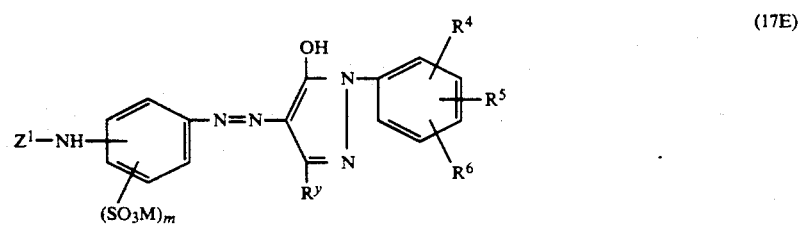
(17E)
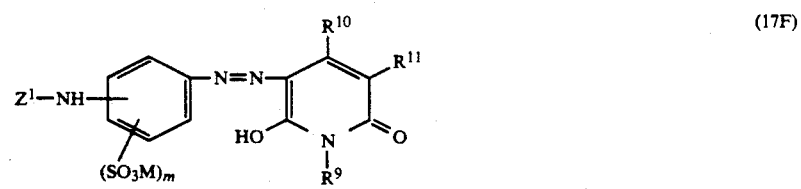
(17F)
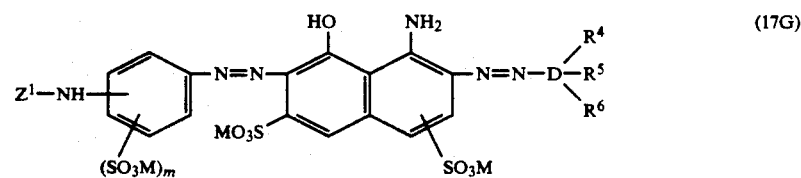
(17G)
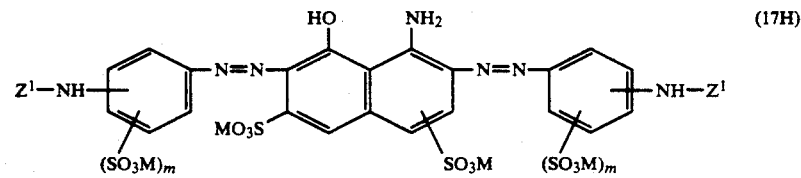
(17H)

-continued

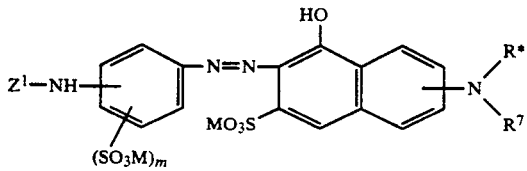
(17J)

in which:
M has one of the abovementioned meanings;
$R^x$ is hydrogen or alkyl having 1 to 4 carbon atoms, such as methyl;
$R^4$ is hydrogen, alkyl having 1 to 4 carbon atoms, such as ethyl and in particular methyl, alkoxy having 1 to 4 carbon atoms, such as ethoxy and in particular methoxy, halogen, such as chlorine and bromine, carboxyl, sulfo, $\beta$-sulfatoethylsulfonyl, $\beta$-chloroethylsulfonyl or vinylsulfonyl;
$R^5$ is hydrogen, alkyl having 1 to 4 carbon atoms, such as ethyl and in particular methyl, alkoxy having 1 to 4 carbon atoms, such as ethoxy and in particular methoxy, halogen, such as chlorine and bromine, carboxyl or sulfo;
$R^6$ is hydrogen or sulfo;
$R^*$ is hydrogen or methyl;
$R^7$ is alkanoyl having 2 to 5 carbon atoms, such as acetyl, or is benzoyl, $\beta$-sulfatoethylsulfonyl or 3-($\beta$-chloroethylsulfonyl)-benzoyl;
$R^8$ is alkanoyl having 2 to 5 carbon atoms, such as acetyl, or benzoyl;
$R^y$ is methyl or carboxyl;
$R^9$ is hydrogen or alkyl having 1 to 4 carbon atoms, such as methyl or ethyl, which can be substituted by sulfo or carboxyl, or is phenyl;
$R^{10}$ is hydrogen or alkyl having 1 to 4 carbon atoms, such as methyl, or is phenyl;
$R^{11}$ is hydrogen, cyano, carbamoyl, sulfamoyl or sulfomethyl;
$Z^1$ is a radical of the formula (3A) or preferably of the formula (3B) or (3C)

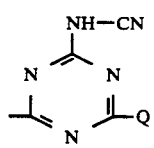
(3A)

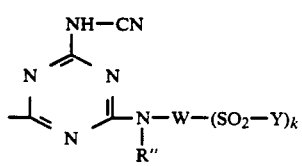
(3B)

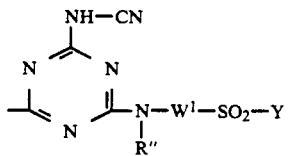
(3C)

in which $R^x$, Q, R', R'', W, $W^1$, Y and k have one of the abovementioned meanings;
D is a benzene ring or is a naphthalene ring, to which the azo group is bonded in the $\beta$-position, in which, in the case where D is the naphthalene ring, $R^4$ and $R^5$, preferably each independently of one another, are a hydrogen atom or a sulfo group and $R^6$ is a sulfo group; and
m is the number zero, 1 to 2 (this group being hydrogen in the case where m is zero).

Further preferred dyestuffs according to the invention corresponding to the formula (1) are those of the formulae (18A), (18B), (19) and (20) to (30) [sic] given below:

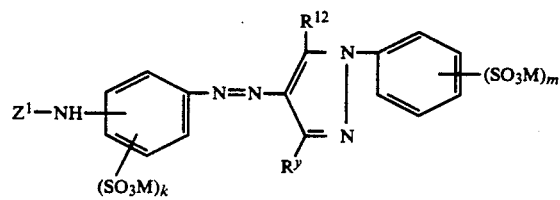
(18A)

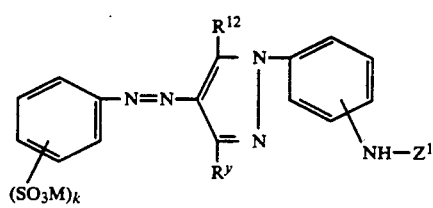
(18B)

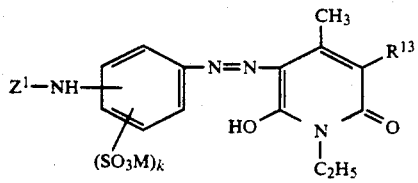 (19)
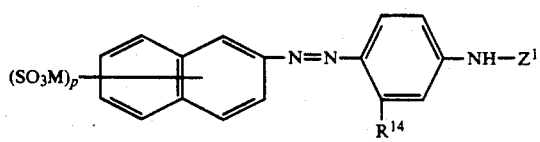 (20)
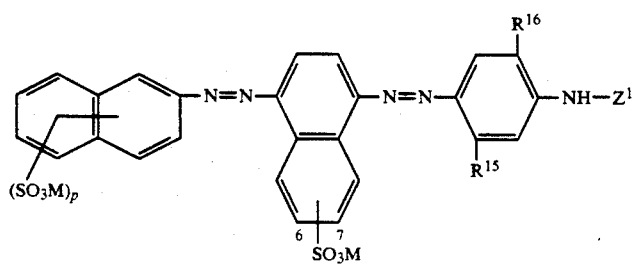 (21)
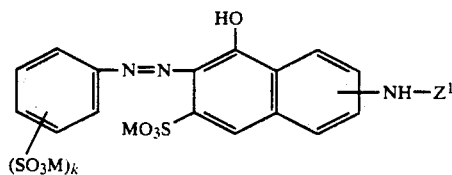 (22)
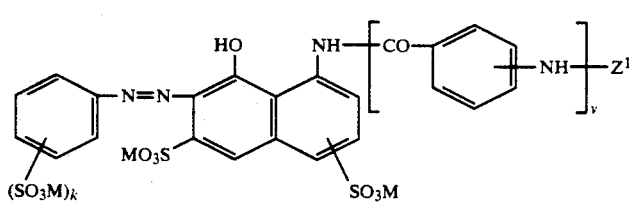 (23)
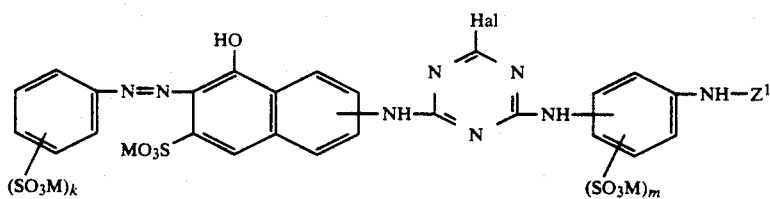 (24)
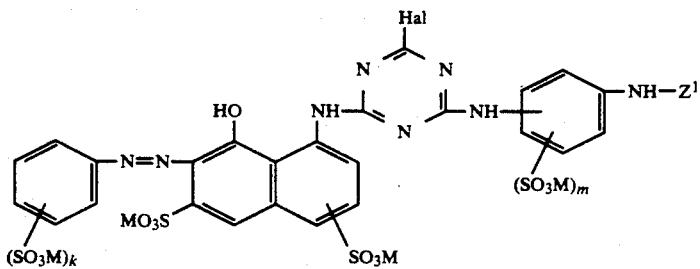 (25)
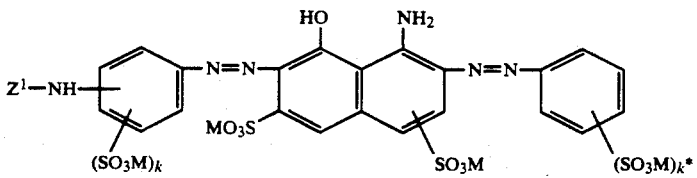 (26)

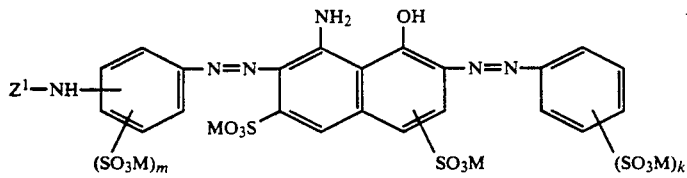
(27)
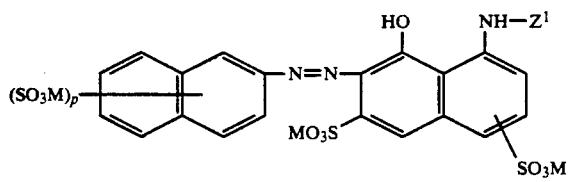
(28)
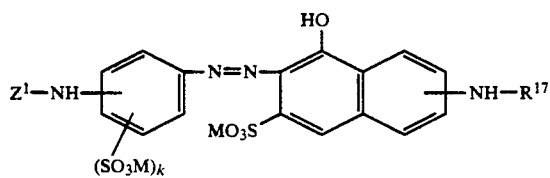
(29)
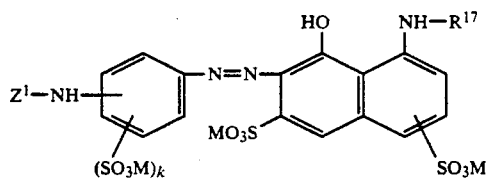
(30)
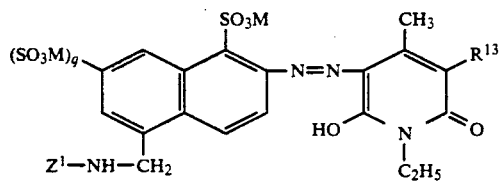
(31)
and furthermore the metal complex dyestuffs, such as the 1:2 chromium and 1:2 cobalt and in particular the 1:1 copper complex dyestuffs, of the compounds of the formulae (32) to (37):
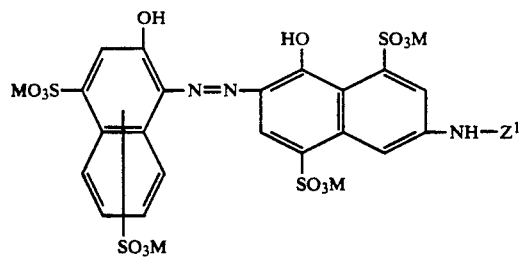
(32)
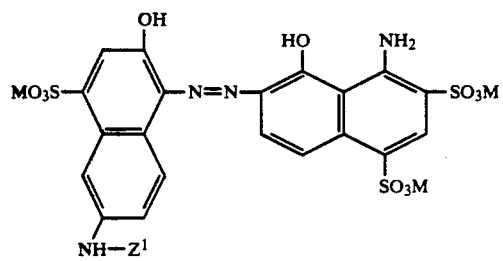
(33)

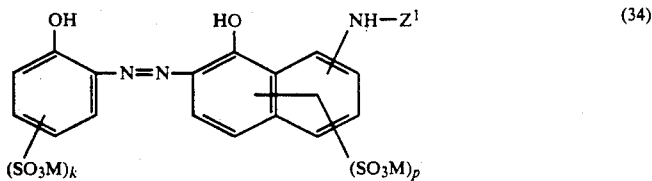
(34)
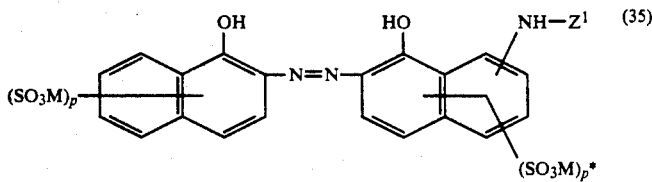
(35)
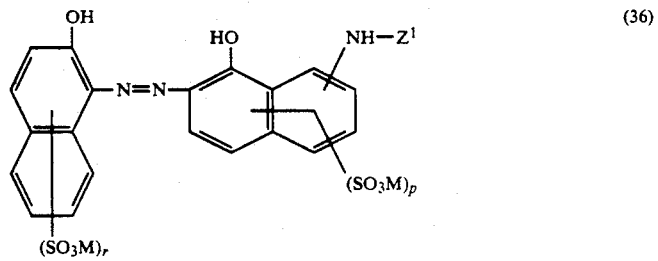
(36)
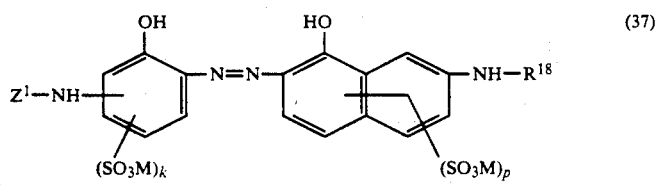
(37)
and furthermore the dyestuffs of the formulae (38) to (54):
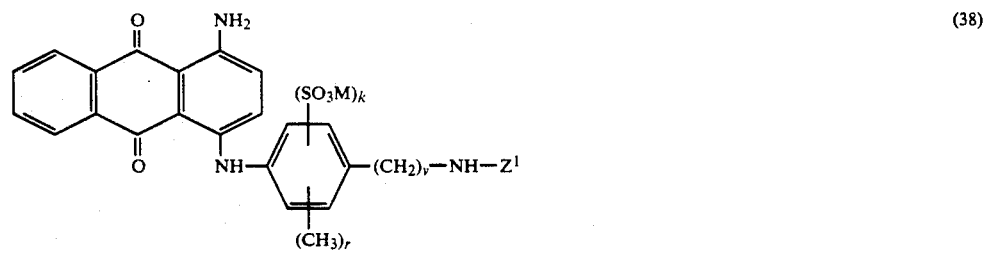
(38)
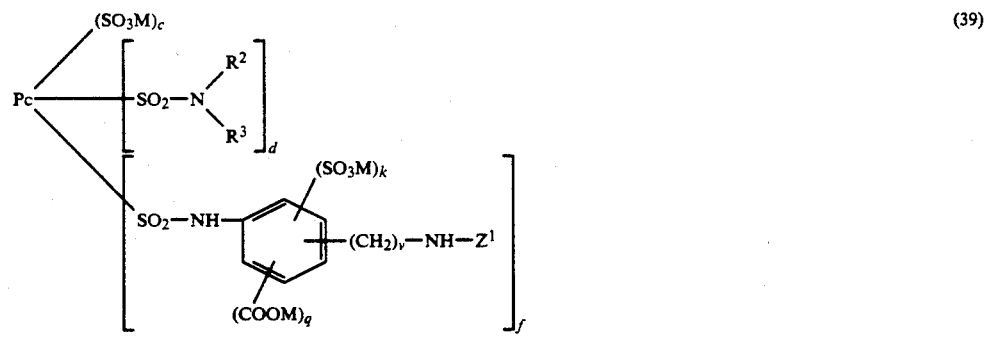
(39)
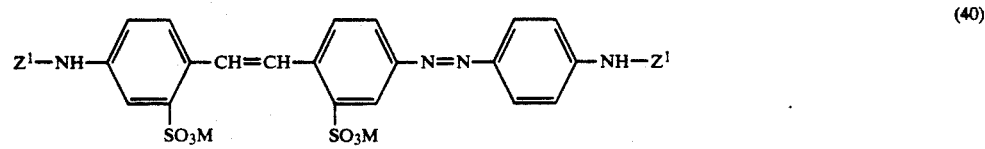
(40)

-continued
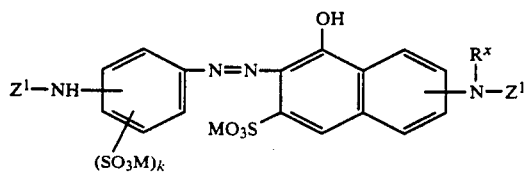
(41)
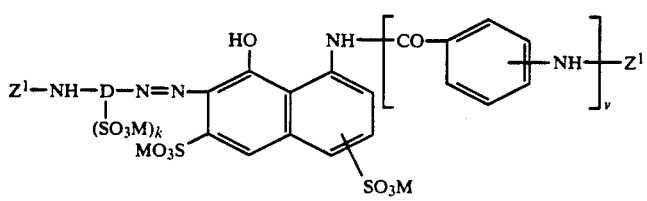
(42)
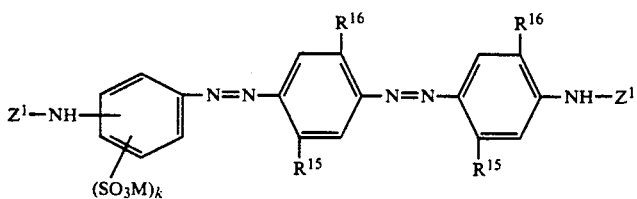
(43)
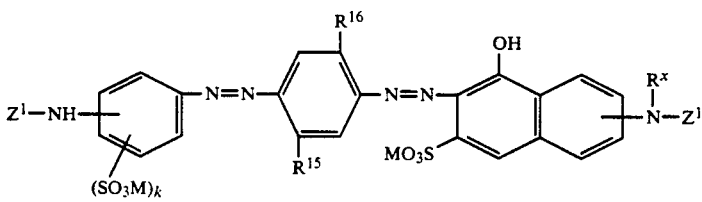
(44)
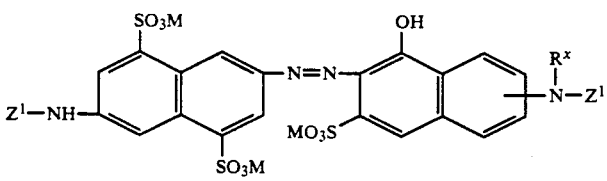
(45)
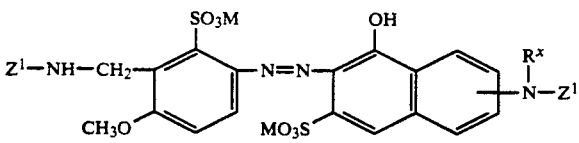
(46)
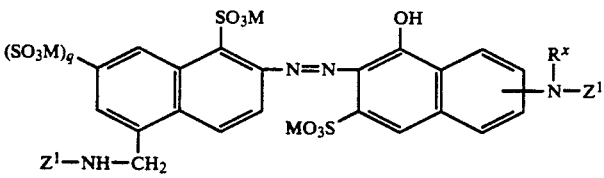
(47)
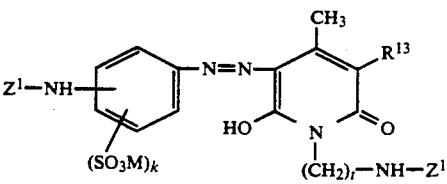
(48)

-continued

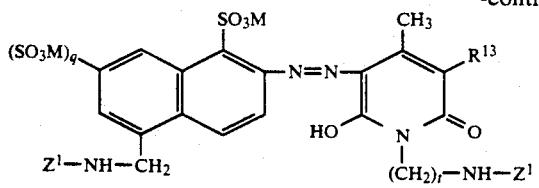
(49)

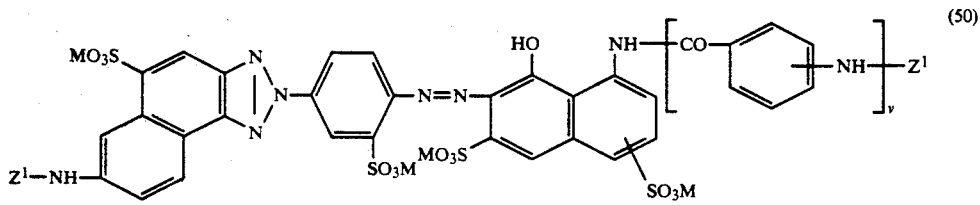
(50)

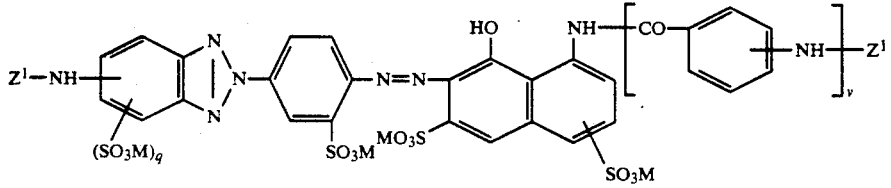
(51)

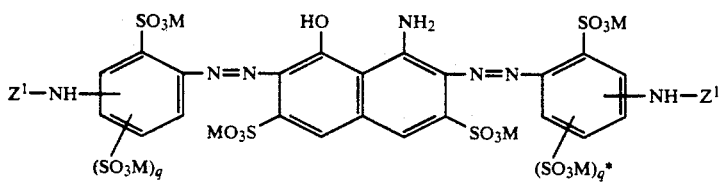
(52)

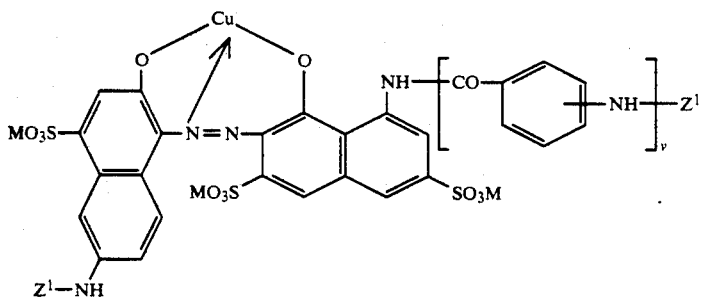
(53)

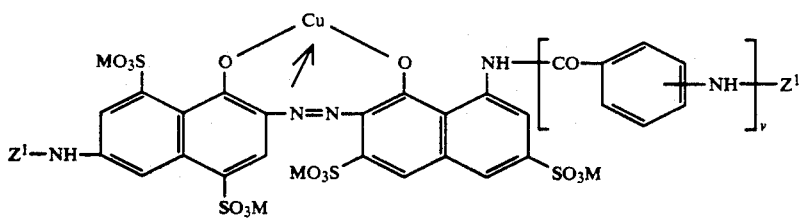
(54)

In these formulae:

M, m, $Z^1$ and $R^y$ have the abovementioned particularly preferred meanings;

k is the number 1 or 2;

k* is the number 1 or 2;

$R^{12}$ is hydroxyl or amino;

$R^{13}$ is cyano, carbamoyl or sulfomethyl;

$R^{14}$ is methyl, acetylamino or ureido;

p is the number of 1, 2 or 3;

p* is the number of 1, 2 or 3;

$R^{15}$ hydrogen or alkyl having 1 to 4 carbon atoms, such as methyl and ethyl, alkoxy having 1 to 4 carbon atoms, such as methoxy and ethoxy, alkanoylamino having 2 to 5 carbon atoms, such as acetylamino, ureido or halogen, such as bromine and in particular chlorine, but preferably hydrogen, methyl, ethyl, methoxy, ethoxy, acetylamino, ureido or chlorine;

$R^{16}$ hydrogen, alkyl having 1 to 4 carbon atoms, such as methyl and ethyl, alkoxy having 1 to 4 carbon atoms, such as methoxy and ethoxy, or halogen, such as bromine and in particular chlorine, but preferably hydrogen, methyl, ethyl, methoxy, ethoxy or chlorine;

v is the number zero or 1;

Hal is acetyl or benzoyl;

$R^{17}$ is acetyl or benzoyl;

R$^{18}$ is hydrogen or acetyl;

r is the number zero or 1, 2 or 3 (this group being hydrogen in the case where r is zero);

R$^2$ is hydrogen or alkyl having 1 to 4 carbon atoms, such as methyl or ethyl, and R$^3$ is hydrogen or alkyl having 1 to 4 carbon atoms, such as methyl or ethyl, and R$^2$ and R$^3$, together with the N atom, from a heterocyclic radical which contains an alkylene group having 3 to 7 carbon atoms or one or two alkylene groups having 1 to 5 carbon atoms and a further hetero group, such as an N or O atom or a group —NH— or —N(CH$_3$)— or —N(C$_2$H$_5$)—, such as, for example, the N-piperidino or N-morpholino radical;

q is the number zero or 1 (this group being hydrogen in the case where q is zero);

q* is the number zero or 1 (this group being hydrogen in the case where q* is zero);

Pc is the radical of copper phthalocyanine or nickel phthalocyanine;

c is a number from 1 to 3, d is a number from 0.5 to 1.5 and f is a number from 1 to 2, the sum of (c'd+f) being a number from 3 to 4;

R$^x$ is hydrogen or alkyl having 1 to 4 carbon atoms, such as methyl; and t is the number 2 or 3;

the benzene rings shown in the above dyestuff formulae can additionally also be substituted, such as, for example, by 1 to 2 substituents from the group comprising methyl, ethyl, methoxy, ethoxy, methylsulfonyl, ethylsulfonyl, carboxyl, acetylamino and chlorine, and the naphthalene rings can be substituted by a substituent from the group comprising methoxy, carboxyl, acetylamino, nitro and chlorine.

Preferred compounds are furthermore those of the formulae (17B), (20), (21) and (42), in which Z$^1$ is a radical of the abovementioned formula (3C), in which W$^1$ is an alkylene group having 2 to 4 carbon atoms, preferably 3 carbon atoms, or is a phenylene radical, which can be substituted by 1 or 2 substituents from the group comprising methyl, ethyl, methoxy, ethoxy and chlorine, Y has ne of the abovementioned meanings and is preferably the β-sulfatoethyl group, and R" is hydrogen, methyl or ethyl, in which furthermore, preferably, in formula (17B) D is a naphthalene ring or preferably a benzene ring, R$^4$ is the vinylsulfonyl group, or preferably the β-sulfatoethylsulfonyl group and R$^5$ and R$^6$ have the abovementioned meanings, M is a hydrogen atom or alkali metal and Z$^1$ is a radical of the formula (3C), and wherein furthermore, preferably, in formula (21) p is the number 2, the two groups —SO$_3$M being bonded to the naphth-2-yl radical in the 4- and 8-position and the group —SO$_3$M in the naphthylene central component being bonded in the 6-position, and in which furthermore, preferably, in formula (42) one group —SO$_3$M in the aminonaphthol radical is in the metalposition relative to the group NH and v is the number zero.

In all the above formulae, the individual formula members, both of a different and the same designation within a formula, can have meanings which are identical to one another or different from one another in the context of their meaning.

The groups "sulfo", "carboxyl", "phosphato", "thiosulfato" and "sulfato" include both the acid form thereof and the salt form thereof. Accordingly, sulfo groups are groups corresponding to the formula —SO$_3$M carboxcl groups are groups corresponding to the formula —COOM, phosphato groups are groups corresponding to the formula —OPO$_3$M$_2$, thiosulfato groups are groups corresponding to the formula —S—SO$_3$M and sulfato groups are groups corresponding to the formula —OSO$_3$M, in each case where M has the abovementioned meaning.

The reaction of an abovementioned starting compound of the formula (57) with an amine of the formula H-Q is likewise carried out like the abovementioned reaction of the compound (58) with the amine H-Q in an aqueous or aqueous-organic medium in suspension or solution, a temperature of between 15° and 70° C., preferably between 25° and 45° C., and a pH between 3 and 11.5, preferably between 3.5 and 7, being maintained here.

The starting compounds of the formula (59) can be prepared, for example, by reacting, analogously to known procedures, a compound of the formula (57) with an amine of the formula H-Q, where Q has the abovementioned meaning, or reacting a compound of the formula (62)

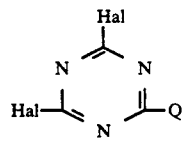

(62)

in which Hal and Q have the abovementioned meanings, with a starting compound of the formula (55). The starting compound (62) itself can in turn be prepared analogously to known procedures by reaction of a trihalo-s-triazine with an amine of the formula H-Q, where Q has the abovementioned meaning.

The condensation of the halotriazine of the formula (56) with a compound of the formula H-Q is likewise preferably carried out in aqueous solution or suspension, at 0° to 30° C. and at a pH between 1.8 and 9.5. Here also, the hydrogen halide liberated during the condensation is advantageously neutralized by continuous addition of aqueous alkali metal hydroxides, carbonates or bicarbonates.

Under certain reaction conditions, hydrolysis of a halotriazine radical may occur; for this reason, in the case of an intermediate product or precursor which contains a protective group, such as, for example, an acetylamino group, the acetyl group must be split off by hydrolysis before the reaction with the halotriazine is carried out. The sequence in which the various abovementioned reactions between the halotriazine and amino starting compounds are advantageously first carried out differs from case to case and depends above all on the solubility of the amino compounds participating and the basicity of the amino groups which are to be reacted with the halotriazine radical.

Those metal-free azo dyestuffs which correspond to the formula (1) but in which the diazo and coupling components each contain, in the ortho-position relative to the azo group, a hydroxyl group which is capable of forming a complex can also be used, for example, as starting substances in the synthesis according to the invention of the heavy metal complex azo dyestuffs according to the invention. This o,o'-dihydroxy-azo starting compound corresponding to the formula (1) is then reacted in a customary and known procedure with an agent which donates a heavy metal ion, such as, for example, copper chloride, copper sulfate, chromium chloride, chromium sulfate and cobalt chloride, to give the heavy metal complex azo dyestuff according to the invention.

According to the invention, phthalocyanine dyestuffs according to the invention can also be prepared, for example, by using a phthalocyaninesulfonyl chloride or a phthalocyaninesulfonyl chloride containing sulfo groups as the starting substance and reacting this with an amine of the formula H-Q, where Q has the abovementioned meaning, and if appropriate with another amine, such as, for example, an amine of the formula —NR$^2$R$^3$, where R$^2$ and R$^3$ have the abovementioned meaning. Several such procedures for the reaction of phthalocyaninesulfonyl chlorides with amines are described in the literature, such as, for example, in U.S. Pat. No. 4,745,178 and the literature additionally cited in this respect therein.

Numerous starting amines of the formula H-Q are described in the literature, thus, for example, in German Patents Nos. 887,505 and 965,902, in German Offenlegungsschriften Nos. 2,040,620 and 2,614,550 and in European Patent Application publications Nos. 0,107,614, 0,144,766, 0,159,292 and 0,278,904.

According to the invention, the dyestuffs according to the invention can also be prepared starting from one or more starting substances containing a β-hydroxyethylsulfonyl group, such as from an amine of the formula H-Q, where Q has the abovementioned meaning, but with the difference that the group(s) of the formula —SO$_2$—Y are β-hydroxyethylsulfonyl groups, by first preparing, analogously to the abovementioned procedures according to the invention, a starting compound which corresponds to the formula (1) with the meaning given, but with the difference that the group(s) —SO$_2$—Y are β-hydroxyethylsulfonyl groups, and converting the β-hydroxyethylsulfonyl groups in this starting compound into other groups —SO$_2$—Y corresponding to the compound (1) according to the invention analogously to known procedures, thus, for example, into ester derivatives thereof, such as, for example, of polybasic inorganic acids or of aliphatic and aromatic carboxylic or sulfonic acids, thus, for example, into compounds in which Y is the β-chloroethyl, β-sulfatoethyl, β-phosphatoethyl, β-thiosulfatoethyl, β-acetoxyethyl or β-toluylsulfonyloxyethyl group. Examples of esterifying and acylating agents which are suitable for this are the corresponding inorganic or organic acids or anhydrides or halides or amides thereof, such as, for example, sulfuric acid, sulfuric acid containing sulfur trioxide, chlorosulfonic acid, sulfamic acid, phosphoric acid, polyphosphoric acid, phosphorus oxychloride, mixtures of phosphoric acid and phosphorus pentoxide, acetic anhydride, toluenesulfonyl chloride and thionyl chloride.

The sulfation is carried out, for example, by reaction with concentrated sulfuric acid at a temperature between 0° and 20° C. or by reaction with chlorosulfonic acid in a polar organic solvent, such as, for example, N-methylpyrrolidone, at a temperature between 10° and 80° C. The sulfation is preferably carried out by introduction of the starting dyestuff containing β-hydroxyethylsulfonyl groups into sulfuric acid monohydrate at a temperature between 5° and 15° C.

Those compounds in which Y is the vinyl group can be prepared from analogous ester derivatives thereof by means of alkali, thus in an aqueous medium at a pH of 10 to 12 and a temperature between 30° and 50° C. in the course of 10 to 20 minutes. The synthesis of, for example, β-(dialkylamino)-ethylsulfonyl and β-thiosulfatoethylsulfonyl derivatives is carried out by reaction of vinylsulfonyl compounds thereof with the corresponding dialkylamine or with an alkali metal salt of thiosulfuric acid, such as sodium thiosulfate. All of these procedures of conversion of one group —SO$_2$—Y into another are familiar to the expert in this fiber-reactive field and are described in numerous instances in the literature.

The dyestuffs of the formula (1) according to the invention are suitable for dyeing and printing the most diverse materials, such as silk, leather, wool, polyamide fibers and polyurethanes, and in particular all types of fiber materials containing cellulose. Examples of such fiber materials are the natural cellulose fibers, such as cotton, linen and hemp, as well as cellulose and regenerated cellulose. The dyestuffs of the formula (1) are also suitable for dyeing or printing fibers which contain hydroxy groups and are contained in blended fabrics, for example mixtures of cotton with polyester fibers or polyamide fibers.

The dyestuffs according to the invention can be applied to the fiber material and fixed on the fiber in various ways, in particular in the form of aqueous dyestuff solutions and printing pastes. They are suitable both for the exhaust process and for dyeing by the pad-dyeing process, in which the goods are impregnated with aqueous dyestuff solutions, if appropriate containing salts, and the dyestuff is fixed, after an alkali treatment or in the presence of alkali, if appropriate under the action of heat. The dyestuffs according to the invention are particularly suitable for the so-called cold pad-batch process, in which the dyestuff is applied to the padder together with the alkali and is then fixed by storage at room temperature for several hours. After fixing, the dyeings or prints are rinsed thoroughly with cold and hot water, if appropriate with addition of a dispersing agent which promotes diffusion of the non-fixed portions.

The present invention therefore also relates to the use of the compounds of the formula (1) according to the invention for dyeing (including printing) these materials and to processes for dyeing (and printing) such materials by a procedure which is customary per se, in which a compound of the formula (1) is employed as the coloring agent, by applying the compound of the formula (1) to the material in an aqueous medium and fixing it on the material by means of heat or by means of an alkaline compound or by means of both.

If anthraquinone dyestuffs according to the invention have an inadequate solubility in the alkaline dye liquor, this deficiency can be overcome in the manner which is known from the literature by addition of dispersing agents or other non-coloring compounds, for example a naphthalenesulfonic acid-formaldehyde condensate or in particular anthraquinone-2-sulfonic acid.

The dyestuffs of the formula (1) are distinguished by a high reactivity, good fixing capacity and very good build-up capacity. They can therefore be employed by the exhaust dyeing process at low dyeing temperatures and require only short steaming times in the pad-steam process. The degrees of fixing are high and the non-fixed portions can easily be washed out, the difference between the degree of exhaustion and the degree of fixing being remarkably small, i.e. the soaping loss is very low. The dyestuffs of the formula (1) are also particularly suitable for printing, above all on cotton, and similarly also for printing nitrogen-containing fibers, for example wool or silk or blended fabrics which contain wool or silk.

The dyeings and prints produced on cellulose fiber materials with the dyestuffs according to the invention have a good depth of color and a high fiber-dyestuff bonding stability both in the acid and in the alkaline range, and furthermore good light-fastness and very good wet-fastness properties, such as fastnesses to washing, water, seawater, cross-dyeing and perspiration, as well as a good fastness to pleating, fastness to ironing and fastness to rubbing.

The following examples serve to illustrate the invention. The parts are parts by weight and the percentage data are percentages by weight, unless noted otherwise. Parts by weight bear the same relationship to parts by volume as the kilogram to the liter.

The compounds described by way of their formula in these examples are shown in the form of the free acids; they are in general prepared and isolated in the form of their alkali metal salts, such as lithium, sodium or potassium salts, and are used for dyeing in the form of their salts.

The starting compounds and components mentioned in the form of the free acid in the following examples, in particular the tabular examples, can likewise be employed in the synthesis as such or in the form of their salts, preferably alkali metal salts.

The absorption maxima ($\lambda_{max}$) in the visible range quoted for the compounds according to the invention have been determined with the aid of alkali metal salts thereof in aqueous solution. In the tabular examples, the $\lambda_{max}$ values are placed in parentheses where the color shade is stated; the wavelengths are stated in nm.

Example 1

45.3 parts of 3-(2'-sulfo-4'-methoxy-phenylazo)-4-hydroxy-7-amino-naphthalene-2-sulfonic acid are reacted in aqueous solution with 19 parts of cyanuric chloride at a temperature of 0° to 5° C. and a pH of 4. 4.4 parts of cyanamide are then added, the pH is brought to 10 by means of sodium hydroxide solution and the reaction is carried out at a temperature of 60° C. and at a pH between 9.5 and 10 for about 1.5 hours. The monochlorotriazineazo compound thus prepared is reacted in the synthesis solution with 29.5 parts of 3-($\beta$-sulfatoethylsulfonyl)-aniline at a pH of 4 and a temperature of 85° C. When this condensation reaction has ended, the dyestuff according to the invention formed, which, written in the form of the free acid, corresponds to the formula

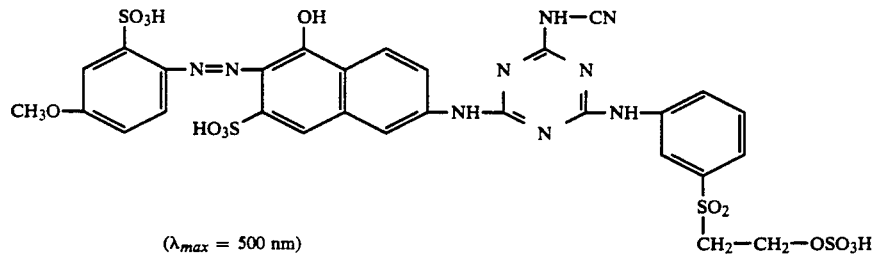

($\lambda_{max}$ = 500 nm)

is isolated as the alkali metal salt (sodium salt) by evaporation under reduced pressure or by spray drying. It has very good fiber-reactive dyestuff properties and, when used by the processes customary for fiber-reactive dyestuffs, gives deep, brilliant scarlet red dyeings and prints having good fastness properties, of which the fastness to water and fastness to perspiration may be emphasized in particular. It is particularly distinguished by a high degree of fixing both in the exhaust processes at temperatures between 40° and 80° C. and in the cold pad-batch dyeing processes.

Example 2

4.25 parts of cyanamide are added to a finely divided suspension of 19 parts of cyanuric chloride in 200 parts of ice-water, the pH is then brought to 8.5 to 9 with sodium hydroxide solution and the reaction is brought to completion at 0° to 3° C. and at a pH of 8.5 in the course of one hour, with further stirring. The solution formed is then brought to a pH of 5 with aqueous hydrochloric acid; 24.3 parts of 4-hydroxy-7-methylamino-naphthalene-2-sulfonic acid are added and the condensation reaction is carried out at 20° C. and at a pH of 3 to 3.5 for 2 hours. The sulfuric acid suspension of the diazonium salt, prepared in the customary manner, of 28.8 parts of 2-aminophthalene-1,5-disulfonic acid is then added to the solution of the coupling component thus obtained and the coupling reaction is carried out at 10° to 20° C. and at a pH of 6 to 6.5. 29.5 parts of 3-($\beta$-sulfatoethylsulfonyl)-aniline are then added and the condensation reaction is carried out at 85° C. a pH of 3.5 to 4 being maintained.

The resulting fiber-reactive dyestuff, which, written in the form of the free acid, has the formula

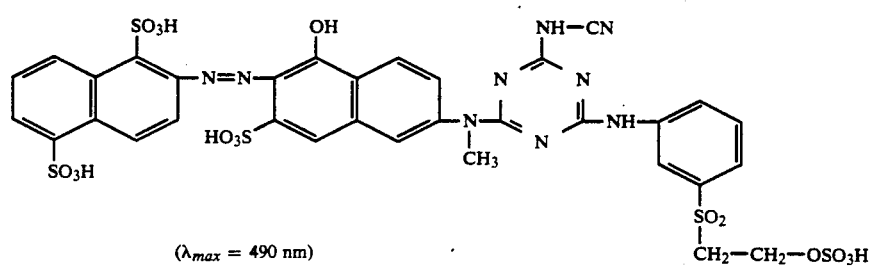

($\lambda_{max}$ = 490 nm)

is isolated as an alkali metal salt (sodium salt), for example after clarification of the synthesis solution by means of kieselguhr and filtration, by evaporation of the filtrate under reduced pressure or by spray drying. The dyestuff according to the invention produces, by the application and fixing processes customary in the art for fiber-reactive dyestuffs, deep orange dyeings having good fastness properties, of which good fastness to water and overdyeing may be emphasized in particular, on the materials, mentioned in the description, such as, in particular, cellulose fiber materials, for example cotton. It is furthermore distinguished by a high degree of fixing on cotton.

nantly the potassium salt) by salting out by means of potassium chloride.

It has, written in the form of the free acid, the formula

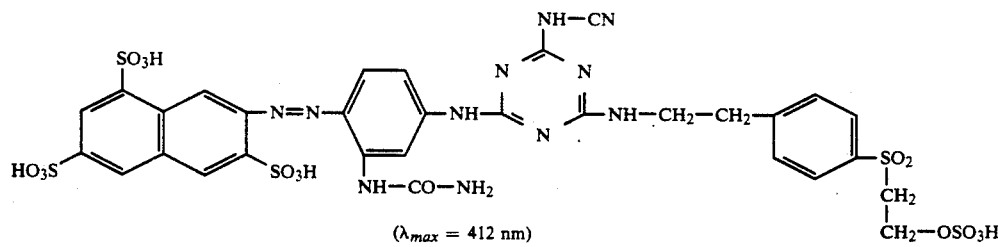

($\lambda_{max}$ = 412 nm)

and dyes the materials mentioned in the description, such as, in particular, cellulose fiber materials, for example cotton, in deep, reddish-tinged yellow fast shades.

Example 4

45.3 parts of 3-(2'-sulfo-4'-methoxy-phenylazo)-4-hydroxy-7-amino-naphthalene-2-sulfonic acid are reacted in aqueous solution with 19 parts of cyanuric chloride at a temperature of 0° to 3° C. and at a pH of 3.5 to 4. When the condensation reaction has ended, 20.4 parts of γ-(β'-hydroxyethylsuflonyl)-propylamine hydrochloride are added and the second condensation reaction is brought to completion at 60° C. and at a pH of 7 in the course of about 2 hours (as in the previous examples, the reaction can be monitored by thin layer chromatography). 4.4 parts of cyanamide are then added and the third condensation reaction is carried out at a pH of 10 and at a temperature of 85° C. The azo compound formed, which contains the β-hydroxyethylsulfonyl group, is salted out by means of potassium chloride, after the synthesis solution has been brought to a pH of 7, and is isolated and dried. 10 parts of this product, which is about 70% pure with respect to the

Example 3

54.5 parts of 3-ureido-4-(3',6',8'-trisulfo-2'-naphthylazo)-aniline are reacted in aqueous solution with 19 parts of finely dispersed cyanuric chloride at 0° to 5° C. and at a pH of 4. 4.4 parts of cyanamide are then added and the second condensation reaction is carried out at a pH between 9.5 and 10 and at a temperature between 60° and 70° C. for about two hours. After addition of 23 parts of 4-(β-hydroxyethylsulfonyl)-phenethylamine, the third condensation reaction is carried out at a pH of 9 and at a temperature of 80° to 90° C. When the reaction has ended, the azo compound formed, of the formula (written in the form of the free acid)

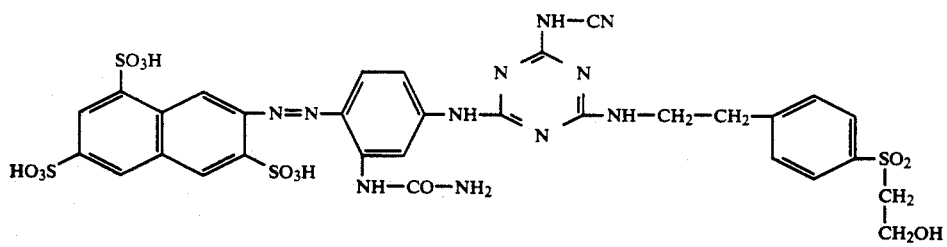

is salted out by means of potassium chloride from its synthesis solution, which has been brought to a pH of 7, and is isolated and dried. The resulting orange-red powder contains the azo compound to the extent of about 70%.

10 parts of this powder are introduced into 100% strength sulfuric acid at 5° to 10° C., while stirring. When the product has dissolved completely, this mixture is poured onto 80 parts of ice and carefully brought to a pH of 6 by means of dilute aqueous potassium hydroxide solution. The dyestuff according to the invention formed is isolated as an alkali metal salt (predomiazo compound, are introduced into 15 parts of 100% strength sulfuric acid at 5° to 10° C., while stirring. When the azo compound has dissolved, the mixture is poured onto 80 parts of ice and neutralized by means of calcium carbonate, the calcium sulfate which is precipitated is filtered off with suction, the residue is washed with water and the filtrate is evaporated under reduced pressure.

The azo compound according to the invention obtained as an alkali metal salt (sodium salt) has, written in the form of the free acid, the formula

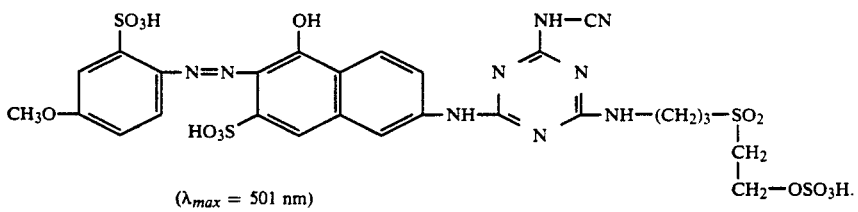

($\lambda_{max}$ = 501 nm)

It exhibits very good fiber-reactive dyestuff properties and dyes the materials mentioned in the description, such as, in particular, cellulose fiber materials, such as cotton, in deep, bright scarlet-red shades with a high degree of fixing.

Example 5

14.2 parts of cyanuric chloride are slowly added to 31.9 parts of 4-hydroxy-5-amino-naphthalene-2,6-disulfonic acid in 800 parts of water at a temperature of 0° C. and at a pH of 4.5 in the course of 5 minutes. 22.3 parts of γ-(β'-chloroethylsulfonyl)-propylamine hydrochloride are then added, while further stirring and maintaining a pH of 7 and a temperature of 5° to 15° C., and the mixture is subsequently stirred for some time, until starting material is no longer detectable by thin layer chromatography. 4.25 parts of cyanamide are then added and the condensation reaction is carried out at a temperature of 50° to 60° C. and at a pH of 6.5 for about 4 hours.

The aqueous hydrochloric acid solution, prepared in the customary manner, of the diazonium salt of 51.1 parts of 2-amino-6-(β-sulfatoethylsulfonyl)-naphthalene-1-sulfonic acid is added to the coupling component thus prepared, in the synthesis solution, and the coupling reaction is carried out at 15° to 30° C. and at a pH of 6.

After clarification of the synthesis solution at a pH of 5.5, the resulting dyestuff according to the invention is isolated as an alkali metal salt (sodium salt) by spray drying. It has, written in the form of the free acid, the formula and exhibits very good fiber-reactive dyestuff properties. When used by the application and fixing processes customary in the art for fiber-reactive dyestuffs, it produces, for example, deep, bluish-tinged red fast dyeings and prints at a high degree of fixing on cellulose fiber materials, such as cotton.

Examples 6 to 123

Further azo dyestuffs according to the invention are described in the following tabular examples with the aid of the components corresponding to the formula (A)

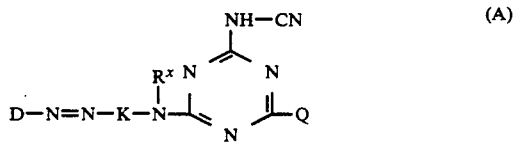

They can be prepared in the manner according to the invention, for example analogously to one of the above embodiment examples, using the components which can be seen from the particular tabular example in association with the formula (A) such as the diazo component D—NH$_2$, the coupling component H—K—NR$^x$H, a halotriazine, cyanamide and an amine of the formula H-Q). They have very good fiber-reactive dyestuff properties and dye the materials mentioned in the description, in particular cellulose fiber materials, such as cotton, in the shades stated in the particular tabular example (cotton for this purpose) with a good depth of color and with good fastness properties.

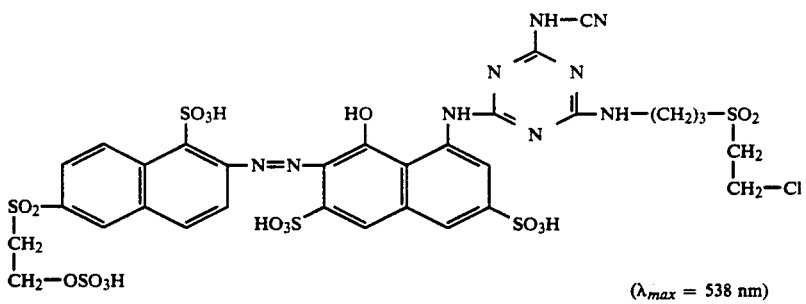

($\lambda_{max}$ = 538 nm)

| Example | Radical —D | Radical —K—N(R$^x$)— | Radical —Q | Color shade |
|---|---|---|---|---|
| 6 | 3,6,8-trisulfo-naphth-2-yl | 3-ureido-4,1-phenylene-1-amino | 3-(β-sulfatoethyl-sulfonyl)-phenylamino | reddish-tinged yellow (414) |
| 7 | 3,6,8-trisulfo-naphth-2-yl | 3-ureido-4,1-phenylene-1-amino | γ-(β-sulfatoethyl-sulfonyl)-propylamino | reddish-tinged yellow |
| 8 | 3,6,8-trisulfo-naphth-2-yl | 3-ureido-4,1-phenylene-1-amino | 3-(vinylsulfonyl)-phenylamino | reddish-tinged yellow |
| 9 | 4,8-disulfonaphth-2-yl | 3-acetylamino-4,1-phenylene-1-amino | 3-(β-sulfatoethyl-sulphonyl)-phenylamino | reddish-tinged yellow |
| 10 | 4,8-disulfonaphth-2-yl | 3-acetylamino-4,1-phenylene-1-amino | 4-(β-sulfatoethyl-sulfonyl)-phenylamino | reddish-tinged yellow |

| Example | Radical —D | Radical —K—N(R$^x$)— | Radical —Q | Color shade |
|---|---|---|---|---|
| 11 | 4,8-disulfonaphth-2-yl | 3-acetylamino-4,1-phenylene-1-amino | β-[4-(β'-sulfatoethyl-sulfonyl)-phen]-ethylamino | reddish-tinged yellow |
| 12 | 4,8-disulfonaphth-2-yl | 3-acetylamino-4,1-phenylene-1-amino | γ-(β-sulfatoethyl-sulfonyl)-propylamino | reddish-tinged yellow |
| 13 | 4,8-disulfonaphth-2-yl | 3-acetylamino-4,1-phenylene-1-amino | bis-[β-(β'-chloroethyl-sulfonyl)-ethyl]-amino | reddish-tinged yellow |
| 14 | 4,8-disulfonaphth-2-yl | 3-acetylamino-4,1-phenylene-1-amino | 2-methoxy-5-(β-sulfato-ethylsulfonyl)-phenylamino | reddish-tinged yellow |
| 15 | 4,6,8-trisulfo-naphth-2-yl | 3-methyl-4,1-phenylylene-1-amino [sic] | 3-(vinylsulfonyl)-phenylamino | reddish-tinged yellow |
| 16 | 4,6,8-trisulfo-naphth-2-yl | 3-methyl-4,1-phenylylene-1-amino [sic] | 4-(β-sulfatoethyl-sulfonyl)-phenylamino | reddish-tinged yellow |
| 17 | 4,6,8-trisulfo-naphth-2-yl | 3-methyl-4,1-phenylylene-1-amino [sic] | γ-(β'-sulfatoethyl-sulfonyl)-propylamino | reddish-tinged yellow |
| 18 | 6-(β-sulfatoethyl-sulfonyl)-1-sulfo-napth-2-yl | 3-acetylamino-4,1-phenylene-1-amino | 3-(β-sulfatoethyl-sulfonyl)-phenylamino | reddish-tinged yellow |
| 19 | 6-(β-sulfatoethyl-sulfonyl)-1-sulfo-napth-2-yl | 3-acetylamino-4,1-phenylene-1-amino | 4-(β-sulfatoethyl-sulfonyl)-phenylamino | reddish-tinged yellow |
| 20 | 6-(β-sulfatoethyl-sulfonyl)-1-sulfo-napth-2-yl | 3-ureido-4,1-phenylene-1-amino | 4-(β-sulfatoethyl-sulfonyl)-phenylamino | reddish-tinged yellow |
| 21 | 6-(β-sulfatoethyl-sulfonyl)-1-sulfo-napth-2-yl | 3-ureido-4,1-phenylene-1-amino | 3-(β-sulfatoethyl-sulfonyl)-phenylamino | reddish-tinged yellow |
| 22 | 4-(β-sulfatoethyl-sulfonyl)-phenyl | 3-amino-4-sulfo-6,1-phenylene-1-amino | 4-(β-sulfatoethyl-sulfonyl)-phenylamino | golden yellow |
| 23 | 4-(β-sulfatoethyl-sulfonyl)-phenyl | 3-amino-4-sulfo-6,1-phenylene-1-amino | 3-(β-sulfatoethyl-sulfonyl)-phenylamino | golden yellow |
| 24 | 4-(β-sulfatoethyl-sulfonyl)-phenyl | 3-amino-4-sulfo-6,1-phenylene-1-amino | γ-(β'-sulfatoethyl-sulfonyl)-propylamino | golden yellow |
| 25 | 4-(β-sulfatoethyl-sulfonyl)-phenyl | 3-amino-4-sulfo-6,1-phenylene-1-amino | β-[4-(β'-sulfatoethyl-sulfonyl)-phen]-ethyl-amino | golden yellow |
| 26 | 2-sulfo-4-(β-sulfato-ethylsulfonyl)-phenyl | 3-amino-4-sulfo-6,1-phenylene-1-amino | 3-(β-sulfatoethyl-sulfonyl)-phenylamino | golden yellow |
| 27 | 2-sulfo-4-(β-sulfato-ethylsulfonyl)-phenyl | 3-amino-4-sulfo-6,1-phenylene-1-amino | 4-(β-sulfatoethyl-sulfonyl)-phenylamino | golden yellow |
| 28 | 4-sulfo-phenyl | 3-amino-4-sulfo-6,1-phenylene-1-amino | 4-(β-sulfatoethyl-sulfonyl)-phenylamino | golden yellow |
| 29 | 4-sulfo-phenyl | 3-amino-4-sulfo-6,1-phenylene-1-amino | 3-(β-sulfatoethyl-sulfonyl)-phenylamino | golden yellow |
| 30 | 4-sulfo-phenyl | 3-amino-4-sulfo-6,1-phenylene-1-amino | γ-(β'-sulfatoethyl-sulfonyl)-propylamino | golden yellow |
| 31 | 4-sulfo-phenyl | 3-carboxy-pyrazol-5-on-4-yl-1-(2'-sulfo-phenyl-4'-amino) | 4-(β-sulfatoethyl-sulfonyl)-phenylamino | yellow |
| 32 | 4-sulfo-phenyl | 3-carboxy-pyrazol-5-on-4-yl-1-(2'-sulfo-phenyl-4'-amino) | 3-(β-sulfatoethyl-sulfonyl)-phenylamino | yellow |
| 33 | 4-(β-sulfatoethyl-sulfonyl)-phenyl | 3-carboxy-pyrazol-5-on-4-yl-1-(2'-sulfo-phenyl-4'-amino) | 3-(β-sulfatoethyl-sulfonyl)-phenylamino | yellow |
| 34 | 4-(β-sulfatoethyl-sulfonyl)-phenyl | 3-carboxy-pyrazol-5-on-4-yl-1-(2'-sulfo-phenyl-4'-amino) | 4-(β-sulfatoethyl-sulfonyl)-phenylamino | yellow |
| 35 | 2-sulfo-phenyl | 3-carboxy-pyrazol-5-on-4-yl-1-(2'-sulfo-phenyl-4'-amino) | 4-(β-sulfatoethyl-sulfonyl)-phenylamino | yellow |
| 36 | 2-sulfo-phenyl | 3-carboxy-pyrazol-5-on-4-yl-1-(2'-sulfo-phenyl-4'-amino) | 3-(β-sulfatoethyl-sulfonyl)-phenylamino | yellow |
| 37 | 2,5-disulfo-phenyl | 4-hydroxy-2-sulfo-3,7-naphthylene-7-amino | 3-(β-sulfatoethyl-sulfonyl)-phenylamino | orange |
| 38 | 2,5-disulfo-phenyl | 4-hydroxy-2-sulfo-3,7-naphthylene-7-amino | 4-(β-sulfatoethyl-sulfonyl)-phenylamino | orange |
| 39 | 1,5-disulfo-naphth-2-yl | 4-hydroxy-2-sulfo-3,7-naphthylene-7-amino | 4-(β-sulfatoethyl-sulfonyl)-phenylamino | orange |
| 40 | 1,5-disulfo-naphth-2-yl | 4-hydroxy-2-sulfo-3,7-naphthylene-7-amino | 3-(β-sulfatoethyl-sulfonyl)-phenylamino | orange |
| 41 | 1,5-disulfo-naphth-2-yl | 4-hydroxy-2-sulfo-3,7-naphthylene-7-amino | γ-(β'-sulfatoethyl-sulfonyl)-propylamino | orange |
| 42 | 1,5-disulfo-naphth-2-yl | 4-hydroxy-2-sulfo-3,7-naphthylene-7-amino | β-[4-(β'-sulfatoethyl-sulfonyl)-phen]-ethylamino | orange |
| 43 | 1,5-disulfo-naphth-2-yl | 4-hydroxy-2-sulfo-3,7-naphthylene-7-methylamino | 4-(β-sulfatoethyl-sulfonyl)-phenylamino | orange |
| 44 | 6-(β-sulfatoethyl-sulfonyl)-1-sulfo-naphth-2-yl | 4-hydroxy-2-sulfo-3,7-naphthylene-7-amino | 4-(β-sulfatoethyl-sulfonyl)-phenylamino | orange |
| 45 | 6-(β-sulfatoethyl- | 4-hydroxy-2-sulfo-3,7- | 3-(β-sulfatoethyl- | orange |

-continued

| Example | Radical —D | Radical —K—N(R$^x$)— | Radical —Q | Color shade |
|---|---|---|---|---|
| | sulfonyl)-1-sulfo-naphth-2-yl | naphthylene-7-amino | sulfonyl)-phenylamino | |
| 46 | 4-methoxy-2-sulfo-phenyl | 4-hydroxy-2-sulfo-3,7-naphthylene-7-amino | β-[4-(β'-sulfatoethyl-sulfonyl)-phen]-ethylamino | scarlet |
| 47 | 4-methoxy-2-sulfo-phenyl | 4-hydroxy-2-sulfo-3,7-naphthylene-7-amino | 4-(β-sulfatoethyl-sulfonyl)-phenylamino | scarlet |
| 48 | 4-methoxy-2-sulfo-phenyl | 4-hydroxy-2-sulfo-3,7-naphthylene-7-amino | N-ethyl-N-[4-(β-sulfato-ethylsulfonyl)-phenyl]-amino | scarlet |
| 49 | 4-methoxy-2-sulfo-phenyl | 4-hydroxy-2-sulfo-3,7-naphthylene-7-amino | 3,4-di-(β-sulfatoethyl-sulfonyl)-phenylamino | scarlet |
| 50 | 4-methoxy-2-sulfo-phenyl | 4-hydroxy-2-sulfo-3,7-naphthylene-7-amino | 2-methoxy-5-(β-sulfato-ethylsulfonyl)-phenyl-amino | scarlet |
| 51 | 4-methoxy-2-sulfo-phenyl | 4-hydroxy-2-sulfo-3,7-naphthylene-7-amino | 6-(β-sulfatoethyl-sulfonyl)-naphth-2-yl-amino | scarlet |
| 52 | 4-methoxy-2-sulfo-phenyl | 4-hydroxy-2-sulfo-3,7-naphthylene-7-amino | 2,5-di-(β-sulfatoethyl-sulfonylmethyl)-phenyl-amino | scarlet |
| 53 | 4-methoxy-2-sulfo-phenyl | 4-hydroxy-2-sulfo-3,7-naphthylene-7-amino | 3,5-di-{N-(γ-(β'-sulfato-ethylsulfonyl)-propyl]-amidocarbonyl}-phenylamino | scarlet |
| 54 | 4-methoxy-3-(β-sulfatoethylsulfonyl)-phenyl | 4-hydroxy-2-sulfo-3,7-naphthylene-7-amino | 3-(β-sulfatoethyl-sulfonyl)-phenylamino | scarlet |
| 55 | 4-methoxy-3-(β-sulfatoethylsulfonyl)-phenyl | 4-hydroxy-2-sulfo-3,7-naphthylene-7-amino | 4-(β-sulfatoethyl-sulfonyl)-phenylamino | scarlet |
| 56 | 4-(β-sulfatoethyl-sulfonyl)-phenyl | 4-hydroxy-2-sulfo-3,6-naphthylene-6-amino | 4-(β-sulfatoethyl-sulfonyl)-phenylamino | yellowish-tinged red |
| 57 | 4-(β-sulfatoethyl-sulfonyl)-phenyl | 4-hydroxy-2-sulfo-3,6-naphthylene-6-amino | 3-(β-sulfatoethyl-sulfonyl)-phenylamino | yellowish-tinged red |
| 58 | 4-(β-sulfatoethyl-sulfonyl)-phenyl | 4-hydroxy-2,8-disulfo-3,5-naphthylene-5-amino | 3-(β-sulfatoethyl-sulfonyl)-phenylamino | yellowish-tinged red (517) |
| 59 | 4-(β-sulfatoethyl-sulfonyl)-phenyl | 4-hydroxy-2,8-disulfo-3,5-naphthylene-5-amino | 4-(β-sulfatoethyl-sulfonyl)-phenylamino | yellowish-tinged red |
| 60 | 4-methoxy-2-sulfo-phenyl | 4-hydroxy-2-sulfo-3,6-naphthylene-6-amino | 4-(β-sulfatoethyl-sulfonyl)-phenylamino | yellowish-tinged red |
| 61 | 4-methoxy-2-sulfo-phenyl | 4-hydroxy-2-sulfo-3,6-naphthylene-6-amino | 3-(β-sulfatoethyl-sulfonyl)-phenylamino | yellowish-tinged red |
| 62 | 2-sulfo-phenyl | 4-hydroxy-2,7-disulfo-3,5-naphthylene-5-amino | 3-(β-sulfatoethyl-sulfonyl)-phenylamino | red |
| 63 | 2-sulfo-phenyl | 4-hydroxy-2,7-disulfo-3,5-naphthylene-5-amino | 4-(β-sulfatoethyl-sulfonyl)-phenylamino | red |
| 64 | 2-sulfo-phenyl | 4-hydroxy-2,8-disulfo-3,5-naphthylene-5-amino | 3-(β-sulfatoethyl-sulfonyl)-phenylamido | yellowish-tinged red |
| 65 | 2-sulfo-phenyl | 4-hydroxy-2,8-disulfo-3,5-naphthylene-5-amino | 4-(β-sulfatoethyl-sulfonyl)-phenylamido | yellowish-tinged red |
| 66 | 2,5-dicarboxyphenyl | 4-hydroxy-2,8-disulfo-3,5-naphthylene-5-amino | 4-(β-sulfatoethyl-sulfonyl)-phenylamido | yellowish-tinged red |
| 67 | 2,5-dicarboxyphenyl | 4-hydroxy-2,8-disulfo-3,5-naphthylene-5-amino | 3-(β-sulfatoethyl-sulfonyl)-phenylamido | yellowish-tinged red |
| 68 | 2,5-dicarboxyphenyl | 4-hydroxy-2,7-disulfo-3,5-naphthylene-5-amino | 3-(β-sulfatoethyl-sulfonyl)-phenylamino | red |
| 69 | 2,5-dicarboxyphenyl | 4-hydroxy-2,7-disulfo-3,5-naphthylene-5-amino | 4-(β-sulfatoethyl-sulfonyl)-phenylamino | red |
| 70 | 2,5-dicarboxyphenyl | 4-hydroxy-2,7-disulfo-3,5-naphthylene-5-amino | γ-(β'-sulfatoethyl-sulfonyl)-propylamino | red |
| 71 | 2,5-dicarboxyphenyl | 4-hydroxy-2,7-disulfo-3,5-naphthylene-5-amino | β-[4-(β'-sulfatoethyl-sulfonyl)-phen]-ethyl-amino | red |
| 72 | 1,5-disulfonaphth-2-yl | 4-hydroxy-2,7-disulfo-3,5-naphthylene-5-amino | β-[4-(β'-sulfatoethyl-sulfonyl)-phen]-ethyl-amino | bluish-tinged red |
| 73 | 1,5-disulfonaphth-2-yl | 4-hydroxy-2,7-disulfo-3,5-naphthylene-5-amino | 4-(β-sulfatoethyl-sulfonyl)-phenylamino | bluish-tinged red |
| 74 | 1,5-disulfonaphth-2-yl | 4-hydroxy-2,7-disulfo-3,5-naphthylene-5-amino | 3-(β-sulfatoethyl-sulfonyl)-phenylamino | bluish-tinged red |
| 75 | 1,5-disulfonaphth-2-yl | 4-hydroxy-2,7-disulfo-3,5-naphthylene-5-amino | N-ethyl-N-[4-(β-sulfato-ethylsulfonyl)-phenyl]-amino | bluish-tinged red |
| 76 | 1,5-disulfonaphth-2-yl | 4-hydroxy-2,7-disulfo-3,5-naphthylene-5-amino | γ-(β'-sulfatoethyl-sulfonyl)-propylamino | bluish-tinged red |

-continued

| Example | Radical —D | Radical —K—N(R$^x$)— | Radical —Q | Color shade |
|---|---|---|---|---|
| 77 | 1,5-disulfonaphth-2-yl | 4-hydroxy-2,8-disulfo-3,5-naphthylene-5-amino | 4-(β-sulfatoethyl-sulfonyl)-phenylamino | red |
| 78 | 4-(β-sulfatoethyl-sulfonyl)-phenyl | 4-hydroxy-2,8-disulfo-3,5-naphthylene-5-amino | 4-(β-sulfatoethyl-sulfonyl)-phenylamino | red |
| 79 | 4-(β-sulfatoethyl-sulfonyl)-phenyl | 4-hydroxy-2,8-disulfo-3,5-naphthylene-5-amino | 3-(β-sulfatoethyl-sulfonyl)-phenylamino | red |
| 80 | 4-(β-sulfatoethyl-sulfonyl)-phenyl | 4-hydroxy-2,7-disulfo-3,5-napthylene-5-amino | 3-(β-sulfatoethyl-sulfonyl)-phenylamino | red |
| 81 | 4-(β-sulfatoethyl-sulfonyl)-phenyl | 4-hydroxy-2,7-disulfo-3,5-napthylene-5-amino | 4-(β-sulfatoethyl-sulfonyl)-phenylamino | red |
| 82 | 4-(β-sulfatoethyl-sulfonyl)-phenyl | 4-hydroxy-2,7-disulfo-3,5-napthylene-5-amino | γ-(β'-sulfatoethyl-sulfonyl)-propylamino | red |
| 83 | 4-(β-sulfatoethyl-sulfonyl)-phenyl | 4-hydroxy-2,7-disulfo-3,5-napthylene-5-amino | β-[4-(β'-sulfatoethyl-sulfonyl)-phen]-ethylamino | red |
| 84 | 4-(β-sulfatoethyl-sulfonyl)-phenyl | 4-hydroxy-2,7-disulfo-3,5-napthylene-5-amino | 2-methoxy-5-(β-sulfato-ethylsulfonyl)-phenyl-amino | red |
| 85 | 3-(β-sulfatoethyl-sulfonyl)-phenyl | 4-hydroxy-2,7-disulfo-3,5-napthylene-5-amino | 4-(β-sulfatoethyl-sulfonyl)phenylamino | red |
| 86 | 2-sulfo-4-(β-sulfatoethyl-sulfonyl)-phenyl | 4-hydroxy-2,7-disulfo-3,5-napthylene-5-amino | 4-(β-sulfatoethyl-sulfonyl)phenylamino | yellowish-tinged red |
| 87 | 6-(β-sulfatoethyl-sulfonyl)-1-sulfo-naphth-2-yl | 4-hydroxy-2,7-disulfo-3,5-napthylene-5-amino | 4-(β-sulfatoethyl-sulfonyl)phenylamino | bluish-tinged red |
| 88 | 6-(β-sulfatoethyl-sulfonyl)-1-sulfo-naphth-2-yl | 4-hydroxy-2,7-disulfo-3,5-napthylene-5-amino | 3-(β-sulfatoethyl-sulfonyl)-phenylamino | bluish-tinged red |
| 89 | 6-(β-sulfatoethyl-sulfonyl)-1-sulfo-naphth-2-yl | 4-hydroxy-2,7-disulfo-3,5-napthylene-5-amino | γ-(β'-sulfatoethyl-sulfonyl)-propylamino | bluish-tinged red |
| 90 | 6-(β-sulfatoethyl-sulfonyl)-1-sulfo-naphth-2-yl | 4-hydroxy-2,8-disulfo-3,5-naphthylene-5-amino | 4-(β-sulfatoethyl-sulfonyl)-phenylamino | red |
| 91 | 6-(β-sulfatoethyl-sulfonyl)-1-sulfo-naphth-2-yl | 4-hydroxy-2,8-disulfo-3,5-naphthylene-5-amino | 3-(β-sulfatoethyl-sulfonyl)-phenylamino | red |
| 92 | 3-sulfo-4-phenylamino-phenyl | 4-hydroxy-2,7-disulfo-3,5-naphthylene-5-amino | 3-(β-sulfatoethyl-sulfonyl)-phenylamino | blue |
| 93 | 3-sulfo-4-phenylamino-phenyl | 4-hydroxy-2,7-disulfo-3,5-naphthylene-5-amino | 4-(β-sulfatoethyl-sulfonyl)-phenylamino | blue |
| 94 | 3-sulfo-4-(2'-methoxy-phenylamino)-phenyl | 4-hydroxy-2,7-disulfo-3,5-naphthylene-5-amino | 4-(β-sulfatoethyl-sulfonyl)-phenylamino | blue |
| 95 | 3-sulfo-4-(2'-methoxy-phenylamino)-phenyl | 4-hydroxy-2,7-disulfo-3,5-naphthylene-5-amino | 3-(β-sulfatoethyl-sulfonyl)-phenylamino | blue |
| 96 | 4-(3',6',8'-trisulfo-naphth-2'-yl-azo)-2-methoxy-5-methyl-phenyl | 4-hydroxy-2,7-disulfo-3,5-naphthylene-5-amino | 3-(β-sulfatoethyl-sulfonyl)-phenylamino | blue |
| 97 | 4-(3',6',8'-trisulfo-naphth-2'-yl-azo)-2-methoxy-5-methyl-phenyl | 4-hydroxy-2,7-disulfo-3,5-naphthylene-5-amino | 4-(β-sulfatoethyl-sulfonyl)-phenylamino | blue |
| 98 | 4-(3',6',8'-trisulfo-naphth-2'-yl-azo)-2-methoxy-5-methyl-phenyl | 4-hydroxy-2,7-disulfo-3,5-naphthylene-5-amino | γ-(β'-sulfatoethyl-sulfonyl)-propylamino | blue |
| 99 | 4-(4'-methoxy-2'-sulfo-phenylazo)-6-sulfo-naphth-1-yl | 6-sulfo-4,1-naphthylene-1-amino | 4-(β-sulfatoethyl-sulfonyl)-phenylamino | brown |
| 100 | 4-(4'-methoxy-2'-sulfo-phenylazo)-6-sulfo-naphth-1-yl | 6-sulfo-4,1-naphthylene-1-amino | 3-(β-sulfatoethyl-sulfonyl)-phenylamino | brown |
| 101 | 4-(4'-methoxy-2'-sulfo-phenylazo)-6-sulfo-naphth-1-yl | 6-sulfo-4,1-naphthylene-1-amino | γ-(β'-sulfatoethyl-sulfonyl)-propylamino | brown |
| 102 | 4-(4'-methoxy-2'-sulfo-phenylazo)-7-sulfo-naphth-1-yl | 7-sulfo-4,1-naphthylene-1-amino | 3-(β-sulfatoethyl-sulfonyl)-phenylamino | brown |
| 103 | 4-(4',6',8'-tri-sulfo-naphth-2-ylazo)-6-sulfo-naphth-1-yl | 3-methyl-4,1-phenylene-1-amino | 3-(β-sulfatoethyl-sulfonyl)-phenylamino | brown |
| 104 | 4-(4',6',8'-tri-sulfo-naphth-2-ylazo)-6-sulfo-naphth-1-yl | 3-methyl-4,1-phenylene-1-amino | 4-(β-sulfatoethyl-sulfonyl)-phenylamino | brown |
| 105 | 4-(4',6',8'-tri-sulfo-naphth-2-ylazo)-6-sulfo-naphth-1-yl | 3-methyl-4,1-phenylene-1-amino | γ-(β'-sulfatoethyl-sulfonyl)-propylamino | brown |
| 106 | 4-(2',5',7'-trisulfo- | 6-sulfo-4,1-napthylene- | γ-(β'-sulfatoethyl- | brown |

-continued

| Example | Radical —D | Radical —K—N(Rˣ)— | Radical —Q | Color shade |
|---|---|---|---|---|
| | naphth-1'-ylazo)-2,5-dimethyl-phenyl | 1-amino | sulfonyl)-propylamino | |
| 107 | 4-(2',5',7'-trisulfo-naphth-1'-ylazo)-2,5-dimethyl-phenyl | 6-sulfo-4,1-napthylene-1-amino | 4-(β-sulfatoethyl-sulfonyl)-phenylamino | brown |
| 108 | 4-(2'.5',7'-trisulfo-naphth-1'-ylazo)-2,5-dimethyl-phenyl | 6-sulfo-4,1-napthylene-1-amino | 3-(β-sulfatoethyl-sulfonyl)-phenylamino | brown |
| 109 | 1:2 chromium complex of: 2-hydroxy-6-(β-sulfato-ethylsulfonyl)-phenyl | 4-hydroxy-2,7-disulfo-3,5-naphthylene-5-amino | 3-(β-sulfatoethyl-sulfonyl)-phenylamino | navy blue |
| 110 | 1:2 chromium complex of: 2-hydroxy-6-(β-sulfato-ethylsulfonyl)-phenyl | 4-hydroxy-2,7-disulfo-3,5-naphthylene-5-amino | 4-(β-sulfatoethyl-sulfonyl)-phenylamino | navy blue |
| 111 | 1:2 cobalt complex of: 2-hydroxy-6-(β-sulfato-ethylsulfonyl)-phenyl | 4-hydroxy-2,7-disulfo-3,5-naphthylene-5-amino | 4-(β-sulfatoethyl-sulfonyl)-phenylamino | violet |
| 112 | 1:2 cobalt complex of: 2-hydroxy-6-(β-sulfato-ethylsulfonyl)-phenyl | 4-hydroxy-2,7-disulfo-3,5-naphthylene-5-amino | 3-(β-sulfatoethyl-sulfonyl)-phenylamino | violet |
| 113 | 1:1 nickel complex of: 2-hydroxy-6-(β-sulfato-ethylsulfonyl)-phenyl | 4-hydroxy-2,7-disulfo-3,5-naphthylene-5-amino | 3-(β-sulfatoethyl-sulfonyl)-phenylamino | claret |
| 114 | 1:1 nickel complex of: 2-hydroxy-6-(β-sulfato-ethylsulfonyl)-phenyl | 4-hydroxy-2,7-disulfo-3,5-naphthylene-5-amino | 4-(β-sulfatoethyl-sulfonyl)-phenylamino | claret |
| 115 | 1:1 copper complex of: 4,8-disulfo-1-hydroxy-naphth-2-yl | 4-hydroxy-2,7-disulfo-3,5-naphthylene-5-amino | 4-(β-sulfatoethyl-sulfonyl)-phenylamino | blue |
| 116 | 1:1 copper complex of: 4,8-disulfo-1-hydroxy-naphth-2-yl | 4-hydroxy-2,7-disulfo-3,5-naphthylene-5-amino | 3-(β-sulfatoethyl-sulfonyl)-phenylamino | blue |
| 117 | 1:2 chromium complex of: 2-carboxyphenyl | 4-hydroxy-2-sulfo-3,7-naphthylene-7-amino | 3-(β-sulfatoethyl-sulfonyl)-phenylamino | red-brown |
| 118 | 1:2 chromium complex of: 2-carboxyphenyl | 4-hydroxy-2-sulfo-3,7-naphthylene-7-amino | 4-(β-sulfatoethyl-sulfonyl)-phenylamino | red-brown |
| 119 | 1:2 cobalt complex of: 2-hydroxy-6-nitro-phenyl | 4-hydroxy-2,7-disulfo-3,5-naphthylene-5-amino | 4-(β-sulfatoethyl-sulfonyl)-phenylamino | gray |
| 120 | 1:2 cobalt complex of: 2-hydroxy-6-nitro-phenyl | 4-hydroxy-2,7-disulfo-3,5-naphthylene-5-amino | 3-(β-sulfatoethyl-sulfonyl)-phenylamino | gray |
| 121 | 1:2 chromium complex of: 2-hydroxy-6-nitro-phenyl | 4-hydroxy-2,7-disulfo-3,5-naphthylene-5-amino | 3-(β-sulfatoethyl-sulfonyl)-phenylamino | black |
| 121a | 1:2 chromium complex of: 2-hydroxy-6-nitro-phenyl | 4-hydroxy-2,7-disulfo-3,5-naphthylene-5-amino | 4-(β-sulfatoethyl-sulfonyl)-phenylamino | black |
| 122a | 4,8-disulfo-naphth-2-yl | 3-ureido-4,1-phenylene-1-amino | 4-(β-sulfatoethyl-sulfonyl)-phenylamino | reddish-tinged yellow |
| 122b | 4,8-disulfo-naphth-2-yl | 3-ureido-4,1-phenylene-1-amino | 3-(β-sulfatoethyl-sulfonyl)-phenylamino | reddish-tinged yellow |
| 122c | 2-sulfo-4-methoxy-phenyl | 4-hydroxy-2-sulfo-3,7-naphthylene-7-amino | 4-(β-sulfatoethyl-sulfonyl)-phenylamino | scarlet-red |
| 122d | 4-methoxy-2,5-disulfophenyl | 4-hydroxy-2-sulfo-3,7-naphthylene-7-amino | 3-(β-sulfatoethyl-sulfonyl)-phenylamino | orange (496) |
| 122e | 4-(4',8'-disulfo-naphth-2'-yl-azo)-6-sulfo-naphth-1-yl | 6-sulfo-4,1-naphthylene-1-amino | 3-(β-sulfatoethyl-sulfonyl)-phenylamino | brown (454) |
| 122f | 3-(β-sulfatoethyl-sulfonyl)-phenyl-amino | ⌬—SO₃H | 5-amino-4-hydroxy-6-{2'-sulfo-5'-[2''-cyanamido-4''-(3''-β-sulfatoethylsulfonyl-phenyl)-amino-1'',3'',5''-tri-azin-6''-yl]-amino-phenyl-azo}-2,7-disulfo-naphth-3-yl | navy blue |
| 123 | 3,6,8-trisulfo-naphth-2-yl | 3-ureido-4,1-phenylene-1-amino | 4-(β-sulfatoethyl-sulfonyl)-phenylamino | reddish-tinged blue |

Example 124

48.3 parts of 1-(4'-sulfophenyl)-3-carboxy-4-(5''-amino-2''-sulfo-phenylazo)-5-pyrazolone are reacted in aqueous solution with 19 parts of cyanuric chloride at 0° to 3° C. and at a pH of 3.5 to 4. 4.4 parts of cyanamide are then added, the pH is brought to 10 by means of aqueous sodium hydroxide solution and the mixture is heated to 50° to 60° C. It is subsequently stirred at 50° to 60° C. for a further 90 to 120 minutes, the pH being kept between 9.5 and 10, and when the condensation reaction has ended aqueous hydrochloric acid is added until the pH reaches 5, 29.5 parts of 3-(βsulfatoethylsulfonyl-)aniline are then added and the mixture is heated to 85° C. and further stirred until condensation reaction is complete, a pH of 3.5 to 4 being maintained.

The azo dyestuff according to the invention formed is isolated in the form of its alkali metal salt (sodium salt) by evaporation of the synthesis solution under reduced pressure or by spray drying. It has, written in the form of the free acid, the formula carried out by slowly adding this mixture to a mixture of 50 parts by volume of concentrated hydrochloric acid and 600 parts of ice. The mixture is subsequently stirred for about a further 2 hours and any excess of nitrous acid is destroyed in the customary manner by means of sulfamic acid.

The resulting diazonium salt suspension is then added to an aqueous solution of the sodium slat of 60 parts of 4-hydroxy-5-amino-6-[4'-(βsulfatoethylsulfonyl)-phenylazo]-naphthalene-2,7-disulfonic acid. The cou-

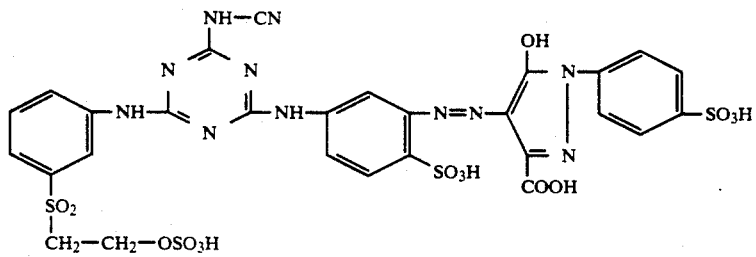

and has very good fiber-reactive dyestuff properties. When used by the known techniques, it dyes the materials mentioned in the description, such as, in particular, cellulose fiber materials, in deep, yellow shades with good fastness properties, and is distinguished by a very high fixing yield both for dyeing by the exhaust process between 40° and 80° C. and for dyeing by the cold pad-batch dyeing processes.

Example 125

18.8 parts of 1,3-diaminobenzene-4-sulfonic acid are added to a suspension of 19 parts of cyanuric chloride in 200 parts of ice-water. The mixture is stirred first at 0° to 5° C. and at a pH of 2.5 for about two hours and then at 0° to 5° C. and at a pH of 4 for about 30 minutes. 4.4 parts of cyanamide are then added, the pH is brought to 10 by means of sodium hydroxide solution, the temperature is slowing increased to 50° to 60° C. and the mixture is further stirred for about another 1.5 hours, a pH of 10 and a temperature of 50° to 60° C. being maintained. The pH is then brought to 7 by means of aqueous hydrochloric acid, 20 parts by volume of an aqueous 5 N sodium nitrite solution are added diazotization is pling reaction is carried out at 15° to 25° C. and at a pH of 4.5 to 5.5, 29.5 parts of 4-(β-sulfatoethylsulfonyl)-aniline are then added and the condensation reaction is carried out at 85° C. and at a pH of 3.5 to 4 for about 2 hours. The mixture is subsequently clarified with a little kieselguhr at about 40° C. and filtered and the filtrate is evaporated.

A black powder, containing electrolyte, of the alkali metal salt (sodium salt) of the diazo compound of the formula

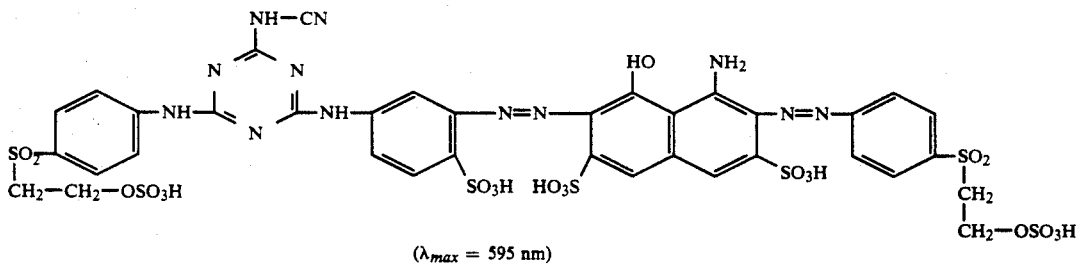

($\lambda_{max}$ = 595 nm)

is obtained. It has very good fiber-reactive dyestuff properties and dyes cotton, for example, in strong navy blue shades.

Example 126

To prepare an azo dyestuff according to the invention, the procedure is in accordance with the procedure of Example 125, but instead of the 29.5 parts of 4-(β-sulfatoetylsulfonyl)-aniline in the reaction with the chlorotriazine compound, the same amount of 3-(βsulfatoethylsulfonyl)-aniline is employed.

The alkali metal salt of the disazo compound of the formula

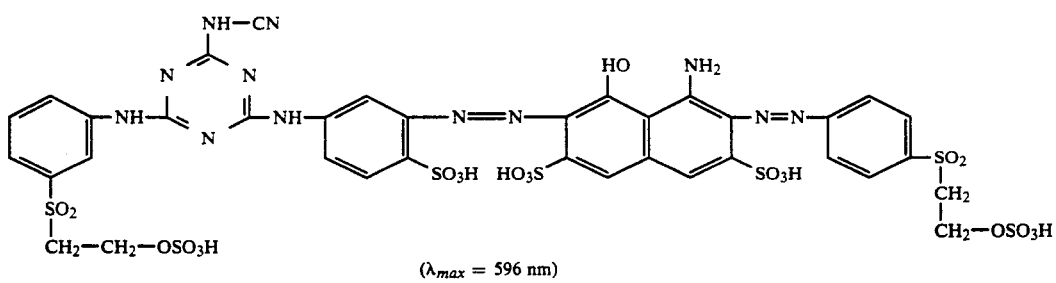

($\lambda_{max}$ = 596 nm)

which, for example, dyes cotton in strong navy blue shades, is obtained.

Examples 127 to 165

Further azo dyestuffs according to the invention are described in the following tabular examples with the aid of the components corresponding to the formula (B)

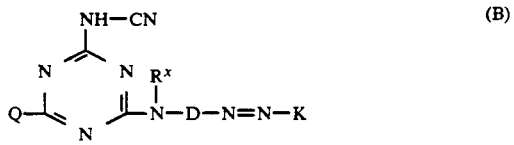
(B)

They can be prepared in the manner according to the invention, for example analogously to one of the above embodiment examples, using the components which can be seen from the particular tabular example in association with the formula (B) (such as a diaminophenylene or — naphthylene of the formula $HR^xN—D—NH_2$, the coupling component H-K, a halotriazine, cyanamide and an amine of the formula H-Q). They have very good fiber-reactive dyestuff properties and dye the materials mentioned in the description, in particular cellulose fiber material, such as cotton, in the shades stated in the particular tabular example (cotton for this purpose) with a good depth of color and with good fastness properties.

| Example | Radical —Q | Radical —D— | Radical —K | Color shade |
|---|---|---|---|---|
| 127 | 4-($\beta$-sulfatoethyl-sulfonyl)-phenylamino | 1,4-phenylene-SO$_3$H | 1-($\beta$-sulfatoethyl)-2-hydroxy-4-methyl-pyrid-6-on-3-yl | greenish-tinged yellow |
| 128 | $\gamma$-($\beta'$-sulfatoethyl-sulfonyl)-propylamino | " | 1-($\beta$-sulfatoethyl)-2-hydroxy-4-methyl-pyrid-6-on-3-yl | greenish-tinged yellow |
| 129 | 3-($\beta$-sulfatoethyl-sulfonyl)-phenylamino | 1,4-phenylene-SO$_3$H | 1-($\beta$-sulfatoethyl)-2-hydroxy-4-methyl-pyrid-6-on-3-yl | greenish-tinged yellow |
| 130 | 3-($\beta$-sulfatoethyl-sulfonyl)-phenylamino | 1,4-phenylene-SO$_3$H | 1-ethyl-2-hydroxy-4-methyl-5-carbamoyl-pyrid-6-on-3-yl | greenish-tinged yellow |
| 131 | 4-($\beta$-sulfatotethyl-sulfonyl)-phenylamino | " | 1-ethyl-2-hydroxy-4-methyl-5-carbamoyl-pyrid-6-on-3-yl | greenish-tinged yellow |
| 132 | $\beta$-[4-($\beta'$-sulfatoethyl-sulfonyl)-phen]-ethyl-amino | " | 1-ethyl-2-hydroxy-4-methyl-5-carbamoyl-pyrid-6-on-3-yl | greenish-tinged yellow |
| 133 | 4-($\beta$-sulfatoethyl-sulfonyl)-phenylamino | 4,6-disulfo-1,3-phenylene | 1-ethyl-2-hydroxy-4-methyl-5-carbamoyl-pyrid-6-on-3-yl | greenish-tinged yellow |
| 134 | 3-($\beta$-sulfatoethyl-sulfonyl)-phenylamino | 4,6-disulfo-1,3-phenylene | 1-ethyl-2-hydroxy-4-methyl-5-carbamoyl-pyrid-6-on-3-yl | greenish-tinged yellow |
| 135 | $\gamma$-($\beta'$-sulfatoethyl-sulfonyl)-propylamino | 1,4-phenylene-SO$_3$H | 5-amino-4-hydroxy-6-(4'-sulfo-phenylazo)-2,7-disulfo-naphth-3-yl | navy blue |
| 136 | $\gamma$-($\beta'$-sulfatoethyl-sulfonyl)-propylamino | 4,6-disulfo-1,3-phenylene | 1,4-dimethyl-2-hydroxy-5-carbamoyl-pyrid-6-on-3-yl | greenish-tinged yellow |

-continued

| Example | Radical —Q | Radical —D— | Radical —K | Color shade |
|---|---|---|---|---|
| 137 | γ-(β'-sulfatoethyl-sulfonyl)-propylamino | [1,4-phenylene with SO₃H] | 1,4-dimethyl-2-hydroxy-5-sulfo-methyl-pyrid-6-on-3-yl | greenish-tinged yellow |
| 138 | 4-(β-sulfatoethyl-sulfonyl)-phenylamino | " | 1,4-dimethyl-2-hydroxy-5-sulfo-methyl-pyrid-6-on-3-yl | greenish-tinged yellow |
| 139 | 4-(β-sulfatoethyl-sulfonyl)-phenylamino | " | 1-(4'-sulfophenyl)-3-methyl-pyrazol-5-on-4-yl | yellow |
| 140 | 3-(β-sulfatoethyl-sulfonyl)-phenylamino | " | 1-(4'-sulfophenyl)-3-methyl-pyrazol-5-on-4-yl | yellow |
| 141 | 4-(β-sulfatoethyl-sulfonyl)-phenylamino | " | 1-(4'-sulfo-2',5'-dichlorophenyl)-3-methyl-pyrazol-5-on-4-yl | yellow |
| 142 | 4-(β-sulfatoethyl-sulfonyl)-phenylamino | [1,4-phenylene with SO₃H] | 1-(4'-sulfophenyl)-3-methyl-pyrazol-5-on-4-yl | yellow |
| 143 | 3-(β-sulfatoethyl-sulfonyl)-phenylamino | " | 1-(4'-sulfophenyl)-3-methyl-pyrazol-5-on-4-yl | yellow |
| 144 | 3-(β-sulfatoethyl-sulfonyl)-phenylamino | [1,4-phenylene with SO₃H] | 1-(4'-sulfophenyl)-3-carboxy-pyrazol-5-on-4-yl | yellow |
| 145 | 3-(β-sulfatoethyl-sulfonyl)-phenylamino | " | 5-amino-4-hydroxy-6-(4'-sulfo-phenylazo)-2,7-disulfo-naphth-3-yl | navy blue |
| 146 | 4-(β-sulfatoethyl-sulfonyl)-phenylamino | " | 5-amino-4-hydroxy-6-(4'-sulfo-phenylazo)-2,7-disulfo-naphth-3-yl | yellow |
| 147 | 4-(β-sulfatoethyl-sulfonyl)-phenylamino | [1,4-phenylene with SO₃H] | 5-amino-4-hydroxy-6-(4'-sulfo-phenylazo)-2,7-disulfo-naphth-3-yl | yellow |
| 148 | 4-(β-sulfatoethyl-sulfonyl)-phenylamino | [1,4-phenylene with SO₃H] | 1-[4'-(β-sulfatoethyl-sulfonyl)-phenyl]-3-methyl-pyrazol-5-on-4-yl | yellow |
| 149 | 3-(β-sulfatoethyl-sulfonyl)-phenylamino | " | 1-[4'-(β-sulfatoethyl-sulfonyl)-phenyl]-3-methyl-pyrazol-5-on-4-yl | yellow |
| 150 | 4-(β-sulfatoethyl-sulfonyl)-phenylamino | 4,6-disulfo-1,3-phenylene | 1-[4'-(β-sulfatoethyl-sulfonyl)-phenyl]-3-methyl-pyrazol-5-on-4-yl | yellow |
| 151 | 4-(β-sulfatoethyl-sulfonyl)-phenylamino | [1,4-phenylene with SO₃H] | 4-hydroxy-5-acetylamino-2,7-disulfo-naphth-3-yl | yellowish-tinged red |
| 152 | 3-(β-sulfatoethyl-sulfonyl)-phenylamino | " | 4-hydroxy-5-acetylamino-2,7-disulfo-naphth-3-yl | yellowish-tinged red |
| 153 | 3-(β-sulfatoethyl-sulfonyl)-phenylamino | " | 4-hydroxy-5-benzoylamino-2,7-disulfo-naphth-3-yl | yellowish-tinged red |
| 154 | 4-(β-sulfatoethyl-sulfonyl)-phenylamino | " | 4-hydroxy-5-benzoylamino-2,7-disulfo-naphth-3-yl | yellowish-tinged red |
| 155 | 4-(β-sulfatoethyl-sulfonyl)-phenylamino | " | 4-hydroxy-5-benzoylamino-2,8-disulfo-naphth-3-yl | yellowish-tinged red |
| 156 | 4-(β-sulfatoethyl-sulfonyl)-phenylamino | " | 5-[4'-chloro-6'-(β-sulfo-ethylamino)-1',3',5'-triazin-2'-yl]-amino-4-hydroxy-2,7-disulfo-naphth-3-yl | yellowish-tinged red |
| 157 | 3-(β-sulfatoethyl-sulfonyl)-phenylamino | " | 5-[4'-chloro-6'-(β-sulfo-ethylamino)-1',3',5'-triazin-2'-yl]-amino-4-hydroxy-2,7-disulfo-naphth-3-yl | yellowish-tinged red |

| Example | Radical —Q | Radical —D— | Radical —K | Color shade |
|---|---|---|---|---|
| 158 | 4-(β-sulfatoethyl-sulfonyl)phenylamino | " | 5-[4'-chloro-6'-amino-1',3',5'-triazin-2'-yl]-amino-4-hydroxy-2,7-disulfo-naphth-3-yl | yellowish-tinged red |
| 159 | γ-(β'-sulfatoethyl-sulfonyl)-propylamino | " | 5-amino-4-hydroxy-6-[4'-(β-sulfatoethylsulfonyl)-phenylazo]-2,7-disulfo-naphth-3-yl | navy blue |
| 160 | β-[4-(β'-sulfatoethyl-sulfonyl)-phen]-ethyl-amino | " | 5-amino-4-hydroxy-6-[4'-(β-sulfatoethylsulfonyl)-phenylazo]-2,7-disulfo-naphth-3-yl | navy blue |
| 161 | 2-methoxy-6-(β-sulfato-ethylsulfonyl)-phenyl-amino | " | 5-amino-4-hydroxy-6-[4'-(β-sulfatoethylsulfonyl)-phenylazo]-2,7-disulfo-naphth-3-yl | navy blue |
| 162 | 4-(β-sulfatoethyl-sulfonyl)-phenylamino | " | 5-amino-4-hydroxy-6-(4'-sulfo-phenylazo)-2,7-disulfo-naphth-3-yl | navy blue |
| 163 | 3-(β-sulfatoethyl-sulfonyl)-phenylamino | " | 1-(β-sulfoethyl-2-hydroxy-4-methyl-pyrid-6-on-3-yl | greenish-tinged yellow |

Example 164

49 parts of 1-amino-2-sulfo-4-(3'-amino-4'-sulfo-phenyl)-amino-9,10-anthraquinone are reacted in aqueous solution with 19 parts of cyanuric chloride at 0° to 5° C. and at a pH of 3.5 to 4. 4.4 parts of cyanamide are then added, the pH is brought to 10 by means of aqueous sodium hydroxide solution and the temperature of the mixture is slowly increased to 50° to 60° C. The mixture is further stirred in this temperature range for some time, and when the condensation reaction has ended the pH is brought to 5 with aqueous hydrochloric acid, 29.5 parts of 3-(β-sulfatoethylsulfonyl)-aniline are added and the third condensation reaction is carried out at 85° C. and a pH of 3.5 to 4.

After customary clarification of the synthesis solution, the dyestuff according to the invention of the formula (written in the form of the free acid)

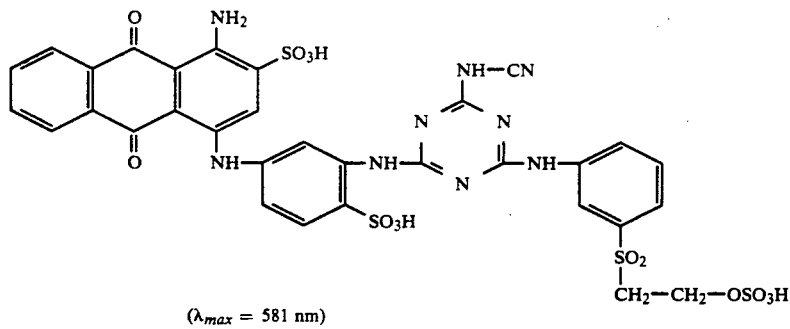

($\lambda_{max}$ = 581 nm)

is obtained as an alkali metal salt (sodium salt) by evaporation of the filtrate. It dyes the materials mentioned in the description, such as, in particular, cellulose fiber materials, for example cotton, in deep, brilliant blue shades by the application and fixing processes customary for fiber-reactive dyestuffs.

Example 165

To prepare an anthraquinone dyestuff according to the invention, the procedure is in accordance with the procedure of Example 164, but instead of 3-(β-sulfatoethylsulfonyl)-aniline, the same amount of 4-(β-sulfatoethylsulfonyl)-aniline is employed. A blue dyestuff with equally good dyeing properties, which, for example, produces deep, brilliant blue dyeing and prints on cotton, is obtained.

Example 166

To prepare an anthraquinone dyestuff according to the invention, the procedure is in accordance with the procedure of Example 164, but 49 parts of 1-amino-2-sulfo-4-(3'-amino-2',4',6'-trimethyl-5'-sulfo-phenyl)-amino-9,10-anthraquinone are employed as the starting anthraquinone compound. The dyestuff has, written in the form of the free acid, the formula

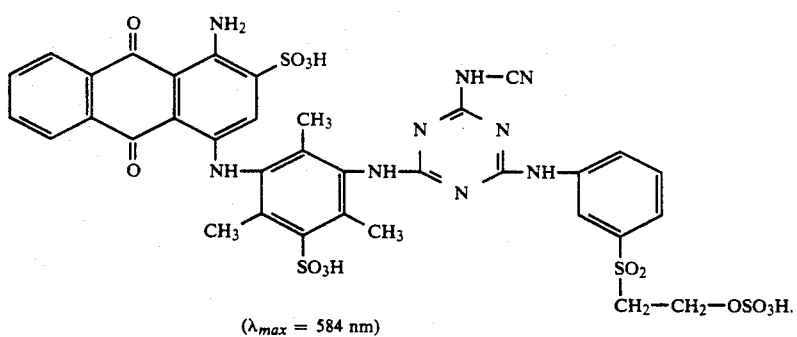

($\lambda_{max}$ = 584 nm)

It exhibits very good fiber-reactive dyestuff properties and produces, for example, prints and dyeings in deep, brilliant blue shades on cotton by the application and fixing processes customary in the art.

Example 167

A fine suspension of 19 parts of cyanuric chloride in 100 parts of ice-water is added to about 3,000 parts of an aqueous solution, having a pH of 7 and a temperature of 0° to 5° C., of 31.6 parts of the triphendioxazine compound of the formula

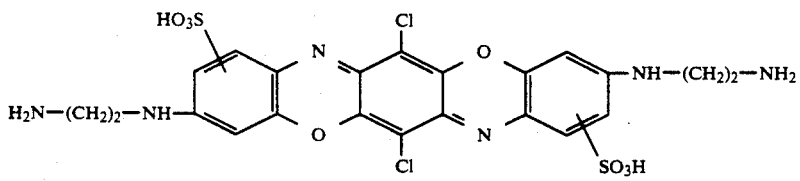

The mixture is further stirred at ° to 5° C. and at a pH of 6.5 to 7 for about another 1.5 hours, and when the condensation reaction has ended, a solution of 4.4 parts of cyanamide in 30 parts of water is added, the pH is brought to 10 means of sodium hydroxide solution, the mixture is slowly heated to 50° to 60° C. and is further stirred at this temperature and this pH for about another two hours, 29.5 parts of 3-(β-sulfatoethylsulfonyl)-aniline are then added and the third condensation reaction is carried out at a pH of 3.5 to 4 and a temperature of 80° to 90° C.

After the customary clarification of the synthesis solution, the anthraquinone dyestuff according to the invention is obtained from the filtrate — for example by spray drying — as an alkali metal salt (sodium salt.) It has, written in the form of the free acid, the formula

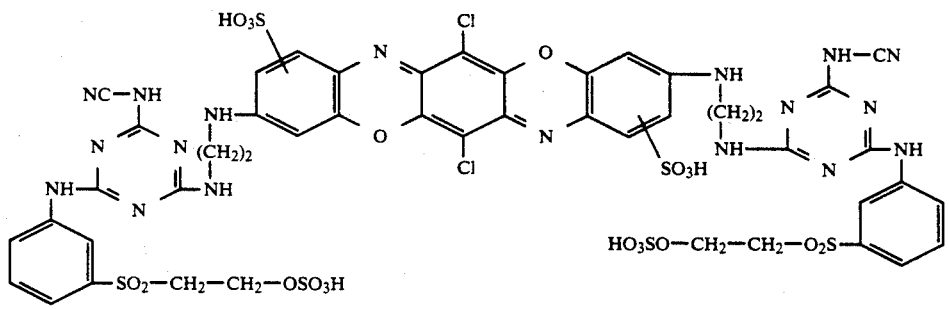

and produces deep, reddish-tinged blue dyeings and prints with good fastness properties by the application and fixing processes customary in the art for fiber-reactive dyestuffs.

Examples 168 to 176

Further triphendioxazine dyestuffs according to the invention are described in the following tabular examples by means of the components of the formula (C)

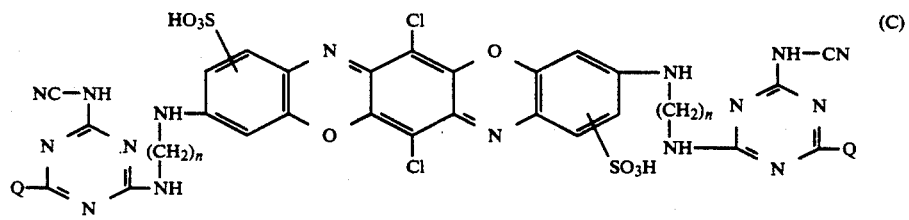

(C)

They can be prepared in a manner according to the invention, such as, for example, in accordance with the above Example 167, from their starting components, which can be seen from the formula (C) in association with the information in the corresponding tabular examples (such as the corresponding dichloro-triphendioxaziine starting diamine, cyanuric chloride, cyanamide and the amine corresponding to the formula H-Q); they have very good fiber-reactive dyestuff properties and produce on the materials mentioned in the description, such as, in particular, cellulose fiber materials, strong, clear blue dyeings with good fastness properties.

with aqueous hydrochloric acid. 29.5 parts of 3-($\beta$sulfatoethylsulfonyl)-aniline are added and the mixture is stirred at 80° to 90° C. and at a pH of 3.5 to 4 for about 2.5 hours. The synthesis solution is clarified with kieselguhr, while still hot, at a pH of 5.5 and the filtrate is evaporated under reduced pressure.

A blue powder, containing electrolyte, of the alkali metal salt (sodium salt) of the compound of the formula

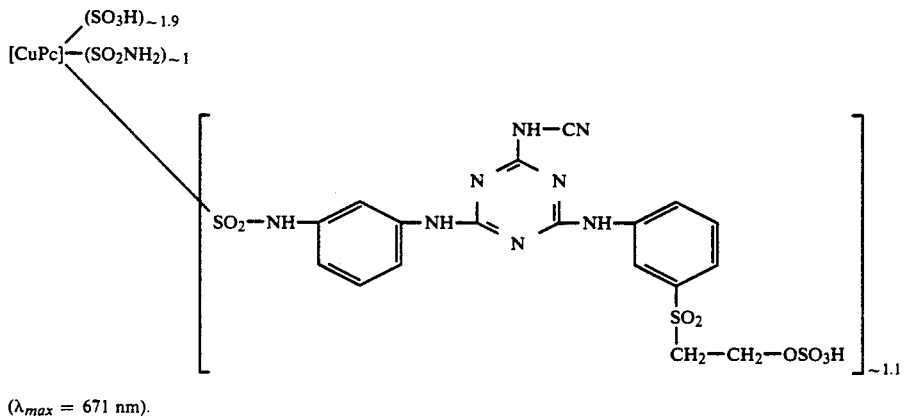

($\lambda_{max}$ = 671 nm).

| Example | Index n | Radical Q | Color shade |
|---|---|---|---|
| 168 | 2 | $\beta$-[4-($\beta'$-sulfatoethylsulfonyl)-phen]-ethylamino | blue |
| 169 | 2 | $\gamma$-($\beta'$-sulfatoethylsulfonyl)-propylamino | blue |
| 170 | 2 | 2-methoxy-6-($\beta$-sulfatoethylsulfonyl)-phenylamino | blue |
| 171 | 3 | 3-($\beta$-sulfatoethylsulfonyl)-phenylamino | blue |
| 172 | 3 | 4-($\beta$-sulfatoethylsulfonyl)-phenylamino | blue |
| 173 | 3 | N-ethyl-N-[4-($\beta$-sulfatoethylsulfonyl)-phenyl]-amino | blue |
| 174 | 3 | $\gamma$-(vinylsulfonyl)-propylamine [sic] | blue |
| 175 | 3 | $\beta$-[4-($\beta'$-sulfatoethylsulfonyl)-phen]-ethylamino [sic] | blue |
| 176 | 2 | 4-($\beta$-sulfatoethylsulfonyl)-phenylamino | blue |

Example 177

58.5 parts of the copper phthalocyanine compound of the formula

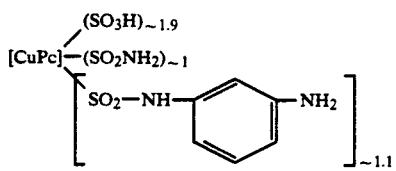

are homogeneously stirred into a mixture of 600 parts of ice and 600 parts of water, and this mixture is brought to a pH of 7 with sodium hydroxide solution. 19 parts of cyanuric chloride, dissolved in a little acetone, are added and the condensation reaction is carried out at 0° to 5° C. and at a pH of 3.5 to 4, with further stirring. 4.4 parts of cyanamide are then added, the temperature is slowly increased to 50° to 60° C., the pH is brought to 10 by means of sodium hydroxide solution, and the mixture is further stirred until this second condensation reaction has ended and is then neutralized to a pH of 5 is obtained.

The copper phthalocyanine dyestuff according to the invention has very good fiber-reactive dyestuff properties and dyes the materials mentioned in the description, such as, in particular, cellulose fiber materials, in deep, fast turquoise blue shades by the customary application and fixing processes.

Example 178

To prepare a copper phthalocyanine compound according to the invention, the procedure is in accordance with the procedure of Example 177, but instead of 3-($\beta$-sulfatoethylsulfonyl)-aniline, the same amount of 4-($\beta$-sulfatoethylsulfonyl)-aniline in employed. The dyestuff according to the invention exhibits the same good dyeing properties as that of Example 177 and likewise produces fast, turquoise blue dyeings and prints.

Example 179

A homogeneously stirred mixture of 58 parts of copper phthalocyanine compound corresponding to the formula

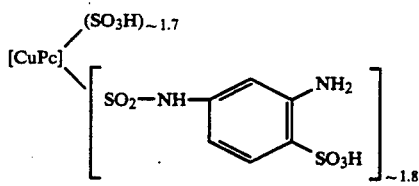

in 300 parts of water and 125 parts of ice is brought to a pH of 7 with sodium hydroxide solution. A fine suspension of 16.6 parts of cyanuric chloride in 170 parts of ice-water is added, the temperature is kept at 0° to 5° C. and a pH of 5 to 5.5 is maintained by means of sodium bicarbonate. When the condensation reaction has ended, 3.8 parts of cyanamide are added, the pH is brought to 10 by means of aqueous sodium hydroxide solution, the mixture is slowly heated to 50° to 60° C.

and is stirred at 60° C. and at a pH of 9.5 to 10 for about a further two hours, and when the reaction has ended the resulting monochlorotriazine compound is reacted with 25.8 parts of 4-(β-sulfatoethylsulfonyl)-aniline at a pH of 3.5 to 4 and at 80° to 90° C. When the reaction has ended, the synthesis solution is clarified with kieselguhr in the customary manner.

A blue powder, containing electrolyte, of the alkali metal salt (sodium salt) of the copper phthalocyanine compound of the formula

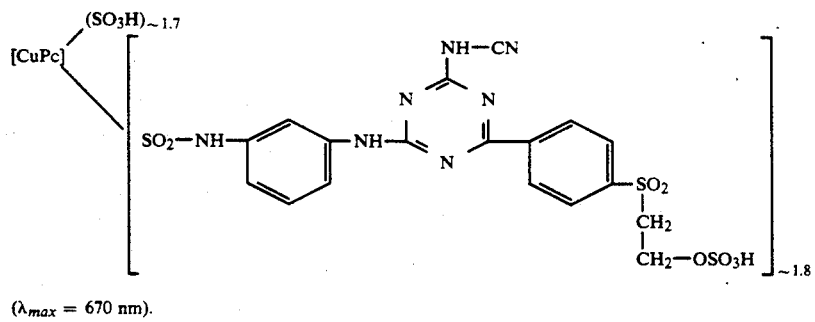

($\lambda_{max}$ = 670 nm).

is obtained by evaporating the filtrate.

The copper phthalocyanine dyestuff according to the invention dyes the materials mentioned in the description, such as, in particular, cellulose fiber materials, in deep, fast turquoise blue shades when used by the customary processes.

Example 180

To prepare a copper phthalocyanine compound according to the invention, the procedure is in accordance with the procedure of Example 177, but instead of 3-(β-sulfatoethylsulfonyl)-aniline, the same amount of 4-(β-sulfatoethylsulfonyl)-aniline in employed. The dyestuff according to the invention exhibits the same good dyeing properties as that of Example 177 and likewise produces fast, turquoise blue dyeings and prints.

Example 181

A homogeneously mixture of 106.2 parts of the nickel phthalocyanine compound of the formula

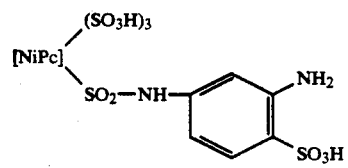

in 300 parts of ice and 600 parts of water is brought to a pH of 7 with sodium hydroxide solution. A fine suspension of 19 parts of cyanuric chloride in 200 parts of ice-water is added and the reaction is carried out at 0° to 5° C. and at a pH of 4.5. 4.4 parts of cyanamide are then added, the pH is brought to 10 by means of sodium hydroxide solution, the mixture is slowly heated to 60° C. and stirred at 60° C. and at a pH of 9.5 to 10 for another two hours, and when this second condensation reaction has ended 29.5 parts of 3-(β-sulfatoethylsulfonyl)-aniline are added. The third condensation reaction is carried out at 80° to 90° C. at a pH of 3.5 to 4. The synthesis solution is then clarified in the customary manner at a pH of 5.5 and the dyestuff according to the invention of the formula (written in the form of the free acid)

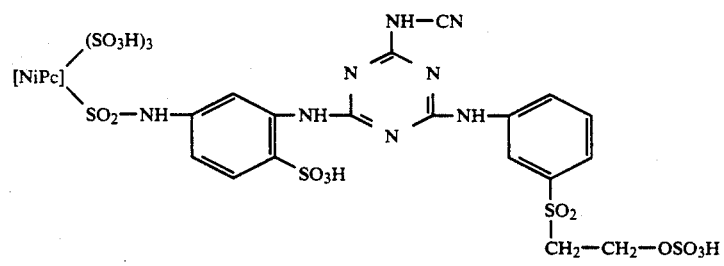

is isolated as the alkali metal salt (sodium salt) in the form of a powder containing electrolyte. When used by the customary application and fixing processes, for example, deep, bluish-tinged green dyeings and prints with good fastness properties are obtained on cellulose fiber materials, such as cotton.

Example 182

To prepare a copper phthalocyanine compound according to the invention, the procedure is in accordance with the procedure of Example 177, but instead of 3-(β-sulfatoethylsulfonyl)-aniline, the same amount of 4-(β-sulfatoethylsulfonyl)-aniline is employed. The dyestuff according to the invention exhibits the same good dyeing properties as that of Example 177 and likewise produces fast turquoise blue dyeings and prints.

We claim:

1. A water-soluble dyestuff corresponding to the formula (1)

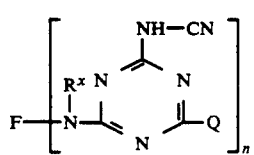

(1)

in which:

F is the radical of a monoazo, disazo or polyazo dyestuff or of a heavy metal complex azo dyestuff or of an anthraquinone, phthalocyanine, azomethine, dioxazine, phenazine, stilbene, triphenylmethane, xanthene, thioxanthene, nitroaryl, naphthoquinone, pyrenequinone or perylenetetracarbimide dyestuff;

$R^x$ is hydrogen or alkyl having 1 to 4 carbon atoms, which can be substituted by halogen, hydroxyl, cyano, alkoxy having 1 to 4 carbon atoms, alkoxycarbonyl having 2 to 5 carbon atoms, carboxyl, sulfamoyl, sulfo or sulfato;

n is the number 1 to 2;

Q is a group of the formula (2a) or (2b)

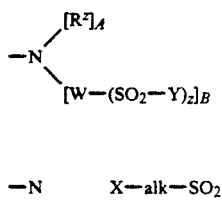

in which $R^z$ is hydrogen or alkyl having 1 to 4 carbon atoms, which can be substituted by halogen, hydroxyl, cyano, alkoxy having 1 to 4 carbon atoms, carboxyl, sulfamoyl, sulfo or sulfato, or by phenyl which is optionally substituted by substituents from the group comprising halogen, alkoxy having 1 to 4 carbon atoms, alkyl having 1 to 4 carbon atoms, sulfo and carboxyl, or is cyclohexyl or phenyl which is optionally substituted by substituents from the group comprising halogen, alkoxy having 1 to 4 carbon atoms, alkyl having 1 to 4 carbon atoms, sulfo and carboxyl, W is an optionally substituted arylene radical or an alkylene-arylene or arylene-alkylene or alkylene-arylene-alkylene or arylene-alkylene-arylene radical, in which the alkyl radicals are those having 1 to 8 carbon atoms and can be substituted and the arylene radicals are optionally substituted phenylene or naphthylene radicals, and in which the alkylene radicals can be interrupted by 1 or more hetero groups and the alkylene and arylene portions in the combined arylene/alkylene radicals can in each case be interrupted by a hetero group, Y is vinyl, β-sulfatoethyl, β-thiosulfatoethyl, β-phosphatoethyl, β-alkanoyloxy-ethyl having 2 to 5 carbon atoms in the alkanoyl radical, β-benzoyloxyethyl, β-(sulfobenzoyloxy)-ethyl, β-(p-toluenesulfonyloxy)-ethyl or β-haloethyl, z is the number 1 or 2, A is the number zero or 1 and B is the number 1 or 2, in which the sum of (A+B) equals the number 2, and in which, in the case where B is 2, the groups of the formula —W—(SO₂—Y)$_k$ can have the same meaning as one another or a different meaning from one another, X, together with the N atom, forms the bivalent radical of a heterocyclic ring consisting of 1 or 2 alkylene groups having 1 to 5 carbon atoms and optionally 1 to 2 hetero groups and alk is alkylene having 1 to 4 carbon atoms.

2. A dyestuff as claimed in claim 1, in which $R^x$ is methyl or ethyl or hydrogen.

3. The water-soluble dyestuffs according to claim 1, wherein n is 1.

4. A dyestuff as claimed in claim 1, in which Y is β-sulfatoethyl.

5. A dyestuff as claimed in claim 1, in which Q is a group of the formula

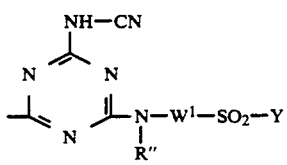

in which R" is hydrogen, methyl or ethyl, $W^1$ is alkylene having 2 to 4 carbon atoms, or is phenylene, which can be substituted by 1 to 2 substituents from the group comprising methyl, ethyl, methoxy, ethoxy, and chlorine, and Y has the meaning given in claim 1.

6. A dyestuff as claimed in claim 5, wherein $W^1$ is an alkylene having 3 carbon atoms.

7. A dyestuff as claimed in claim 1, of the formula (17A)

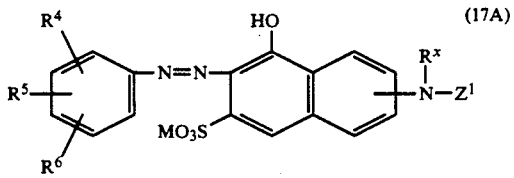

in which $Z^1$ is a radical of the formula (3C)

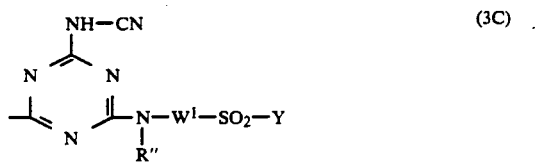

in which $W^1$ is alkylene having 2 to 4 carbon atoms, or is phenylene, which can be substituted by 1 or 2 substituents from the group comprising methyl, ethyl, methoxy, ethoxy and chlorine, R" is hydrogen, methyl or ethyl, the group —N($R^x$)—$Z^1$ is bonded to the 1-naphthol radical in the 6-position, $R^x$ is hydrogen, methyl or ethyl, $R^4$ is methoxy, $R^5$ is hydrogen or sulfo, $R^6$ is hydrogen or sulfo and M is the hydrogen or an alkali metal.

8. A dyestuff as claimed in claim 7, wherein $W^1$ is an alkylene having 3 carbon atoms and Y is β-sulfatoethyl.

9. A dyestuff as claimed in claim 1, of the formula (20)

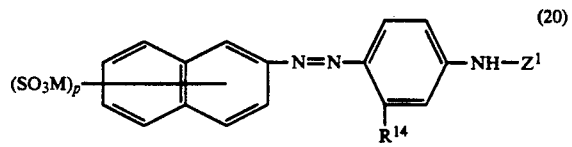

in which $Z^1$ is a radical of the formula (3C)

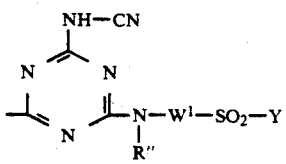

in which $W^1$ is alkylene having 2 to 4 carbon atoms, or phenylene which is substituted by 1 or 2 substituents from the group comprising methyl, ethyl, methoxy, ethoxy and chlorine, R" is hydrogen, methyl or ethyl, $R^{14}$ is methyl, acetylamino or ureido, p is the number 1, 2 or 3 and M is hydrogen or an alkali metal.

10. A dyestuff as claimed in claim 9, wherein $W^1$ is an alkylene having 3 carbon atoms and Y is β-sulfatoethyl.

11. A dyestuff as claimed in claim 1, of the formula (21)

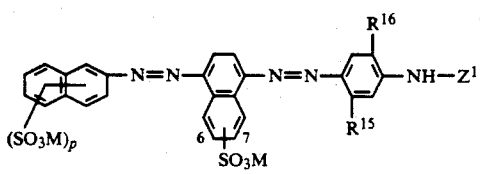

in which $Z^1$ is a radical of the formula (3C)

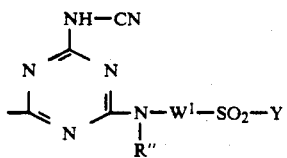

in which $W^1$ is alkylene having 2 to 4 carbon atoms, or is phenylene, which can be substituted by 1 or 2 substituents from the group comprising methyl, ethyl, methoxy, ethoxy and chlorine, R" is hydrogen, methyl or ethyl, p is the number 2 and the group —SO₃M is bonded in the 6-position i the naphthylene central component, $R^{15}$ is hydrogen, alkyl having 1 to 4 carbon atoms, alkoxy having 1 to 4 carbon atoms, alkanoylamino having 2 to 5 carbon atoms, ureido or halogen, $R^{16}$ is hydrogen, alkyl having 1 to 4 carbon atoms, alkoxy having 1 to 4 carbon atoms or halogen and M is hydrogen or an alkali metal.

12. A dyestuff as claimed in claim 11, wherein $W^1$ is an alkylene having 3 carbon atoms and Y is β-sulfatoethyl.

13. A dyestuff as claimed in claim 1, of the formula

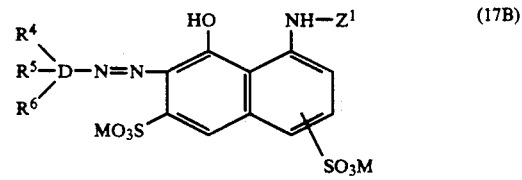

in which $R^4$ is vinylsulfonyl, $R^5$ is hydrogen, alkyl having 1 to 4 carbon atoms, alkoxy having 1 to 4 carbon atoms, halogen, carboxyl or sulfo, $R^6$ is hydrogen or sulfo and $Z^1$ is a radical of the formula (3C)

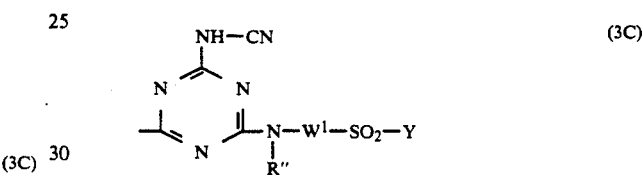

in which $W^1$ is alkylene having 2 to 4 carbon atoms, or is phenylene, which can be substituted by 1 or 2 substituents from the group comprising methyl, ethyl, methoxy, ethoxy and chlorine, and R" is hydrogen, methyl or ethyl.

14. A dyestuff as claimed in claim 13, wherein $R^4$ is a β-sulfatoethylsulfonyl, $Y^1$ is an alkylene having 3 carbon atoms, and Y is a β-sulfatoethyl sulfonyl.

15. A dyestuff as claimed in claim 1, of the formula

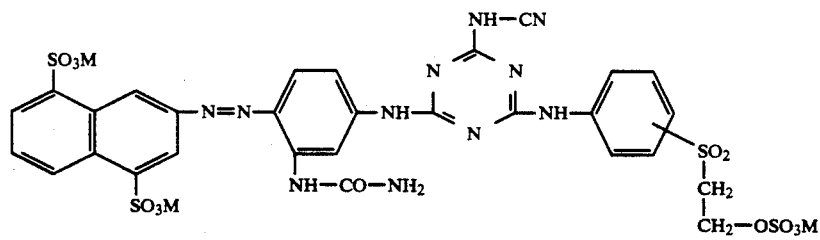

or of the formula

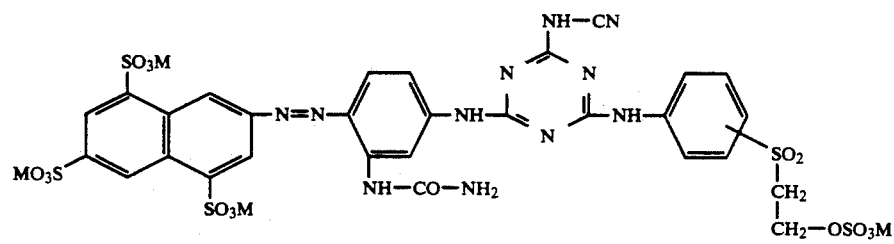

or of the formula

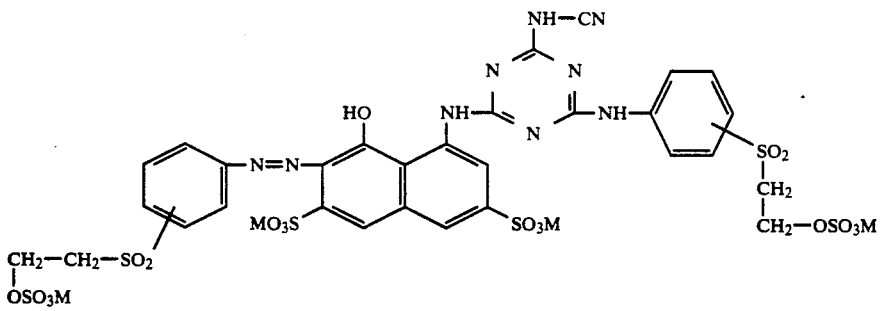

or of the formula

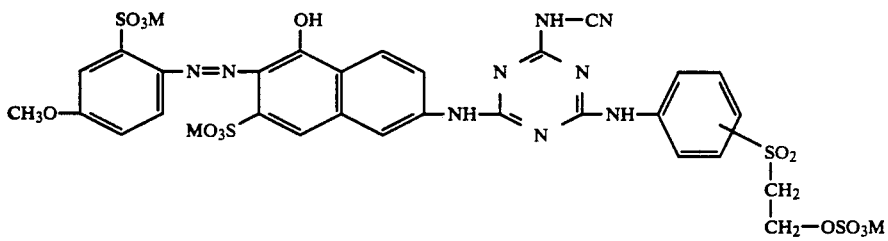

in which M is hydrogen or an alkali metal and the groups —SO$_2$—CH$_2$—CH$_2$—OSO$_3$M are bonded to the benzene nucleus in the meta- or para-position relative to the amino group.

16. A dyestuff as claimed in claim 1, of the formula

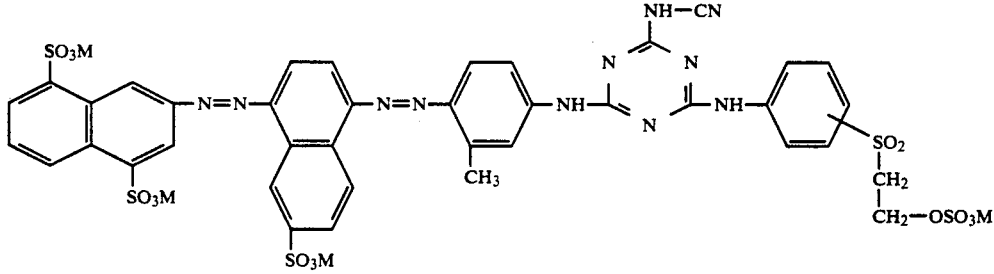

in which M is hydrogen or an alkali metal and the groups —SO$_2$—CH$_2$—CH$_2$—OSO$_3$M are bonded to the benzene nucleus in the meta- or para-position relative to the amino group.

17. In the process for dyeing or printing a material containing hydroxy or carboxamide groups, in which a dye is applied to or incorporated in the material and fixed by means of heat or by means of an alkaline agent or by both matters, the improvement consisting of using as the dye a compound of the general formula (1) as shown and defined in claim 1.

* * * * *

UNITED STATES PATENT AND TRADEMARK OFFICE
CERTIFICATE OF CORRECTION

PATENT NO. : 5,227,475
DATED : July 13, 1993
INVENTOR(S) : Buch et al

It is certified that error appears in the above-indentified patent and that said Letters Patent is hereby corrected as shown below:

In column 75, line 22, please correct the formula to read

In column 75, line 27, please delete "R$^x$" and insert --R$^z$-- thereof.

In column 76, lines 11-17, please delete the formula and insert the following formula

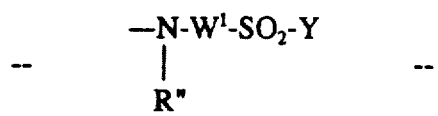

Signed and Sealed this

Thirty-first Day of May, 1994

Attest:

BRUCE LEHMAN

Attesting Officer      Commissioner of Patents and Trademarks